United States Patent
Nakajima et al.

(10) Patent No.: US 7,561,348 B2
(45) Date of Patent: Jul. 14, 2009

(54) FIXING STRUCTURE, LENS BLOCK, IMAGE READING UNIT AND IMAGE FORMING APPARATUS

(75) Inventors: Mitsuru Nakajima, Atsugi (JP); Shinobu Kanatani, Atsugi (JP); Shigeo Kobayashi, Isehara (JP); Shigeru Fujita, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 277 days.

(21) Appl. No.: 11/267,371

(22) Filed: Nov. 7, 2005

(65) Prior Publication Data
US 2006/0114578 A1   Jun. 1, 2006

(30) Foreign Application Priority Data

| Nov. 5, 2004 | (JP) | ............................ 2004-321714 |
| Nov. 5, 2004 | (JP) | ............................ 2004-321715 |
| Nov. 5, 2004 | (JP) | ............................ 2004-321717 |

(51) Int. Cl.
*G02B 7/02*   (2006.01)
(52) U.S. Cl. ...................................... 359/811; 359/819
(58) Field of Classification Search ................. 359/819, 359/822, 823, 694, 811, 808
See application file for complete search history.

(56) References Cited

U.S. PATENT DOCUMENTS

| 5,257,138 | A  | * | 10/1993 | Yamaguchi et al. | ......... 359/819 |
| 6,361,177 | B2 | * | 3/2002  | Umetsu           | ...................... 359/871 |
| 6,795,257 | B2 | * | 9/2004  | Andoh et al.     | ................ 359/819 |
| 7,061,699 | B2 |   | 6/2006  | Watanabe et al.  | ........... 359/819 |

FOREIGN PATENT DOCUMENTS

| CN |  1331424 A | 1/2002 |
| CN |  1450377 A | 10/2003 |
| JP | 2001-313779 | 11/2001 |
| JP |   2002-6188 | 1/2002 |

\* cited by examiner

*Primary Examiner*—Mohammed Hasan
(74) *Attorney, Agent, or Firm*—Oblon, Spivak, McClelland, Maier & Neustadt, P.C.

(57) ABSTRACT

A lens block according to the present invention includes a lens cylinder; and at least one lens accommodated in the lens cylinder and dividing a space in the lens cylinder into a first space and a second space, wherein the lens cylinder includes at least one hole into which a tool for removing the at least one lens from the lens cylinder is inserted, wherein the at least one lens is pressed into the lens cylinder from either one of the first space and the second space, and the at least one hole is formed on the other of the first space and the second space, and wherein the at least one hole is provided in a position that enables the inserted tool to contact the at least one lens through the at least one hole.

18 Claims, 34 Drawing Sheets

FIXING STRUCTURE, LENS BLOCK, IMAGE READING UNIT AND IMAGE FORMING APPARATUS

BACKGROUND

The present invention relates to a fixing structure, a lens block, an image reading unit and an image forming apparatus used in a copying machine, a facsimile, a scanner and so on.

Conventionally, a lens block of an image reading unit used in, for example, a copying machine, a facsimile and a scanner device includes a base member, an imaging lens system mounted on the base member, and an image sensor which is attached to the base member and which has a line photoelectric transducer and a package accommodating the line photoelectric transducer. The lens block of the image reading unit moves an illumination light source for a manuscript in a sub-scan direction, reduces and images the light reflected from the manuscript on the line photoelectric transducer through the imaging lens system comprising more than two groups of lenses, and photo-electrically converts an imaging light flux imaged on the line photoelectric transducer into image reading signals to output the converted image reading signals.

In the lens block of the image reading unit, a read image is degraded when the imaging light flux is misaligned in an optical-axis direction on a light-receiving surface of the line photoelectric transducer. Accordingly, a distance between each lens group is adjusted such that the read image satisfies a design standard.

Also in the lens block of the image reading unit, a central rectangular part within a surface of lenses structuring a lens group contributes to the imaging of the line photoelectric transducer. The imaging performance such as an aberration in the rectangular part of the lens varies in a circumferential direction of the lens around an optical axis of the lens as the center. Therefore, even when the lens is positioned such that the rectangular part of the lens becomes parallel to the line photoelectric transducer and a distance between the lens and the line photoelectric transducer is adjusted so that an imaging position of the imaging light flux is imaged or positioned on the light-receiving surface of the line photoelectric transducer, the imaging position of the imaging light flux may be misaligned in the optical-axis direction on the light-receiving surface of the line photoelectric transducer if the lens is set by rotating the lens in order that the rectangular part is in parallel with the line photoelectric transducer, causing the degradation of image quality.

Particularly in the lens used in the lens block of the image reading unit for reading a color image, the color image cannot be reproduced well when imaging positions of respective blue wavelength, green wavelength and red wavelength are misaligned in a rotation direction of the lens. Hence, it is also necessary to adjust the lens in the circumferential direction of the lens around the optical axis as the center.

Accordingly, the optical axis of the light reflected from the manuscript and entered through the lens groups and the optical axis of the line photoelectric transducer must be positioned on the same line. Given this factor, there is a fixing structure of a lens used in a lens block of the image reading unit, in order to position and fix the lens.

A conventional lens block of an image reading unit is provided with a chassis, a lens and a pair of intermediate retaining members. The chassis is formed in a rectangular shape, and is positioned so that both surfaces of the chassis follow along an optical axis of the light reflected from the manuscript. Both surfaces of the lens are in a circular arc shape, and the lens is formed in a cylindrical shape having a thickness in an optical axis direction. In addition, the lens is positioned in the chassis so that an optical axis of the lens follows along the optical axis of the reflected light. Each of the intermediate retaining members includes a first mounting surface and a second mounting surface, and is formed in an "L"-like shape. The first mounting surface and the second mounting surface are perpendicular to each other.

The first mounting surface of the intermediate retaining member and a side surface of the lens are mutually fixed by an adhesive, and the second mounting surface of the intermediate retaining member and the chassis are mutually fixed by the adhesive. Since the chassis and the lens are fixed via the intermediate retaining member, the optical axis of the light which is reflected from the manuscript and entered thorough a lens group and a position of a line photoelectric transducer are adjusted.

In addition, in the above-described imaging reading unit, it is also necessary to position and fix the imaging lens and the photoelectric transducer, etc. with high precision in order to locate an image imaged by the imaging lens system on the photoelectric transducer and to read optical characteristics such as focus and magnification with predetermined required precision.

Conventionally, fixation utilizing a screw is used for fixing the imaging lens and the photoelectric transducer and so on. However, since an amount of displacement in the fixation by the screw is too large, i.e. more than 30 μm, the screw fixation raises problems in fixing of the photoelectric transducer which requires positioning precision of a few μm levels.

Accordingly, in a structure such as the image reading unit in which the high-precision positioning mentioned above is required, conventionally, mutual members are fixed by an adhesive to reduce the amount of displacement between the members.

However, in the lens block of the above-described image reading unit, the lens attached to the chassis of the lens block cannot be removed easily. Hence, it is difficult to reuse the removed lens or perform separate collection of resources.

In addition, in the lens block of the image reading unit having a fixing structure of a lens cylinder, it is difficult to remove the lens cylinder adhesively fixed on the base member from the base member when a mounting position between the base member and the lens cylinder is misaligned. Accordingly, it is also difficult to reuse the lens block and collect the resources separately when the mounting position between the base member and the lens cylinder is misaligned.

Furthermore, the adhesive used in the fixation of the mutual members in the image reading unit is generally difficult to liquefy or levigate again once it is cured. Accordingly, when the mutual members are fixed by the adhesive as described above, it is difficult to remove the mutually fixed members or attach them again after the adhesive is once cured.

More specifically, in the fixing structure of, for example, the base member as a first member and the package as a second member in the above-described image reading unit, they can be easily removed by using a screwdriver when the members are mutually fixed by the screw, in a case where a defective product having defective positioning precision between the members for example is produced. However, since both members such as the base member and the package cannot be removed from each other if they are fixed by the adhesive, both of the base member and the package have to be discarded, which means that, even though the most expensive component in the image reading unit is a circuit board having the photoelectric transducer, the expensive circuit board also have to be discarded due to the defective positioning accuracy between the members, despite the fact that the circuit board has a normal function. Such a circumstance not only invites high expense but also it is undesirable in terms of resource saving. Additionally, the circumstance causes rise in recycling costs of components as well.

SUMMARY

The present invention has been made in view of the above circumstances, and therefore, a first aspect of the present invention aims to provide a lens block capable of easily removing a lens provided in a lens block, reusing the removed lens and collecting resources separately, an image reading unit and an image forming apparatus.

To achieve these and other advantages and in accordance with the purpose of the invention, as embodied and broadly described herein, the first aspect of the invention provides a lens block. The lens block according to the first aspect of the invention comprises: a lens cylinder; and at least one lens accommodated in the lens cylinder and dividing a space in the lens cylinder into a first space and a second space, wherein the lens cylinder comprises at least one hole into which a tool for removing the at least one lens from the lens cylinder is inserted, wherein the at least one lens is pressed into the lens cylinder from either one of the first space and the second space, and the at least one hole is formed on the other of the first space and the second space, and wherein the at least one hole is provided in a position that enables the inserted tool to contact the at least one lens through the at least one hole.

According to the lens block of the first aspect of the present invention, the lens is pressed into the lens cylinder from one of the first space and the second space, and it is possible to easily remove the lens from the lens cylinder by pressing the other side of the first space and the second space of the lens with the tool inserted from the hole provided in the lens cylinder. Also, it is possible to reuse the removed lens and to perform separate collection of resources.

Following are preferred embodiments (1) to (7) of the lens block according to the first aspect of the present invention. Any combinations thereof may be considered to be preferred ones of the first aspect of the present invention unless any contradictions occur.

(1) The at least one hole is provided such that the tool is inserted into the lens cylinder along a direction of an optical axis of the at least one lens.

According to the present embodiment, the hole of the lens cylinder is provided along the optical axis direction of the lens. Therefore, the lens can be easily removed from the lens cylinder by contacting the tool inserted from the hole to the other side of the first space and the second space of the lens, pressed into the lens cylinder from one of the first space and the second space, and pressing the lens with the tool along the optical axis direction.

(2) The at least one hole is provided such that the tool is inserted into the lens cylinder along a direction perpendicular to an optical axis of the at least one lens.

According to the present embodiment, the hole of the lens cylinder is provided along the direction perpendicular to the optical axis direction of the lens. The tool inserted from the hole is contacted to the lens which is pressed into the lens cylinder from one of the first space and the second space, and then the lens is pressed along the optical axis direction thereof. Thereby, the lens is deviated from the second space toward the first space. Hence, it is possible to remove the lens from the lens cylinder, easily.

(3) The at least one lens comprises a transmitting region near the center of the at least one lens and a non-transmitting region near an outer edge of the at least one lens, and wherein the at least one hole faces the non-transmitting region of the at least one lens.

According to the present embodiment, the hole faces the non-transmitting region of the lens, so that the tool inserted into the lens cylinder contacts with the non-transmitting region of the lens. Since the tool contacts with the non-transmitting region of the lens, it is possible to remove the lens from the lens cylinder without damaging the transmitting region of the lens which is pressed into the lens cylinder. Therefore, it is possible to reuse the taken-out lens and to separately collect the resources.

(4) A plurality of the lenses are provided in the lens cylinder, and the number of the at least one hole is smaller by one than or equal to or more than the number of the lenses.

According to the present embodiment, the number of the hole of the lens cylinder is smaller by one than, or equal to, or more than the number of the lens. The lens can be removed out of the lens cylinder by striking the tool, inserted into the lens cylinder, against the lens remained last in the lens cylinder and for which the hole for insertion of the tool is not provided. Therefore, it is possible to easily remove all of the lenses, which are pressed into the lens cylinder, from the lens cylinder.

(5) A plurality of the holes are provided in a circumferential direction of the lens cylinder around an optical axis of the at least one lens.

According to the present embodiment, the plurality of holes is provided in the lens cylinder in the circumferential direction around the optical axis of the lens. This makes it possible to remove the lens from the lens cylinder without slanting any of the lenses, by inserting the plurality of tools for taking out the lens at once from the holes provided several on the lens cylinder, and pressing the lens with those tools. Thereby, it is possible to easily remove the lens, which is pressed into the lens cylinder, from the lens cylinder without making the lens to be caught by the lens cylinder or damaging/scratching the lens. Therefore, it is possible to reuse the removed lens and perform separate collection of the resources.

(6) The lens cylinder and the at least one lens are adhered by an adhesive for preventing the at least one lens from coming off from inside of the lens cylinder, and the adhesive is provided in a position different from the position of the at least one hole.

According to the present embodiment, the lens cylinder and the lens are adhered by the adhesive which is provided in the position different from that of the hole for insertion of the tool and prevents the lens from coming off from inside of the lens cylinder. Therefore, it is possible to prevent the lens from coming off from the lens cylinder by vibration or the like. Also, the tool can be inserted into the hole when removing the lens from the lens cylinder by adapting the hole not to be covered by the adhesive. Thereby, it is possible to remove the lens from the lens cylinder, easily.

(7) The at least one hole is sealed by a thin-walled portion breakable by striking the tool thereto.

According to the present embodiment, the hole is sealed by the thin-walled portion. The thin-walled portion can be broken through by striking the tool against the thin-walled portion when removing the lens from the lens cylinder, thereby the hole for inserting the tool is formed in the lens cylinder. The lens can be easily removed from the lens cylinder by contacting the tool inserted from the thus formed hole to the lens. Also, since the hole is not opened in the lens cylinder in the beginning, it is possible to avoid attachment of dust or moisture on the lens.

In addition, another lens block according to the first aspect of the present invention comprises: a lens cylinder; and at least one lens accommodated in the lens cylinder and dividing a space in the lens cylinder into a first space and a second space, wherein the lens cylinder comprises at least one groove, into which a tool for hitching the at least one lens is inserted, in an inner circumferential surface of the lens cylinder, and wherein the at least one groove is provided in a position that enables the inserted tool to contact the at least one lens through the at least one hole.

According to the another lens block of the first aspect of the present invention, the lens may be pressed into the lens cylinder from one of the first space and the second space, and the other side of the first space and the second space of the lens may be hitched by the tool inserted from the groove provided in the lens cylinder, and may be further pulled by the tool so that the lens can easily be removed from the lens cylinder. In addition, it is possible to take the lens out of the lens cylinder even when an outer surface in the circumferential direction of the lens cylinder is covered by other structural body.

According to one preferred embodiment of above-described another lens block of the first aspect of the present invention, a plurality of the grooves are provided in a circumferential direction of the lens cylinder around an optical axis of the at least one lens.

According to the present embodiment, the plurality of grooves is provided in the lens cylinder in the circumferential direction around the optical axis of the lens. Therefore, it is possible to remove the lens from the lens cylinder without slanting any of the lenses, by simultaneously inserting the plurality of tools for taking out the lens from the grooves provided several in the lens cylinder, hitching the lens and further pulling the lens with those tools. Thereby, it is possible to easily remove the lens pressed into the lens cylinder from the lens cylinder without making the lens to be caught by the lens cylinder or damaging/scratching the lens. Therefore, it is possible to reuse the removed lens and separately-collect the resources.

The first aspect of the invention also provides an image reading unit for reading a reflected image of a manuscript by a photoelectric transducer. The image reading unit according to the first aspect of the invention comprises a lens block which includes: a lens cylinder; and at least one lens accommodated in the lens cylinder and dividing a space in the lens cylinder into a first space and a second space, wherein the lens cylinder comprises at least one hole into which a tool for removing the at least one lens from the lens cylinder is inserted, wherein the at. least one lens is pressed into the lens cylinder from either one of the first space and the second space, and the at least one hole is formed on the other of the first space and the second space, and wherein the at least one hole is provided in a position that enables the inserted tool to contact the at least one lens through the at least one hole.

Following are preferred embodiments (1) to (7) of the image reading unit according to the first aspect of the present invention. Any combinations thereof may be considered to be preferred ones of the first aspect of the present invention unless any contradictions occur.

(1) The at least one hole is provided such that the tool is inserted into the lens cylinder along a direction of an optical axis of the at least one lens.
(2) The at least one hole is provided such that the tool is inserted into the lens cylinder along a direction perpendicular to an optical axis of the at least one lens.
(3) The at least one lens comprises a transmitting region near the center of the at least one lens and a non-transmitting region near an outer edge of the at least one lens, and wherein the at least one hole faces the non-transmitting region of the at least one lens.
(4) A plurality of the lenses are provided in the lens cylinder, and the number of the at least one hole is smaller by one than or equal to or more than the number of the lenses.
(5) A plurality of the holes are provided in a circumferential direction of the lens cylinder around an optical axis of the at least one lens.
(6) The lens cylinder and the at least one lens are adhered by an adhesive for preventing the at least one lens from coming off from inside of the lens cylinder, and the adhesive is provided in a position different from the position of the at least one hole.
(7) The at least one hole is sealed by a thin-walled portion breakable by striking the tool thereto.

In addition, another image reading unit according to the first aspect of the invention for reading a reflected image of a manuscript by a photoelectric transducer comprises a lens block which includes: a lens cylinder; and at least one lens accommodated in the lens cylinder and dividing a space in the lens cylinder into a first space and a second space, wherein the lens cylinder comprises at least one groove, into which a tool for hitching the at least one lens is inserted, in an inner circumferential surface of the lens cylinder, and wherein the at least one groove is provided in a position that enables the inserted tool to contact the at least one lens through the at least one hole.

In one preferred embodiment of above-described another image reading unit of the first aspect of the invention, a plurality of the grooves are provided in a circumferential direction of the lens cylinder around an optical axis of the at least one lens.

The image reading unit according to the first aspect of the present invention comprises any one of the lens blocks of the first aspect of the present invention described above. Therefore, it is possible to remove the lens from the lens cylinder easily. It is also possible to contribute to reuse of the image reading unit which reads the image reflected from the manuscript with the photoelectric transducer, and to the separate collection of the resources.

The first aspect of the invention further provides an image forming apparatus. The image forming apparatus comprises any one of the image reading units according to the first aspect of the invention described above.

The image forming apparatus according to the first aspect of the present invention comprises any one of the image reading units of the first aspect of the present invention described above. Therefore, it is possible to easily remove the lens from the lens cylinder. Additionally, since the reuse of the image reading unit and the separate collection of the resources are easy to carry out, it is also possible to contribute to reuse of the image forming apparatus and the separate collection of the resources.

A second aspect of the present invention aims to provide a fixing structure of a lens cylinder capable of easily removing the lens cylinder adhesively mounted on a base member from the base member, a lens block having the fixing structure of the lens cylinder, an image reading unit and an image forming apparatus.

To achieve these and other advantages and in accordance with the purpose of the invention, as embodied and broadly described herein, the second aspect of the invention provides a fixing structure of a lens cylinder. The fixing structure of the lens cylinder according to the second aspect of the invention comprises: a base member; the lens cylinder in which a lens is pressed, and at least one intermediate retaining member fixed to both the lens cylinder and the base member by an adhesive, wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

According to the fixing structure of the lens cylinder of the second aspect of the present invention, the concave portion for insertion of the tool for separating the lens cylinder and the intermediate retaining member is provided in at least one of the part of the lens cylinder, to which the intermediate retaining member is mounted, and the part of the intermediate retaining member, to which the lens cylinder is mounted. Therefore, it is possible to easily remove the lens cylinder, which is adhered and fixed to the intermediate retaining member, i.e. the base member, from the base member, by inserting the tool into the concave portion.

Following are preferred embodiments (1) to (3) of the fixing structure of the lens cylinder according to the second aspect of the present invention. Any combinations thereof may be considered to be preferred ones of the second aspect of the present invention unless any contradictions occur.

(1) The number of the concave portion is smaller by one than or equal to or more than the number of the intermediate retaining member.

According to the present embodiment, the number of the concave portion provided in at least one of the part of the lens cylinder and the part of the intermediate retaining member is smaller by one than, or equal to, or more than the number of the intermediate retaining member. Therefore, it is possible to easily remove the lens cylinder adhered and fixed to the intermediate retaining member, i.e. the base member, from the base member by inserting the tool into the concave portion of the part where the lens cylinder and the intermediate retaining member are attached. Also, it is possible to remove the intermediate retaining member remained last from the lens cylinder by manual works of a worker.

(2) The concave portion is provided in an external circumferential surface of the lens cylinder, and extends along a circumferential direction of the lens cylinder.

According to the present embodiment, the concave portion is provided in the external circumferential surface of the lens cylinder and also extends along the circumferential direction of the lens cylinder. Therefore, it is possible to insert the tool into the concave portion to remove the lens cylinder from the base member. In addition, since the concave portion extends on the external circumferential surface of the lens cylinder along the circumferential direction thereof, the lens cylinder can be formed symmetrical relative to an axis of the lens cylinder. Hence, it is possible to allow the lens cylinder and the lens to be coaxial, and to mount the lens easily at a desired position.

(3) The intermediate retaining member and the lens cylinder are adhered such that a clearance is provided in the concave portion.

According to the present embodiment, the intermediate retaining member and the lens cylinder are adhered in such a manner that the clearance occurs in the concave portion. Therefore, the concave portion will not be sealed or covered by the concave portion. Hence, it is possible to insert the tool into the concave portion when removing the lens cylinder, and to easily remove the lens cylinder from the intermediate retaining member, i.e. the base member.

The second aspect of the present invention also provides a lens block for reading a reflected image of a manuscript by a photoelectric transducer. The lens block comprises a fixing structure of a lens cylinder including: a base member; the lens cylinder in which a lens is pressed, and at least one intermediate retaining member fixed to both the lens cylinder and the base member by an adhesive, wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

Following are preferred embodiments (1) to (3) of the lens block according to the second aspect of the present invention. Any combinations thereof may be considered to be preferred ones of the second aspect of the present invention unless any contradictions occur.

(1) The number of the concave portion is smaller by one than or equal to or more than the number of the intermediate retaining member.

(2) The concave portion is provided in an external circumferential surface of the lens cylinder, and extends along a circumferential direction of the lens cylinder.

(3) The intermediate retaining member and the lens cylinder are adhered such that a clearance is provided in the concave portion.

The lens block of the second aspect of the present invention comprises any one of the fixing structures of the lens cylinder according to the second aspect of the present invention described above. Therefore, it is possible to easily remove the adhered lens cylinder from the base member by inserting the tool into the concave portion.

Furthermore, the second aspect of the invention provides an image reading unit for irradiating light to a manuscript and performing photoelectric conversion of a reflected image of the manuscript by a photoelectric transducer. The image reading unit comprises a lens block having a fixing structure of a lens cylinder including: a base member; the lens cylinder in which a lens is pressed, and at least one intermediate retaining member fixed to both the lens cylinder and the base member by an adhesive, wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

Following are preferred embodiments (1) to (3) of the image reading unit according to the second aspect of the present invention. Any combinations thereof may be considered to be preferred ones of the second aspect of the present invention unless any contradictions occur.

(1) The number of the concave portion is smaller by one than or equal to or more than the number of the intermediate retaining member.

(2) The concave portion is provided in an external circumferential surface of the lens cylinder, and extends along a circumferential direction of the lens cylinder.

(3) The intermediate retaining member and the lens cylinder are adhered such that a clearance is provided in the concave portion.

The image reading unit of the second aspect of the present invention comprises any one of the lens blocks according to the second aspect of the present invention described above. Therefore, it is possible to easily remove the adhered lens cylinder from the base member by inserting the tool into the concave portion.

In addition, the second aspect of the invention provides an image forming apparatus. The image forming apparatus comprises an image reading unit having a lens block including a fixing structure of a lens cylinder including: a base member;

the lens cylinder in which a lens is pressed, and at least one intermediate retaining member fixed to both the lens cylinder and the base member by an adhesive, wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

Following are preferred embodiments (1) to (3) of the image forming apparatus according to the second aspect of the present invention. Any combinations thereof may be considered to be preferred ones of the second aspect of the present invention unless any contradictions occur.

(1) The number of the concave portion is smaller by one than or equal to or more than the number of the intermediate retaining member.
(2) The concave portion is provided in an external circumferential surface of the lens cylinder, and extends along a circumferential direction of the lens cylinder.
(3) The intermediate retaining member and the lens cylinder are adhered such that a clearance is provided in the concave portion.

The image forming apparatus of the second aspect of the present invention comprises any one of the image reading units according to the second aspect of the present invention described above. Therefore, it is possible to easily remove the adhered lens cylinder from the base member by inserting the tool into the concave portion.

In one preferred embodiment of the image forming apparatus of the second aspect of the invention, the image forming apparatus further comprises a writing unit for transcribing an image on a transfer paper based on image signals of the reflected image of the manuscript photoelectrically converted from the reflected image by the image reading unit.

According to the present embodiment, the image forming apparatus comprises the writing unit for transcribing the image on the transfer paper on the basis of the image signals of the image reflected from the manuscript photoelectrically converted by the image reading unit. Since the image forming apparatus according to the present embodiment also comprises the image reading unit according to the second aspect of the present invention described above, it is possible to easily remove the adhered lens cylinder from the base member by inserting the tool into the concave portion.

A third aspect of the present invention aims to provide a fixing structure capable of contributing for effective utilization of resources and reduction in recycling costs, a lens block having the fixing structure, an image reading unit having the lens block, an image forming apparatus having the image reading unit, a separation method of fixing structure and an intermediate retaining member.

To achieve these and other advantages and in accordance with the purpose of the invention, as embodied and broadly described herein, the third aspect of the invention provides a fixing structure. The fixing structure comprises: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member.

According to the fixing structure of the third aspect of the present invention, the notch is provided in at least one of the mounting portion of the first member and the first fixing portion of the intermediate retaining member. Therefore, it is possible to easily separate components adhered and fixed to each other only by inserting the tool into the notch and applying force in such a manner as to widen the notch.

The third aspect of the present invention provides another fixing structure. Another fixing structure according to the third aspect of the present invention comprises: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

According to another fixing structure of the third aspect of the present invention, the hole is provided in at least one of the mounting portion of the first member and the first fixing portion of the intermediate retaining member. Therefore, it is possible to easily separate the components mutually adhered and fixed only by entering the rod-like tool for separating the first member from the intermediate retaining member into the hole and inserting the tool into a back of the hole.

In one preferred embodiment of the fixing structure or the another fixing structure of the third embodiment of the invention, the intermediate retaining member comprises a material which transmits ultraviolet rays, and the intermediate retaining member is fixed to the first member by a photo-curing adhesive which cures when the ultraviolet rays are irradiated.

According to the present embodiment, the intermediate retaining member comprises the ultraviolet ray transmitting material and is fixed to the first member by the photo-curing adhesive which cures when the ultraviolet rays are irradiated thereon. Therefore, it is possible to irradiate the ultraviolet rays from above the intermediate retaining member at a portion to be adhered. Thereby, workability improves.

In addition, the third aspect of the invention provides a lens block which images a reflected image of a manuscript on a photoelectric transducer to perform photoelectric conversion of the reflected image. The lens block comprises a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member.

The third aspect of the invention provides another lens block. The lens block images a reflected image of a manuscript on a photoelectric transducer to perform photoelectric conversion of the reflected image, and comprises a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

The lens block, which images and photoelectrically converts the reflected image from the manuscript by the photoelectric transducer, according to the third aspect of the present invention comprises any one of the fixing structures of the third aspect of the present invention described above. Therefore, it is possible to provide the lens block provided with the fixing structure in which components mutually adhered and fixed can be easily separated.

In one preferred embodiment of the lens block or the another lens block of the third aspect of the invention, the first member is a base member for mounting a lens cylinder which accommodates a lens group leading the reflected image to the photoelectric transducer and a package which accommodates the photoelectric transducer, and wherein the second member is the package.

According to the present embodiment, the first member is the base member which mounts the lens cylinder for accommodating the lens group which leads the reflected image to the photoelectric transducer and the package for accommodating the photoelectric transducer, and the second member is the package. Therefore, it is possible to provide the lens block provided with the fixing structure capable of easily separating the components adhered and fixed to each other.

In one preferred embodiment of the fixing structure or another fixing structure of the third aspect of the invention, the first member is a head retaining member, and the second member is an ink jet head.

According to the present embodiment, the first member is the head retaining member whereas the second member is the ink jet head. Therefore, it is possible to provide an ink jet writing unit provided with the fixing structure which is possible to separate the components adhered and fixed to each other easily.

The third aspect of the invention further provides an image reading unit. The image reading unit reads a reflected image of a manuscript by a photoelectric transducer, and comprises a lens block having a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member.

Another image reading unit reads a reflected image of a manuscript by a photoelectric transducer, and comprises a lens block having a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

In one preferred embodiment of the image reading unit or the another image reading unit of the third aspect of the invention, the first member is a base member for mounting a lens cylinder which accommodates a lens group leading the reflected image to the photoelectric transducer and a package which accommodates the photoelectric transducer, and wherein the second member is the package.

The image reading unit according to the third aspect of the present invention comprises any one of the fixing structures, in which the separation of mutual components is easy, of the third aspect of the present invention described above, so that it is possible to easily recycle the components.

The third aspect of the invention further provides an image forming apparatus. The image forming apparatus comprises an image reading unit having a lens block including a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member.

Another image forming apparatus of the third aspect of the invention comprises an image reading unit having a lens block including a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

In one preferred embodiment of the image reading unit or the another image reading unit of the third aspect of the invention, the first member is a base member for mounting a lens cylinder which accommodates a lens group leading the reflected image to the photoelectric transducer and a package which accommodates the photoelectric transducer, and wherein the second member is the package.

The image forming apparatus according to the third aspect of the present invention comprises any one of the fixing structures of the third aspect of the present invention described above which can easily separate the mutual components. Therefore, it is possible to recycle the components easily.

The third aspect of the invention provides an image forming apparatus which comprises a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, wherein a notch for allowing a tool, for separating the first member from the intermediate retaining member, to be inserted therein is provided in at least one of a mounting portion of the first member to which the intermediate retaining member is mounted and the first fixing portion of the intermediate retaining member, and wherein the first member is a head retaining member, and the second member is an ink jet head.

The third aspect of the invention provides another image forming apparatus which comprises a fixing structure including: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, wherein a hole for allowing a tool, for separating the first member from the intermediate retaining member, to be inserted therein is provided in at least one of a mounting portion of the first member to which the intermediate retaining member is mounted and the first fixing portion of the intermediate retaining member, and wherein the first member is a head retaining member, and the second member is an ink jet head.

The image forming apparatus according to the third aspect of the present invention comprises the fixing structure of the third aspect of the present invention described above which can easily separate the mutual components. Therefore, it is possible to recycle the components easily.

The third aspect of the invention provides a method of separating a first member and a second member of a fixing structure, wherein the fixing structure includes: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member, and the method comprises: inserting the tool, by which the first member and the second member are separated when the tool is inserted into the notch, into said notch; and pressing the first member and the intermediate retaining member with the tool in such a manner as to widen the notch to separate the first member and the second member.

In the separating method according to the third aspect of the present invention, the tool is inserted into the notch. Therefore, it is possible to provide the separating method by which components adhered and fixed to each other can be easily separated.

The third aspect of the invention also provides another separation method of separating a first member and a second member of a fixing structure, wherein the fixing structure includes: a first member; a second member; and an intermediate retaining member, the fixing structure adhering and fixing the first member and the second member through the intermediate retaining member, wherein the intermediate retaining member comprises a first fixing portion mounted to the first member and a second fixing portion mounted to the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member, and the method comprises: restricting movement of one of the first member and the intermediate retaining member in which the hole is provided; inserting the tool, by which the first member and the second member are separated when the tool is inserted into the hole, into said hole; and pressing the other of the first member and the intermediate retaining member with the tool to separate the first member and the second member.

In another separating method according to the third aspect of the present invention, the tool is inserted into the hole. Therefore, it is possible to provide the separating method by which the components adhered and fixed to each other can be easily separated.

The third aspect of the invention provides an intermediate retaining member. The intermediate retaining member according to the third aspect of the invention comprises: a first fixing portion mounted to a first member; and a second fixing portion mounted to a second member, wherein a notch for allowing a tool for separation from the first member to be inserted therein is provided in the first fixing portion.

According to the intermediate retaining member of the third aspect of the present invention, the notch for inserting the tool for detachment from the first member is provided in the first fixing portion mounted to the first member. Therefore, it is possible to provide the intermediate retaining member which can easily be separated from the first member only by inserting the tool into the notch and applying force in such a manner as to widen the notch.

The third aspect of the invention further provides another intermediate retaining member. The intermediate retaining member, comprises: a first fixing portion mounted to a first member; and a second fixing portion mounted to a second member, wherein a hole for allowing a tool for separation from the first member to be inserted therein is provided in the first fixing portion.

According to another intermediate retaining member of the third aspect of the present invention, the hole for inserting the tool for detachment from the first member is provided in the first fixing portion mounted to the first member. Therefore, it is possible to provide the intermediate retaining member which can easily be separated from the first member only by introducing the tool into the hole and inserting the tool into back of the hole.

In one preferred embodiment of the intermediate retaining member or the another intermediate retaining member of the third embodiment of the present invention, the intermediate retaining member comprises a material which transmits ultraviolet rays, and is fixed to the first member by a photo-curing adhesive which cures when the ultraviolet rays are irradiated.

It is to be understood that both the foregoing general description and the following detailed description are exemplary, and are intended to provide further explanation of the invention as claimed.

The present application is based on and claims priorities from Japanese application No. 2004-321714, filed Nov. 5, 2004, No. 2004-321715, filed Nov. 5, 2004, and No. 2004-

321717, filed Nov. 5, 2004, the disclosures of those are hereby incorporated by reference herein in their entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
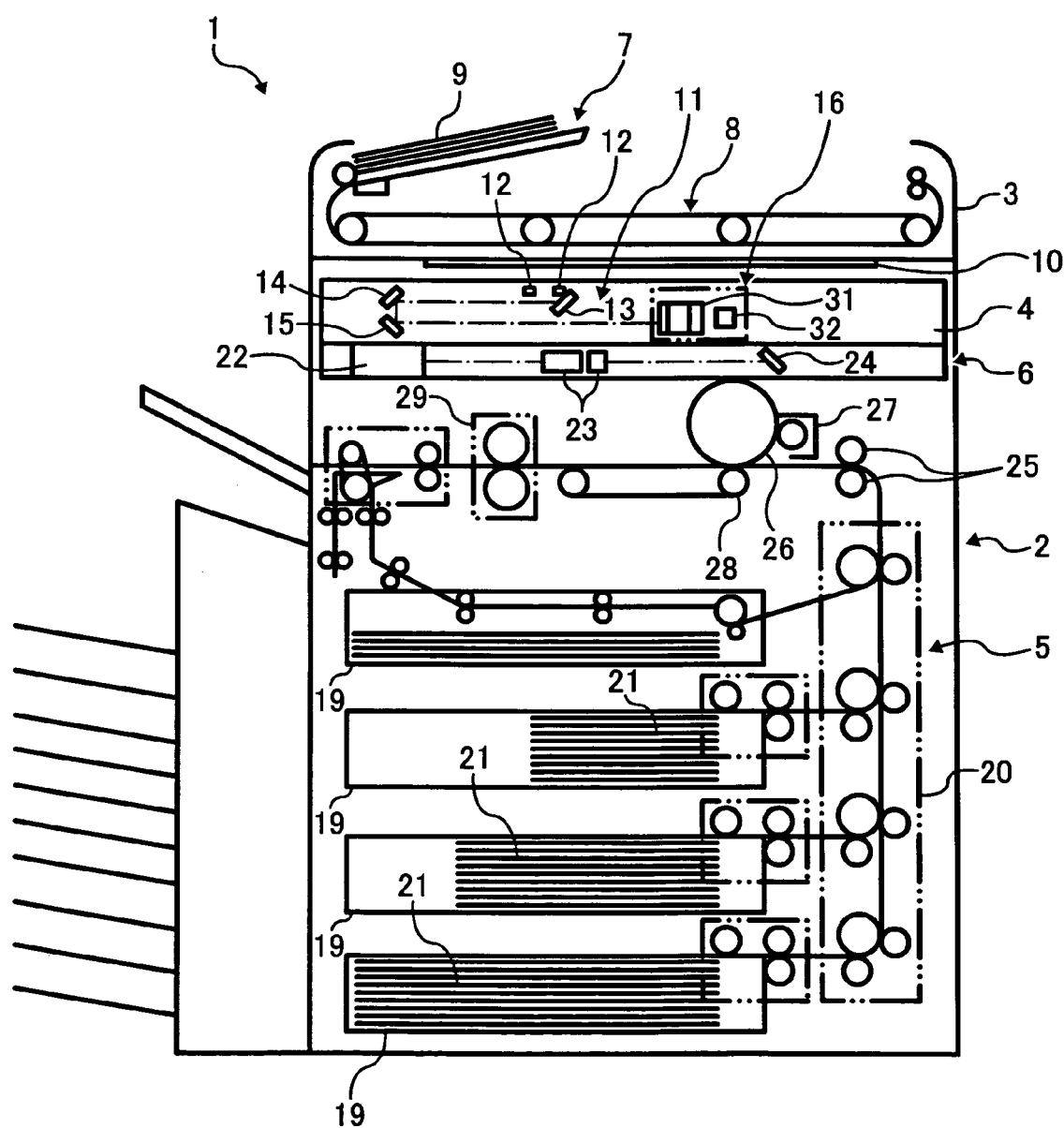
FIG. 1 is an explanatory view showing essential parts of an image forming apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

First Embodiment

Hereinafter, an image forming apparatus, an image reading unit and a lens block according to a first embodiment of the present invention will be described with reference to FIGS. 1 to 14.

Embodiment 1

FIGS. 1 to 7 show an image forming apparatus, an image reading unit and a lens block according to an embodiment 1 of the first embodiment of the present invention.

Referring to FIG. 1, the image forming apparatus 1 comprises an apparatus body 2, an automatic manuscript feeding unit 3, an image reading unit 4, a paper feeding unit 5 and a writing unit 6.

The apparatus body 2 is formed in a box-like shape for example, and is installed on a floor or the like. The apparatus body 2 accommodates the image reading unit 4, the paper feeding unit 5 and the writing unit 6.

The automatic manuscript feeding unit 3 is mounted above the apparatus body 2, and comprises a manuscript placing plate 7 and a belt feeder 8. The manuscript placing plate 7 is formed in a flat-board shape and attached above the apparatus body 2, and plural pieces of manuscripts 9 are placed on a surface of the manuscript placing plate 7. The belt feeder 8 sends the manuscripts 9 placed on the manuscript placing plate 7, one by one, onto a contact glass 10 which will be described later, and also discharges the manuscript 9, from which a reflected image is read by a lens block 16 described later, from the contact glass 10 to outside of the apparatus body 2.

The image reading unit 4 is provided at a position above the apparatus body 2 and below the automatic manuscript feeding unit 3, and comprises the contact glass 10 for placing the manuscript 9 thereon and an optical scanning system 11. The contact glass 10 is mounted on an upper surface of the apparatus body 2 in such a manner that both surfaces of the contact glass 10 are in parallel with a horizontal direction of the image forming apparatus 1. The optical scanning system 11 comprises an exposure lamp 12, a first mirror 13, a second mirror 14, a third mirror 15, the lens block 16 and so on. The optical scanning system 11 irradiates light to the manuscript 9 and performs a photoelectric conversion of the reflected image from the manuscript 9 with a line photoelectric transducer 42 which will be described later.

The exposure lamp 12 irradiates the light toward the manuscript 9 on the contact glass 10. The first mirror 13, the second mirror 14 and the third mirror 15 direct the reflected image of the manuscript 9 to the lens block 16. The exposure lamp 12 and the first mirror 13 are fixed on a first carriage which is not shown, whereas the second mirror 14 and the third mirror 15 are fixed on a not-shown second carriage. The first carriage and the second carriage are mechanically moved at a relative velocity of 2 to 1 when reading the manuscript 9 in such a manner that an optical path length is not changed. These first carriage and the second carriage of the optical scanning system 11 are moved by a scanner driving motor which is not shown.

The lens block 16 comprises an imaging lens system 31, an image sensor 32 and so on. It is to be noted here that a detailed structure of the lens block 16 will be described later. The lens block 16 reads the above-described reflected image of the manuscript 9 with the image sensor 32 and processes the reflected image read by the image sensor 32 by converting the reflected image from light signals to electric signals. The electric signals converted from the light signals are outputted to an image processing portion which is not shown. Here, a magnification of an image can be changed by moving the imaging lens system 31 and the image sensor 32 utilizing a CCD (Charge-Coupled Device) for example in left and right directions (i.e., in a horizontal direction) in FIG. 1. In other words, positions of the imaging lens system 31 and the image sensor 32 in the left and right directions in FIG. 1 are set according to the specified magnification.

The paper feeding unit 5 comprises a plurality of transfer paper accommodating portions 19 which are provided below the apparatus body 2, and a transfer paper feeding unit 20. Each of the transfer paper accommodating portions 19 accommodates a plurality of transfer papers 21. The transfer paper feeding unit 20 sends the transfer paper 21 in the transfer paper accommodating portion 19 to and between resist rollers 25, 25 which are described later. The paper feeding unit 5 sends the transfer papers 21 accommodated in the transfer paper accommodating portion 19 to the resist rollers 25, 25 one by one, i.e. toward the writing unit 6.

The writing unit 6 comprises a laser output unit 22, an imaging lens 23, a mirror 24, the resist rollers 25, a photoreceptor drum 26, a development device 27, a transcription member 28 and a fixing device 29.

Inside of the laser output unit 22 is provided with a laser diode as a laser source and a polygon mirror which is rotated at a high and constant speed by a motor. A laser beam irradiated from the laser output unit 22 is deflected by the polygon mirror rotated at the constant speed, and the deflected laser beam then goes through the imaging lens 23, reflexed by the mirror 24 and condensed on an outer circumferential surface of the photoreceptor drum 26 to be imaged. The deflected laser beam is exposed and scanned in a so-called main scan direction which is perpendicular to a rotation direction of the photoreceptor drum 26, to perform line unit recording of image signals outputted from the image processing portion which is not shown. The writing unit 6 repeats the main scan at a predetermined cycle corresponding to a rotational speed and recording density of the photoreceptor drum 26 so as to form an image on the outer circumferential surface of the photoreceptor drum 26, i.e. to form an electrostatic latent image.

The laser beam outputted from the writing unit 6 is irradiated to the photoreceptor drum 26 of an image formation system as described above, and in addition, a beam sensor (not shown) for generating main scan synchronizing signals is arranged at an irradiation position of the laser beam located adjacent to one end of the photoreceptor drum 26. The control of image recording timing in the main scan direction as well as generation of control signals for input/output of the image signals which will be described later are carried out based on the main scan synchronizing signals outputted from the beam sensor.

The resist rollers 25 sends the transfer paper 21 sent from the transfer paper accommodating portion 19 by the transfer paper feeding unit 20 between the transcription member 28 and the photoreceptor drum 26. The photoreceptor drum 26 is formed in a columnar shape or a cylindrical shape which is rotatable freely around the center of axle. A toner attaches to the electrostatic latent image which is formed by the laser output unit 22 and supported by the photoreceptor drum 26 to develop the image, and thereby, the photoreceptor drum 26 transcribes the toner image thus obtained to the transfer paper 21 located between the photoreceptor drum 26 and the transcription member 28.

The development device 27 attaches the toner onto the outer circumferential surface of the photoreceptor drum 26, and develops the electrostatic latent image on the outer circumferential surface of the photoreceptor drum 26. The transcription member 28 presses the transfer paper 21 against the outer circumferential surface of the photoreceptor drum 26 to transcribe the toner of the outer circumferential surface of the photoreceptor drum 26 on the transfer paper 21, and sends the transcribed transfer paper 21 toward the fixing device 29. The fixing device 29 fixes the toner image formed by the photoreceptor drum 26 or the like to the transfer paper 21, and discharges the fixed transfer paper 21 outside the apparatus body 2.

In the above-described image forming apparatus 1, the automatic manuscript feeding unit 3 automatically feeds and sends the manuscript 9 onto the contact glass 10 of the image reading unit 4, and the manuscript 9 in which the reading is completed is automatically discharged. Also in the image forming apparatus 1, the image reading unit 4 irradiates the light to the manuscript 9 set on the contact glass 10, and the reflected image from the manuscript 9 is read by the line photoelectric transducer 42 as a photoelectric conversion element which will be described later.

In the image forming apparatus 1 as described above, the writing unit 6 forms the image on the photoreceptor drum 26 according to the image signals of the read manuscript 9, and transcribes and fixes the image on the transfer paper 21 fed by the paper feeding unit 5. The image forming apparatus 1 further discharges the fixed transfer paper 21 outside the apparatus body 2.

Figure 2:
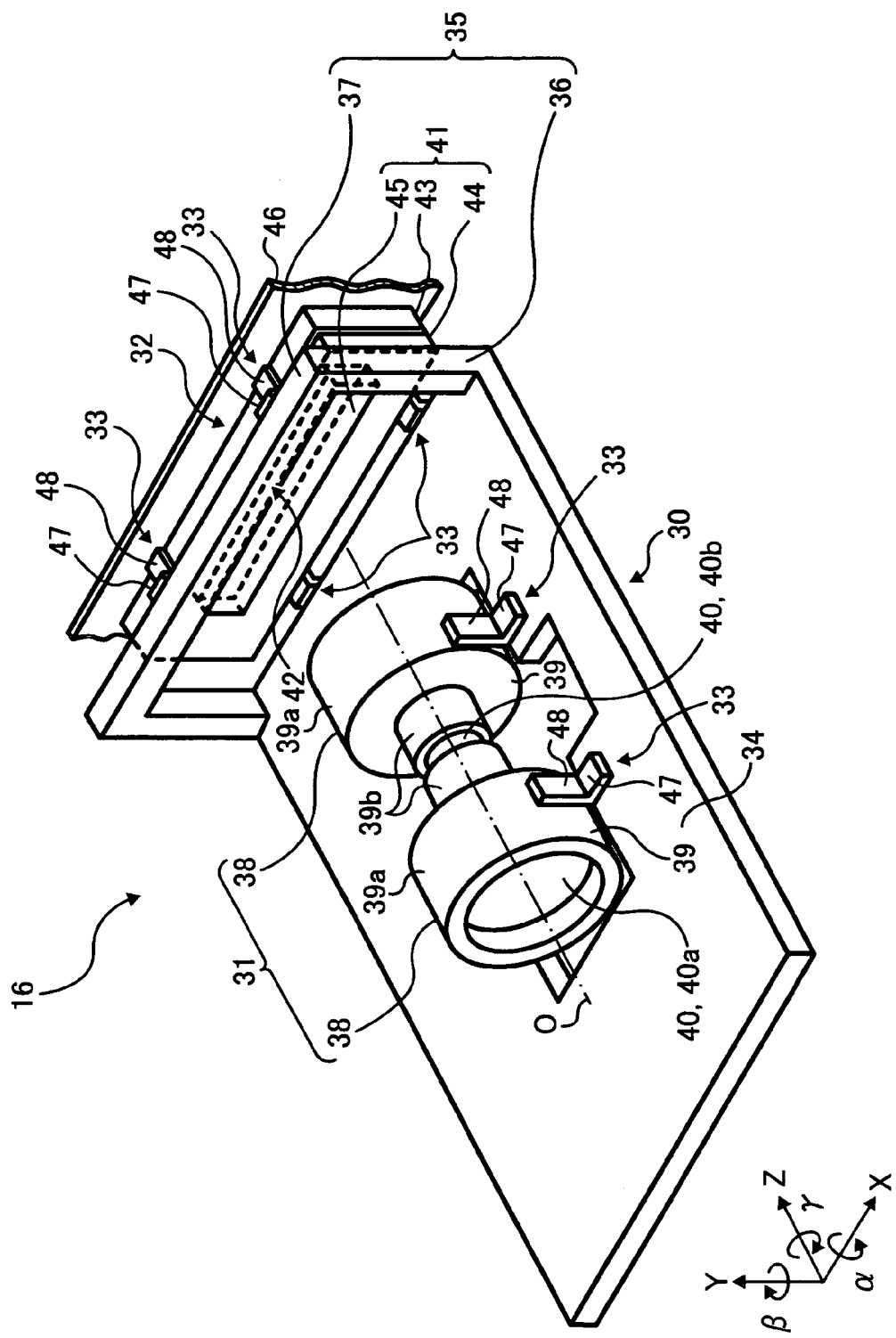
FIG. 2 is a perspective view of a lens block of the image forming apparatus shown in FIG. 1.
Figure 3:
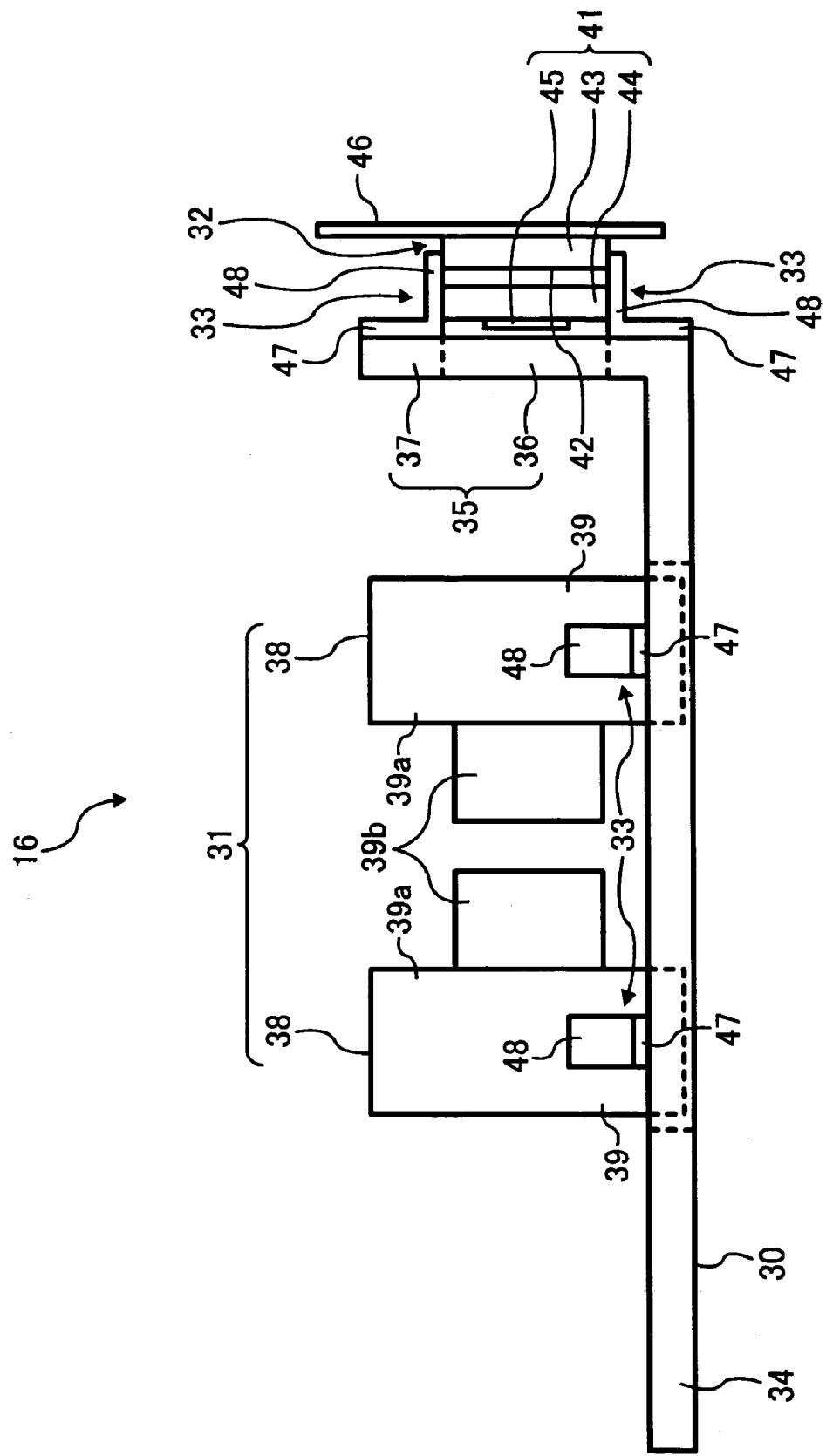
FIG. 3 is a side view of the lens block shown in FIG. 2.

Referring to FIGS. 2 and 3, the lens block 16 comprises a base member 30, the imaging lens system 31, the image sensor 32, and a plurality of intermediate retaining members 33.

The base member 30 includes a flat plate portion 34 in which a planar shape thereof is rectangular and both surfaces thereof are arranged to be in parallel with a horizontal direction. The base member 30 also includes an upright portion 35 which is erected from the flat plate portion 34. The flat plate portion 34, i.e. the base member 30 is provided freely moveably along the left and right directions in FIG. 1. Here, it is to be noted that a longitudinal direction of the flat plate portion 34 is in parallel with the left and right directions of the above-described FIG. 1.

The upright portion 35 is erected from one end of the left and right directions of FIG. 1 of the flat plate portion 34; in other words, the upright portion 35 is erected from one of the ends in the longitudinal direction of the flat plate portion 34. The upright portion 35 includes a pair of upright pillars 36 erected from both ends of a width direction of the flat plate portion 34, and a connecting pillar 37 for connecting mutual ends of the upright pillars 36 at a side distant from the flat plate portion 34. The upright portion 35 is formed in a frame-like shape.

The imaging lens system 31 includes two optical units 38. The optical units 38 are separate bodies, mutually. Each of the optical units 38 comprises a lens cylinder 39, and a lens 40 accommodated in the lens cylinder 39.

The lens cylinder 39 comprises, for example but not limited to, a synthetic resin, and is formed by a known injection molding for example. As shown in FIGS. 2 to 7, the lens cylinder 39 is provided with a large diameter portion 39a and a small diameter portion 39b, integrally. The large diameter portion 39a and the small diameter portion 39b are provided with holes 49a and 49b, respectively. Each of the large diameter portion 39a and the small diameter portion 39b are formed in a cylindrical shape in which a small outer diameter thereof is constant in an axle center direction. The small diameter portion 39b is connected to or continues to edges of the large diameter portion 39a, and internal and external diameters of the small diameter portion 39b are smaller in diameter than those of the large diameter portion 39a. In addition, each of the large diameter portion 39a and the small diameter portion 39b are formed in a shape symmetrical to an axis relative to the axle center. The large diameter portion 39a and the small diameter portion 39b are provided concentrically.

A space inside the lens cylinder 39 is divided or partitioned into a first space A and a second space B by the lens 40 pressed into the lens cylinder 39 which will be described later. More specifically, a space in the large diameter portion 39a is divided or partitioned into the first space A and the second space B by the lens 40 (hereinafter denoted as 40a) inserted into the large diameter portion 39a, while a space in the small diameter portion 39b is divided or partitioned into the first space A and the second space B by the lens 40 (hereinafter denoted as 40b) inserted into the small diameter portion 39b. Hence, the space inside of the lens cylinder 39 is provided as if the first space A and the second space B are provided alternately by the lenses 40a and 40b along an optical axis O which will be described later. Here, although in the drawings, the second space B and the first space A are formed in the space between the lenses 40a and 40b, there is no boundary between those second space B and the first space A. Accordingly, it is to be noted that the present specification describes that the first space A and the second space B are provided even though the boundary is not provided in the space between the lenses 40a and 40b.

The holes 49a and 49b penetrate a peripheral wall of the lens cylinder 39, and communicate inside and outside of the lens cylinder 39. The hole 49a extends in a direction along the optical axis O of the lens 40, and leads to the second space B in the large diameter portion 39a. In other words, the hole 49a is provided such that a tool 51 which will be described later is inserted into the lens cylinder 39 along or substantially along the optical axis O. On the other hand, the hole 49b extends along a direction perpendicular to the optical axis O of the lens 40, and leads to the first space A in the small diameter portion 39b. In other words, the hole 49b is provided such that the tool 51 described later is inserted into the lens cylinder 39 along or substantially along the direction perpendicular to the optical axis O.

Figure 5:
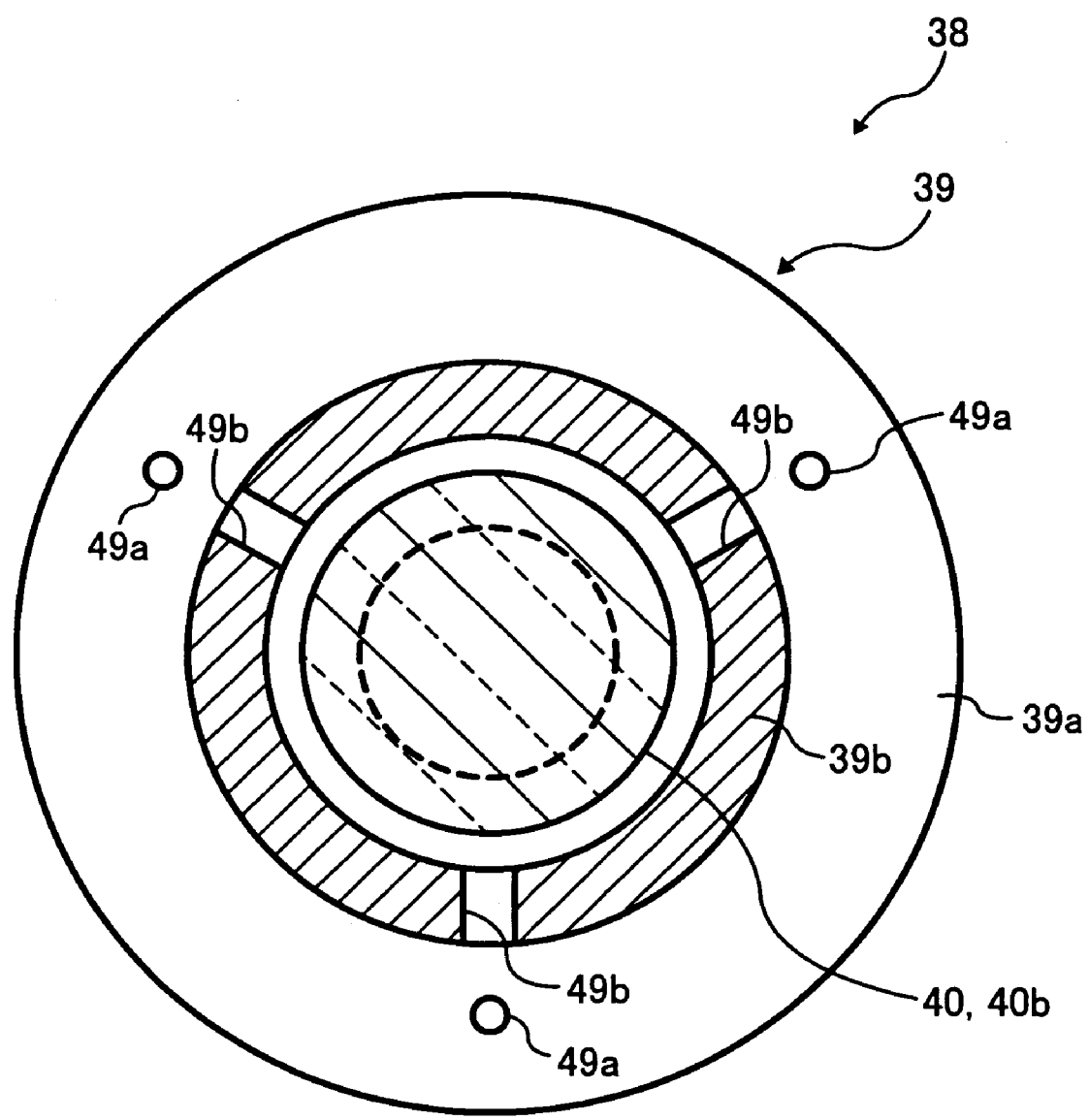
FIG. 5 is a cross-sectional view taken along a V-V line in FIG. 4.
Figure 6:
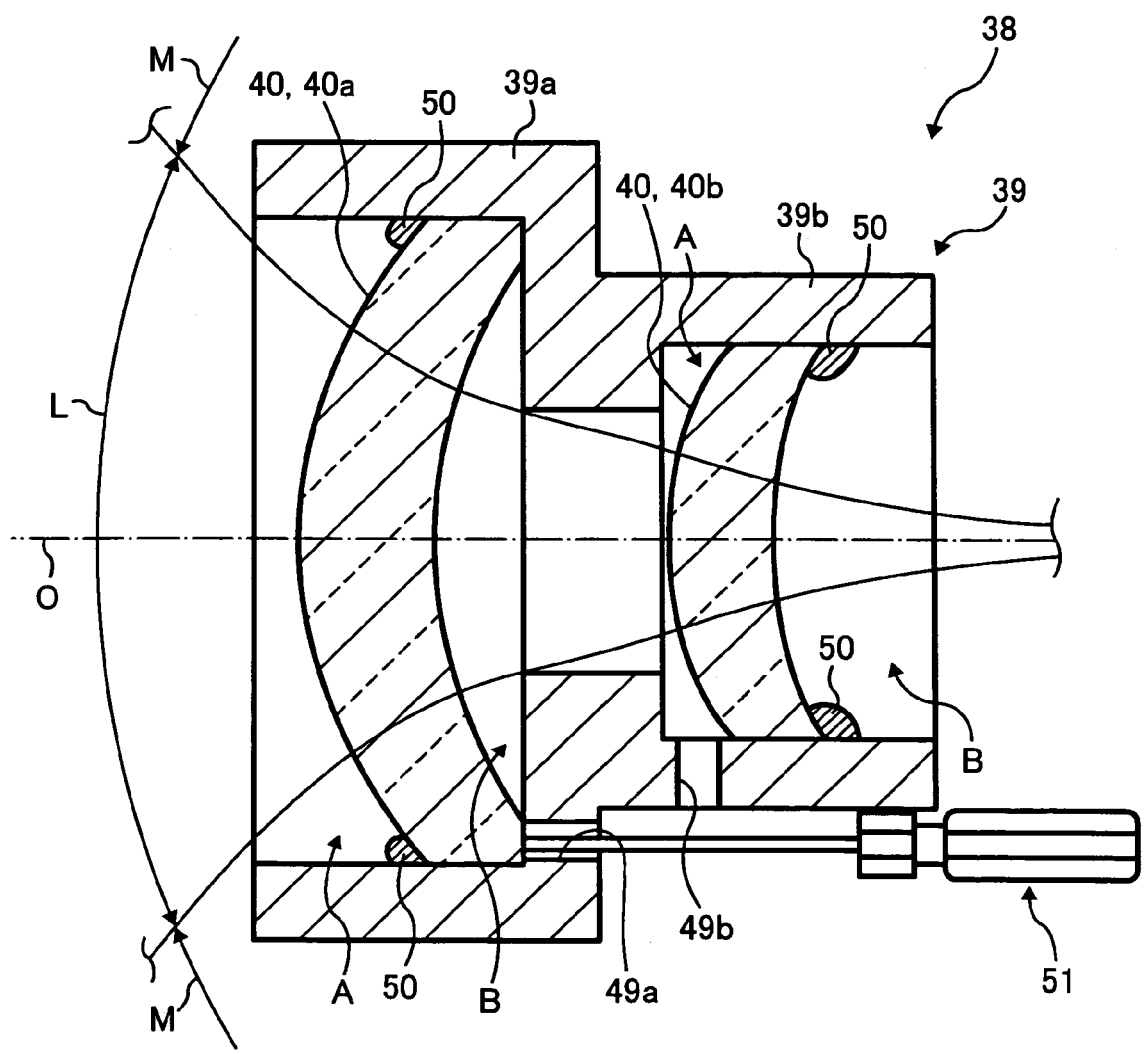
FIG. 6 is a cross-sectional view showing a state that a tool which is inserted into a hole provided in a lens cylinder along an optical-axis direction of lenses shown in FIG. 4 is contacted with the lens.

The holes 49a and 49b face to a non-transmitting region M of the lens 40 which will be described later. As shown in FIG. 5, in one embodiment, the plural holes 49a and 49b are provided at even intervals for example in the lens cylinder 39 in a circumferential direction thereof. As shown in FIG. 6, the internal diameter of the holes 49a and 49b is larger than an external diameter of the tool 51, which is, for example but not limited to, a screwdriver. The tool 51 is inserted into the holes 49a and 49b, so that the holes 49a and 49b are provided at positions where the tool 51 inserted into the hole 49a or 49b contacts with the non-transmitting region M of the lenses 40a or 40b.

The holes 49a and 49b are not filled by an adhesive 50 which will be described later, and are not sealed by the adhesive 50. A leading end of the tool 51 capable of removing the lenses 40a and 40b out of the lens cylinder 39 is possible to enter into the holes 49a and 49b. In other words, the holes 49a, 49b are openings (spaces) for inserting the tool 51.

Figure 4:
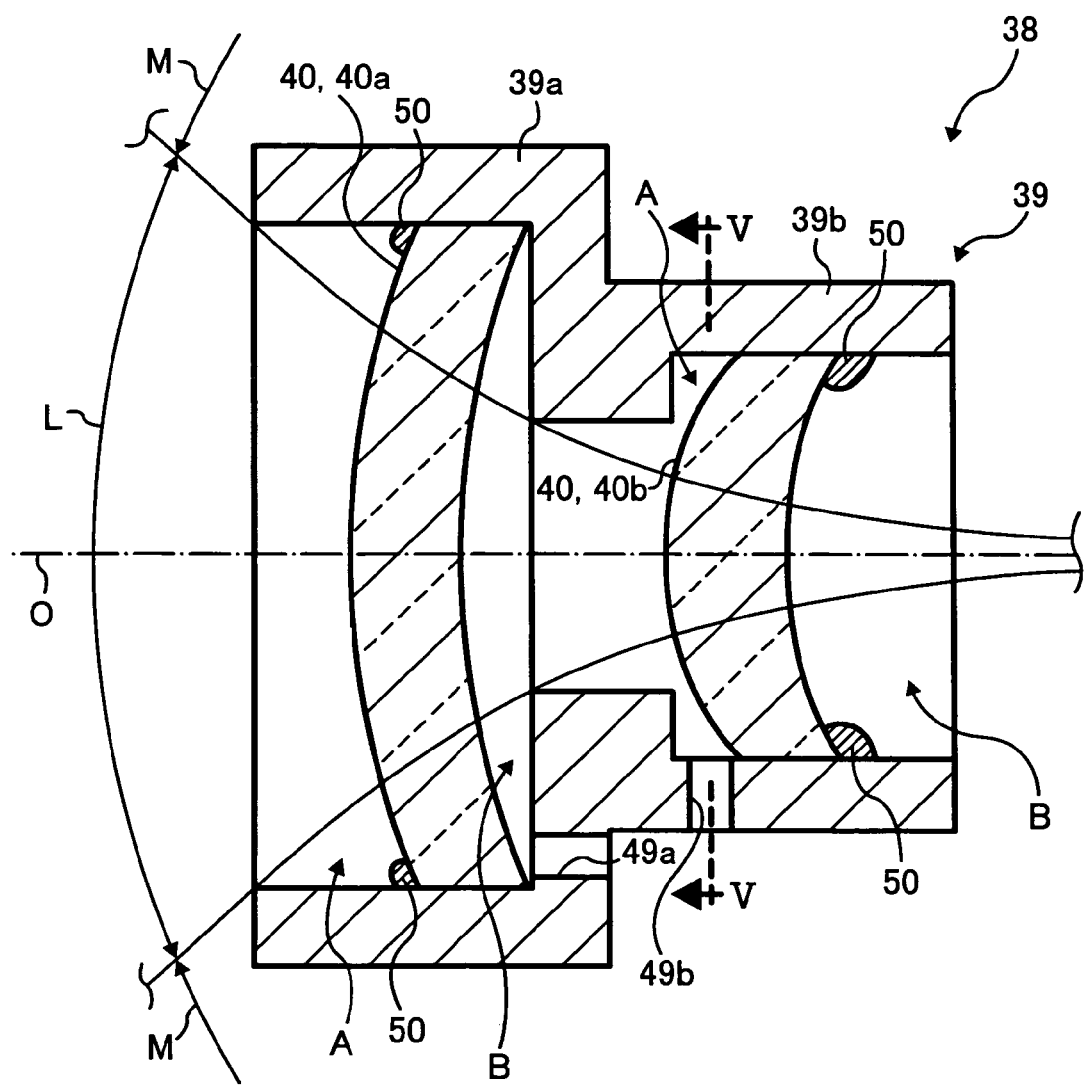
FIG. 4 is a cross-sectional view of an optical unit of the lens block shown in FIG. 3.
Figure 7:
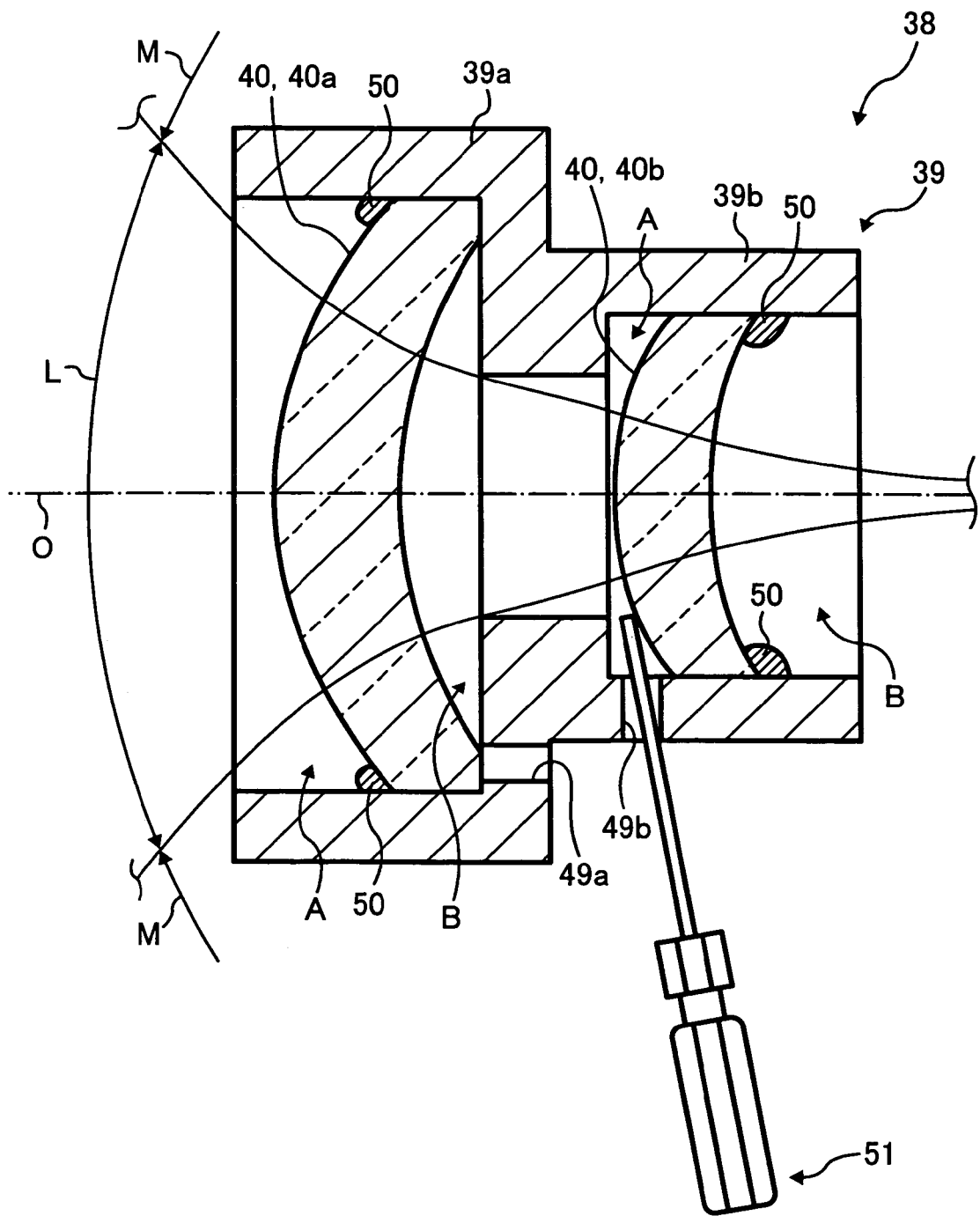
FIG. 7 is a cross-sectional view showing a state that the tool which is inserted into a hole provided in the lens cylinder along a direction perpendicular to the optical axis of the lenses shown in FIG. 4 is contacted with the lens.

At least one of the lenses 40a and 40b is being pressed into the lens cylinder 39 (in the drawings, two lenses are pressed in the lens cylinder 39). Each of the lenses 40a and 40b is structured by one piece or plural pieces of lenses. In the drawings, two lenses of lens 40a and lens 40b are provided in one lens cylinder 39. One of the lenses 40a is accommodated in the large diameter portion 39a, and the other of the lenses 40b is accommodated in the small diameter portion 39b as shown in FIGS. 4, 6 and 7.

The respective optical axes O of the lenses 40a and 40b are arranged collinear, mutually; i.e., the lenses 40a and 40b are provided concentrically to each other. The respective optical axes O of the lenses 40a and 40b are arranged collinear of the axel center of the large diameter portion 39a and the small diameter portion 39b; i.e., the axel center of the lens cylinder 39. In other words, the lenses 40a, 40b and the large diameter and small diameter portions 39a, 39b, i.e. the lens cylinder 39 are provided concentrically to each other.

Each of the lenses 40a and 40b includes a transmitting region L through which the reflected image of the manuscript 9 passes and the non-transmitting region M which the reflected image of the manuscript 9 does not pass therethrough. The transmitting region L of the lenses 40a and 40b is a part situated near the center of surfaces of the lenses 40a, 40b, whereas the non-transmitting region M of the lenses 40a and 40b is a part situated near an outer edge of the lenses 40a, 40b.

The lens 40a is pressed into the large diameter portion 39a, i.e. the lens cylinder 39 from the first space A side. On the other hand, the lens 40b is pressed into the small diameter portion 39b, i.e. the lens cylinder 39 from the second space B side. More specifically, the lenses 40a and 40b are pressed into the lens cylinder 39 from either one of the first space A and the second space B.

Referring to FIG. 4, the adhesive 50 for preventing the lens from coming off from the lens cylinder 39 is filled in the outer edge of the lens 40a at the non-transmitting region M on the first space A side as well as in an inner circumferential surface of the large diameter portion 39a on the first space A side. Also, as shown in FIG. 4, the adhesive 50 is filled in the outer edge of the lens 40b at the non-transmitting region M on the second space B side and in the inner circumferential surface of the small diameter portion 39b on the second space B side. The adhesive 50 cures to adhere the lens cylinder 39 and the lens 40a, so as to prevent the lens 40a from coming off from inside of the lens cylinder 39. Similarly, the adhesive 50 cures to adhere the lens cylinder 39 and the lens 40b so as to prevent the lens 40b from coming off from the lens cylinder 39. Accordingly, the lens cylinder 39 and the lenses 40a, 40b are adhered by the adhesive 50, and at the same time, the lenses 40a and 40b are adhered to the lens cylinder 39 by the adhesive 50 provided at positions different to those of the holes 49a, 49b.

The two optical units 38 are disposed in such a manner that the optical axes thereof are positioned collinearly to each other. The lens cylinder 39, or in other words each of the optical unit 38, is mounted on the flat plate portion 34 of the base member 30 through the intermediate retaining member 33. The imaging lens system 31, or in other words the lens block 16 which is structured as described above images the reflected image of the manuscript 9 on the line photoelectric transducer 42 of the image sensor 32.

The image sensor 32 comprises a package 41 and the line photoelectric transducer 42 as the photoelectric conversion element. The package 41 includes a base 43, a wind frame 44 and a sealing glass 45. The base 43 and the wind frame 44 comprise, for example but not limited to, ceramics. The base 43 is formed in a plate-like shape, and the line photoelectric transducer 42 is formed on a surface thereof. The wind frame 44 is formed in a frame-like shape, and is fixed to the base 43 with an adhesive in such a manner as to overlap with an outer edge of the base 43. The sealing glass 45 is formed in a plate-like shape, and an outer edge thereof is fixed to the wind frame 44 with the adhesive in such a manner as to coincide with the wind frame 44. The package 41 covers the line photoelectric transducer 42 by the base 43, the wind frame 44 and the sealing glass 45. In addition, the package 41 is mounted to a printing wiring board 46 for example.

The line photoelectric transducer 42 is structured by, for example but not limited to, a PD (Photo Diode) as a photoelectric conversion element and a CCD (Charge-Coupled Device) as a charge-transport element which are arranged in the straight lines. A longitudinal direction of the line photoelectric transducer 42 is in parallel with the main scan direction.

The image sensor 32 includes an electrode, a lead wire and so for electrically connecting a conductor pattern of the printing wiring board 46 with an electrode for example of the line photoelectric transducer 42 to each other, that are provided on the package 41. Also, the image sensor 32 is attached to the upright portion 35 of the base member 30 through the intermediate retaining member 33 in such a manner that the sealing glass 45 faces the imaging lens system 31 through inside of the upright portion 35.

The intermediate retaining member 33 comprises, for example but not limited to, a synthetic resin which transmits only transparent light, and is provided with a first mounting portion 47 and a second mounting portion 48, integrally. Each of the first mounting portion 47 and the second mounting portion 48 are formed in a plate-like shape. The second mounting portion 48 is erected from an edge of the first mounting portion 47, and an angle between the first mounting portion 47 and the second mounting portion 48 is, for example but not limited to, 90 degrees as shown in the drawings.

In the intermediate retaining member 33, the first mounting portion 47 is overlapped with the base member 30 whereas the second mounting portion 48 is overlapped with the lens cylinder 39 and the package 41 of the image sensor 32. In addition, a photo-curing adhesive which cures when light such as ultraviolet rays are irradiated is filled between the first or the second mounting portion 47, 48 and the base member 30, the lens cylinder 39 or the package 41 of the image sensor 32, so that the lens cylinder 39, i.e. the imaging lens system 31 and the package 41, i.e. the image sensor 32 are mounted on the base member 30. When they are mounted on the base member 30, the optical axes O (shown by a dashed line in FIG. 2) of the imaging lens system 31 and the image sensor 32 are positioned on the same line.

Next, procedures of taking out the lens 40 of the optical unit 38 from the lens cylinder 39 will be described hereinafter. Referring to FIG. 6, when removing the lens 40a from the large diameter portion 39a, i.e. the lens cylinder 39, the tool 51 is inserted into the hole 49a provided in the large diameter portion 39a of the lens cylinder 39 to insert the leading end of the tool 51 into the second space B. Then, the leading end of the inserted tool 51 is contacted with the non-transmitting region M of the lens 40. Thereafter, the leading end of the tool 51 is moved from the second space B to the first space A so that the leading end of the tool 51 presses the non-transmitting region M of the lens 40a. Hence, the lens 40a is deviated from the second space B toward the first space A. Thereby, the lens 40a is removed from the large diameter portion 39a of the lens cylinder 39.

Referring to FIG. 7, when removing the lens 40b from the small diameter portion 39b, i.e. the lens cylinder 39, the tool 51 is inserted into the hole 49b provided in the small diameter portion 39b of the lens cylinder 39 to insert the leading end of the tool 51 into the second space B. Then, the leading end of the inserted tool 51 contacts with the non-transmitting region M of the lens 40b. Then, the tool is rotated so that a base end of the tool 51 goes closer to the large diameter portion 39a. Thereafter, the leading end of the tool 51 is pushed into a position between an edge of the hole 49b on the lens 40b side and the non-transmitting region M of the lens 40b, and then the leading end of the tool 51 is moved from the second space B to the first space A so as to allow the leading end of the tool 51 to press the non-transmitting region M of the lens 40*b*. Accordingly, the lens 40*b* is deviated from the second space B toward the first space A, thereby removing the lens 40*b* from the lens cylinder 39.

At least a part of the tool 51 such as the leading end is possible to enter into the lens cylinder 39 through the hole 49*a* or the hole 49*b*, and the at least the part of the tool 51 is possible to separate the lens 40*a* or the lens 40*b* from the lens cylinder 39 when at least the part of the tool 51 is inserted into the lens cylinder 39 through the hole 49*a* or 49*b*.

According to the present embodiment, the lens is pressed into lens cylinder 39 from one side of the first space A and the second space B, and the other side of the first space A and the second space B of the lens is pressed by the tool 51 inserted from the hole 49*a* or the hole 49*b* provided in the lens cylinder 39, thereby the lenses 40*a* and 40*b* can easily be removed from the lens cylinder 39. In addition, hence, it is possible to easily reuse the removed lens or collect resources separately.

In the present embodiment, the hole 49*a* of the lens cylinder 39 is provided along the optical axis direction O of the lens 40*a*. Accordingly, the lens 40*a* can easily be taken out from the lens cylinder 39 by contacting the tool 51, inserted from the hole 49*a*, to the other of the first space A and the second space B side of the lens 40*a* which is inserted into the lens cylinder 39 from one of the first space A and the second space B, and then pushing the lens 40*a* along the optical axis direction O with the tool 51.

Also in the present embodiment, the hole 49*b* of the lens cylinder 39 is provided along the direction perpendicular to the optical axis direction O of the lens 40*b*. The tool 51 inserted from the hole 49*b* is made to contact with the lens 40*b* pressed in the lens cylinder 39 from one of the first space A and the second space B, and the lens 40*b* is pressed by the leading end of the tool 51 along the optical axis direction O, and thereby, the lens 40*b* deviates from the second space B toward the first space A. Accordingly, it is possible to take out the lens 40*b* from the lens cylinder 39, easily.

In addition, the holes 49*a* and 49*b* face to the non-transmitting region M of the lenses 40*a* and 40*b*, so that the tool 51 inserted into the lens cylinder 39 contacts with the non-transmitting region M of the lenses 40*a*, 40*b*. Accordingly, since the tool 51 contacts with the non-transmitting region M of the lens 40*a*, 40*b*, it is possible to remove the lenses 40*a* and 40*b* from the lens cylinder 39 without damaging the transmitting region L of the lenses 40*a*, 40*b* pressed in the lens cylinder 39. Therefore, it is possible to reuse the removed lenses 40*a*, 40*b* and to separately collect the resources.

In one embodiment, the number of holes 49*a*, 49*b* provided in the lens cylinder 39 is smaller by one than or equal to or more than the number of lenses 40*a*, 40*b* provided in the lens cylinder 39. In this case, the lenses 40*a*, 40*b* can be removed outside of the lens cylinder 39 by striking the tool 51 inserted into the lens cylinder 39 against the lens 40*a* or 40*b* which is remained last in the lens cylinder 39 and for which the hole 49*a* or 49*b* for insertion of the tool 51 is not provided. Hence, it is possible to remove all of the lenses 40*a*, 40*b* pressed into the lens cylinder 39 from the lens cylinder, easily.

Also, according to one embodiment, the plural holes 49*a*, 49*b* are provided in the lens cylinder 39 in the circumferential direction around the optical axis O of the lenses 40*a*, 40*b*. This makes it possible to remove the lenses 40*a*, 40*b* from the lens cylinder 39 without slanting any of the lenses 40*a*, 40*b*, by inserting the plurality of tools 51 for taking out the lenses 40*a*, 40*b* at once from the holes 49*a* or/and 49*b* provided several on the lens cylinder 39, and pressing the lenses 40*a* or/and 40*b* with those tools 51. Thereby, it is possible to easily remove the lenses 40*a*, 40*b* pressed into the lens cylinder 39 from the lens cylinder 39 without making the lenses 40*a*, 40*b* to be caught by the lens cylinder 39 or damaging/scratching the lenses 40*a*, 40*b*. Therefore, it is possible to reuse the removed lenses 40*a*, 40*b* and perform separate collection of the resources.

The lens cylinder 39 and the lenses 40*a*, 40*b* are adhered by the adhesive 50 disposed at the positions different from those of the holes 49*a*, 49*b* for insertion of the tool 51, and which prevents the lenses 40*a*, 40*b* from coming off from the lens cylinder 39. This makes it possible to avoid the lenses 40*a*, 40*b* to come off from the lens cylinder 39 by vibration for example. Also, the tool 51 can be inserted into the holes 49*a*, 49*b* when removing the lenses 40*a*, 40*b* from the lens cylinder 39 by adapting the holes 49*a*, 49*b* not to be covered by the adhesive 50. Thereby, it is possible to remove the lenses 40*a*, 40*b* from the lens cylinder 39, easily.

Embodiment 2

Next, a lens block according to an embodiment 2 of the first embodiment of the present invention will be described with reference to FIG. 8. In the present embodiment, components same or equivalent to those described in the above embodiment 1 are attached with same reference numbers, and overlapping description will be omitted.

Figure 8:
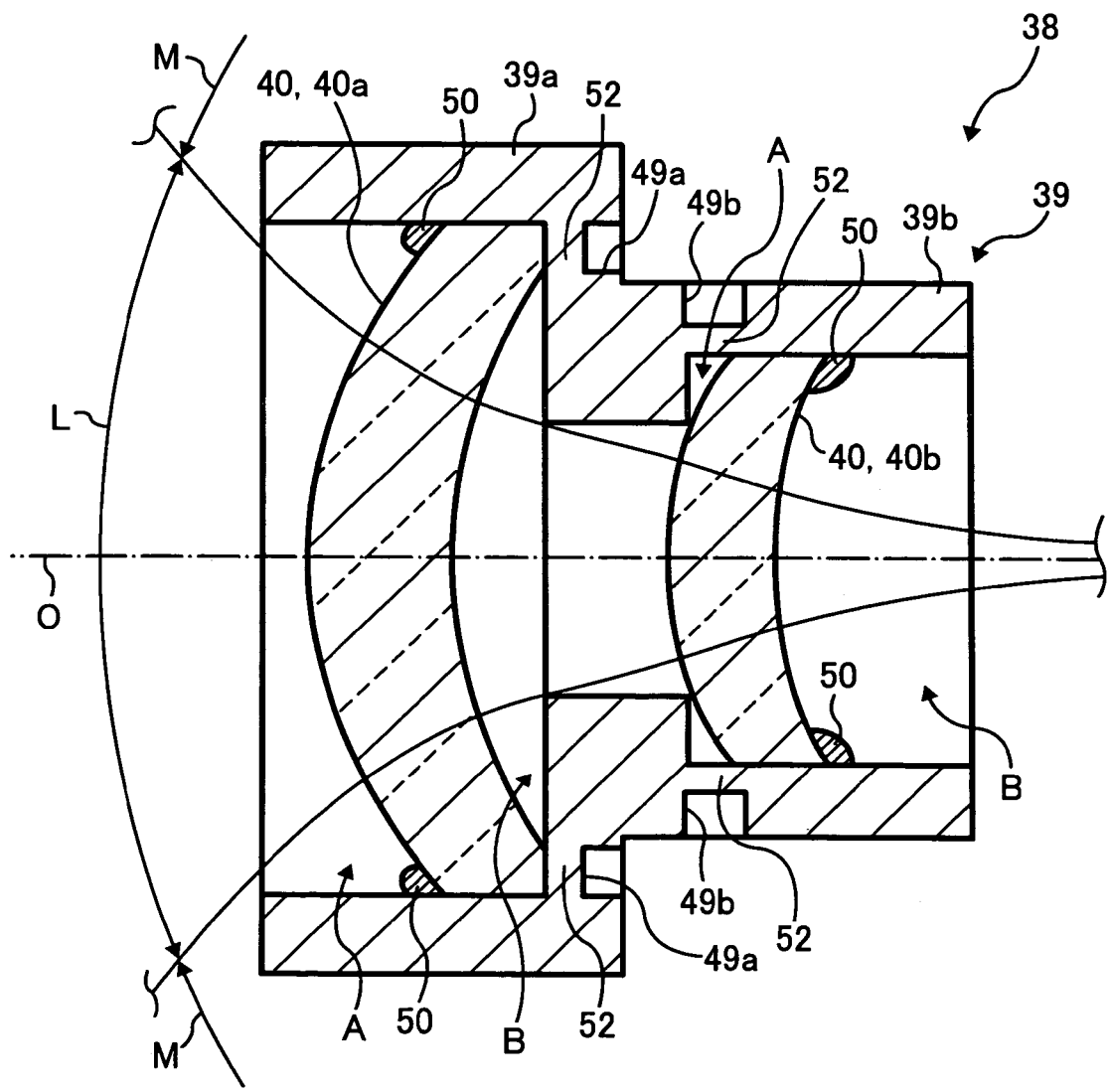
FIG. 8 is a cross-sectional view showing an optical unit according to an embodiment 2 of the first embodiment of the present invention.
Figure 9:
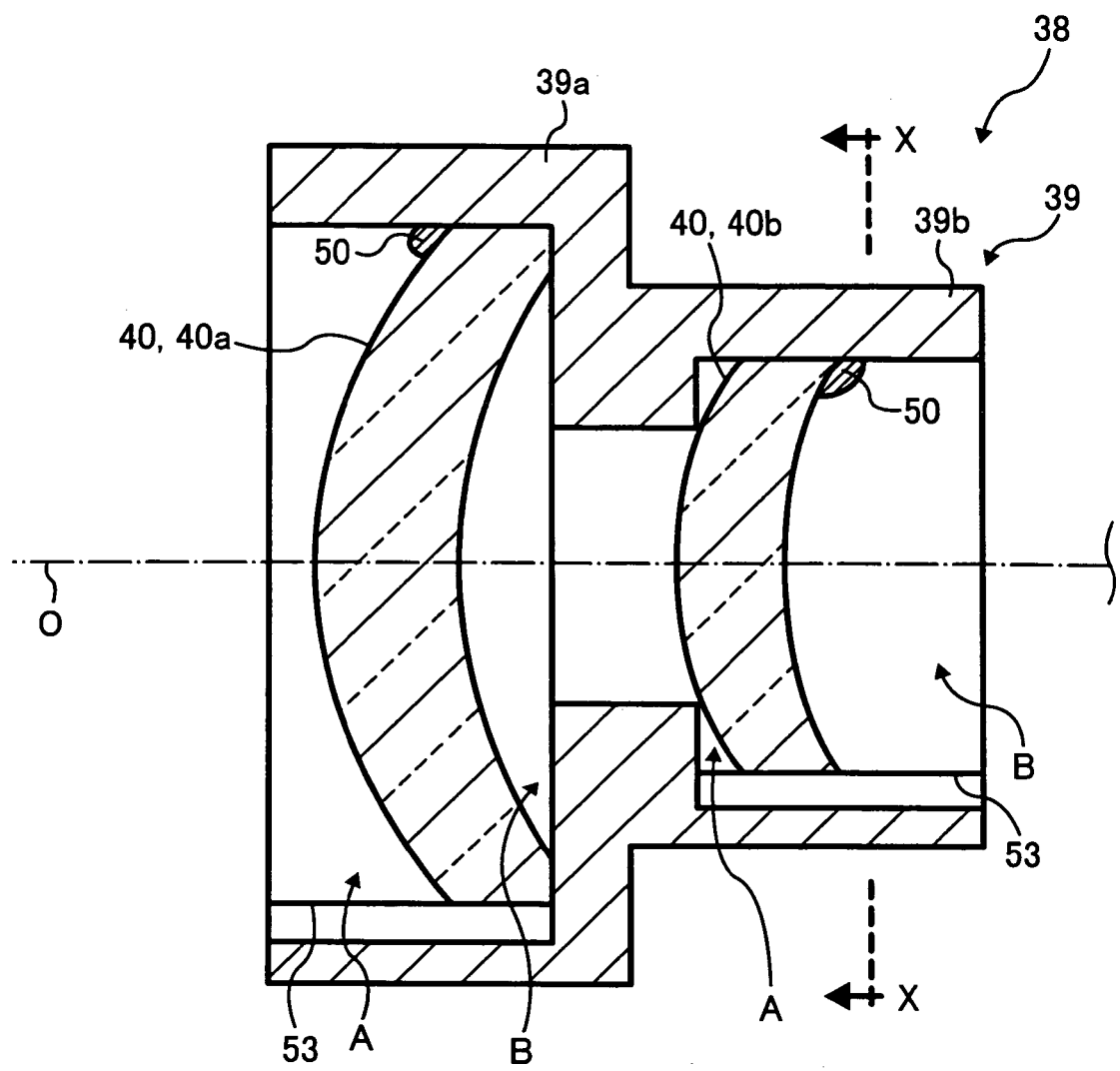
FIG. 9 is a cross-sectional view showing an optical unit according to an embodiment 3 of the first embodiment of the present invention.

Referring to FIG. 8, in the present embodiment, the holes 49*a* and 49*b* are sealed by a thin-walled portion or a blind hole 52. A thickness of the thin-walled portion 52 is thinner than that of the peripheral wall of the lens cylinder 39. The thin-walled portion 52 is flush with the inner circumferential surface of the lens cylinder 39, and is formed concave from the outer circumferential surface of the lens cylinder 39. Hence, the thin-walled portion 52 breaks by striking the tool 51 into the hole 49*a* or 49*b*, thereby the hole 49*a* or 49*b* is formed in the lens cylinder 39 which is unsealed by the thin-walled portion 52.

Next, a procedure of removing the lens 40 pressed in the lens cylinder 39 from the lens cylinder 39 will be described. First, the tool 51 is struck against the thin-walled portion 52, thereby the hole 49*a* or 49*b* which is similar to that in the embodiment 1 is formed in the lens cylinder 39. Then, as similar to the embodiment 1, the tool 51 is inserted into the hole 49*a* or 49*b* and the lens 40*a* or 40*b* is pushed by the tool 51. Thus, the lens 40*a* is deviated from the second space B toward the first space A, whereas the lens 40*b* is deviated from the first space A to the second space B. Hence, the lenses 40*a*, 40*b* are removed from the lens cylinder 39.

According to the present embodiment, each of the holes 49*a*, 49*b* is sealed by the thin-walled portion 52. The thin-walled portion 52 can be broken through by striking the tool 51 against the thin-walled portion 52 when removing the lenses 40*a*, 40*b* from the lens cylinder 39, thereby the holes 49*a*, 49*b* for allowing the tool 51 to be inserted therein are formed in the lens cylinder 39. The lenses 40*a*, 40*b* can be easily removed from the lens cylinder 39 by contacting the tool 51 inserted from the thus formed holes 49*a*, 49*b* with the lenses 40*a*, 40*b*. Also, since the holes 49*a*, 49*b* are not formed on and opened in the lens cylinder 39 in the beginning, it is possible to avoid attachment of dust or moisture on the lenses 40*a*, 40*b*.

Embodiment 3

Next, a lens block according to an embodiment 3 of the first embodiment of the present invention will be described with reference to FIGS. 9 to 12. In the present embodiment, components same or equivalent to those described in the above embodiment 1 are attached with same reference numbers, and overlapping description will be omitted.

Figure 10:
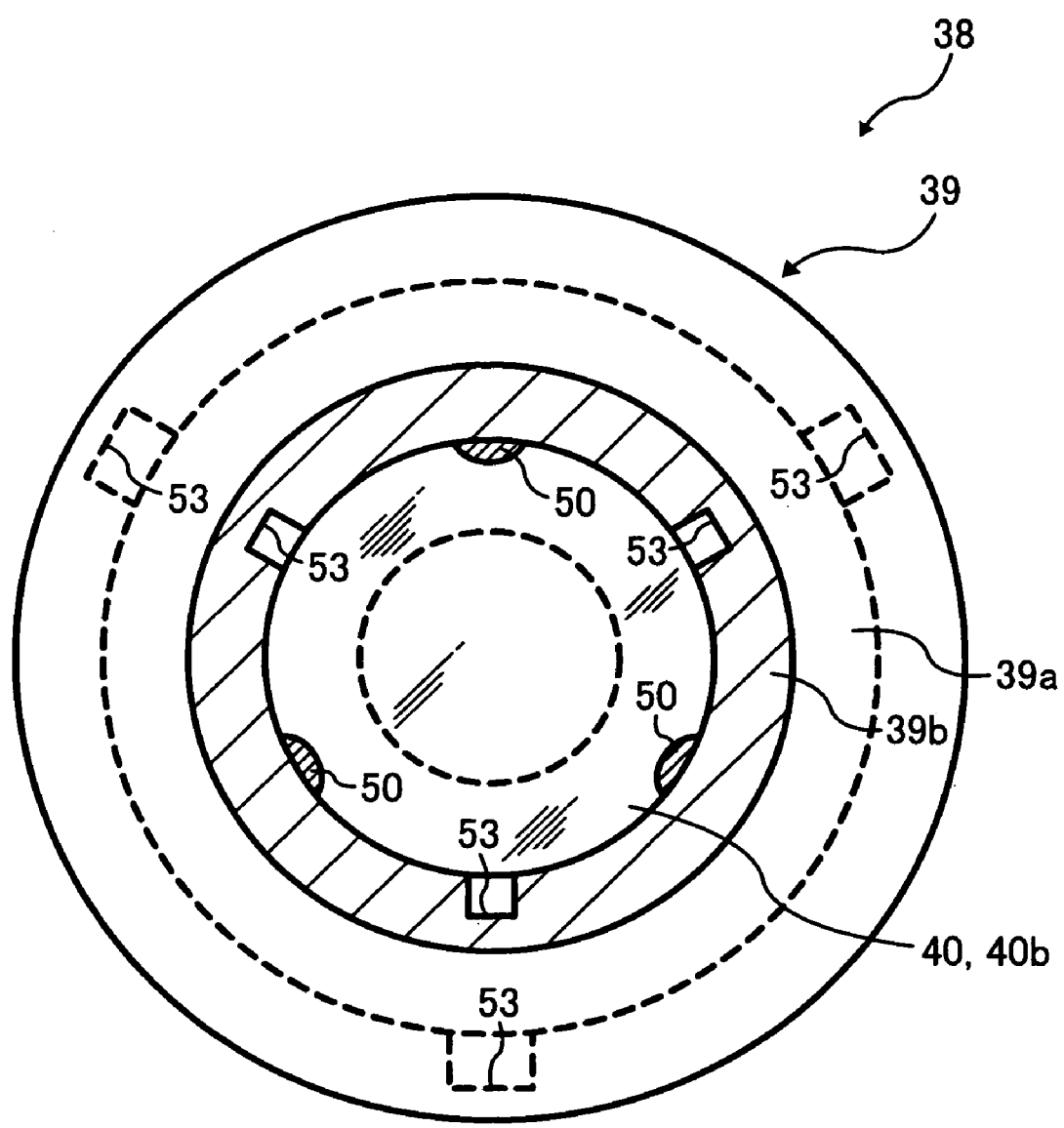
FIG. 10 is a cross-sectional view taken along an X-X line shown in FIG. 9.

In the present embodiment, a groove 53 is provided instead of the hole 49a, 49b. The groove 53 is provided on both of the large diameter portion 39a and the small diameter portion 39b, and extends in parallel with (and along) the optical axis O of the lens 40. The grooves 53 open on the edges of the large diameter portion 39a and the small diameter portion 39b which form openings of the large diameter portion 39a and the small diameter portion 39b. The grooves 53 are formed concave from the inner circumferential surface of the lens cylinder 39. Each of the grooves 53 is provided throughout from the first space A to the second space B. In other words, the groove 53 communicates the first space A and the second space B, mutually. As shown in FIG. 10, in one embodiment, the plural grooves 53 are provided in the lens cylinder 39 at even intervals in the circumferential direction. Referring to FIG. 6, a width of each of the groove 53 is wider than the external diameter of the tool 51. The tool 51 is inserted into the groove 53, so the groove 53 is provided at a position where the tool 51 inserted into the groove 53 contacts with the non-transmitting region M of the lens 40a, 40b.

Each of the grooves 53 is not filled by the adhesive 50 nor is it sealed by the adhesive 50. The leading end of the tool 51 capable of removing the lenses 40a and 40b out of the lens cylinder 39 is possible to enter into the groove 53. In other words, the groove 53 is an opening (space) for inserting the tool 51. In the present embodiment, the adhesive 50 is provided at a position different from that of the groove 53.

Figure 11:
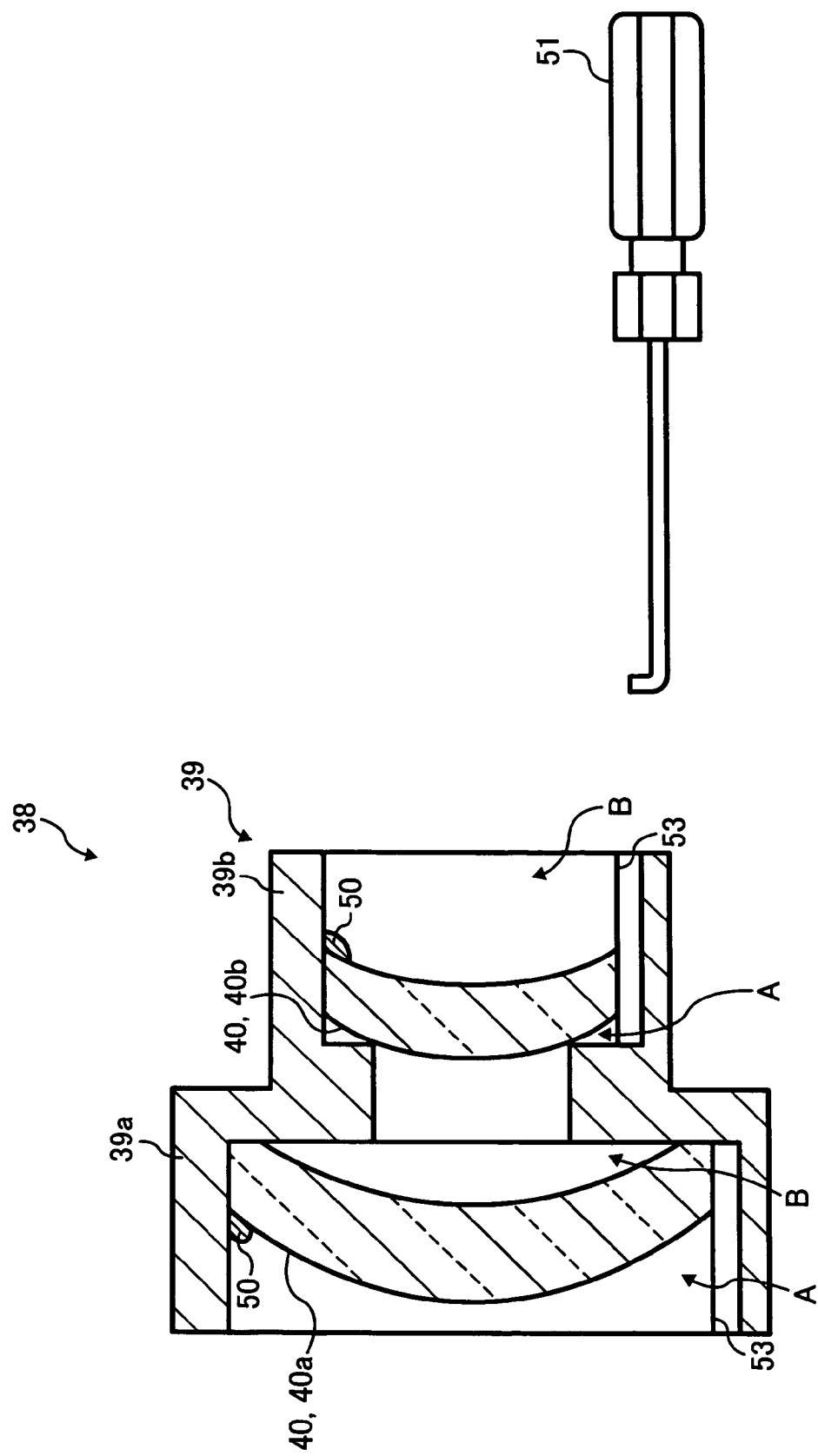
FIG. 11 is a cross-sectional view showing a state of taking out the lens in a small-diameter portion of the lens cylinder shown in FIG. 9 with the tool.

Next, procedures for taking out the lenses 40a, 40b which are pressed in the lens cylinder 39, from the lens cylinder 39 will be described hereinafter. Referring to FIG. 11, the leading end of the tool 51 is inserted into the groove 53 provided in the small diameter portion 39b of the lens cylinder 39, and directly the leading end of the tool 51 is inserted into the first space A through the second space B. Then, the leading end of the inserted tool 51 is hitched to the non-transmitting region M of the lens 40b. Thereafter, the tool 51 is moved from the first space A toward the second space B such as by pulling the tool 51 outward from inside of the lens cylinder 39, so that the leading end of the tool 51 pulls the non-transmitting region M of the lens 40 outwardly from the lens cylinder 39. Thereby, the lens 40b is pulled from the first space A toward the second space B side. Hence, the lens 40b is removed from the lens cylinder 39.

Figure 12:
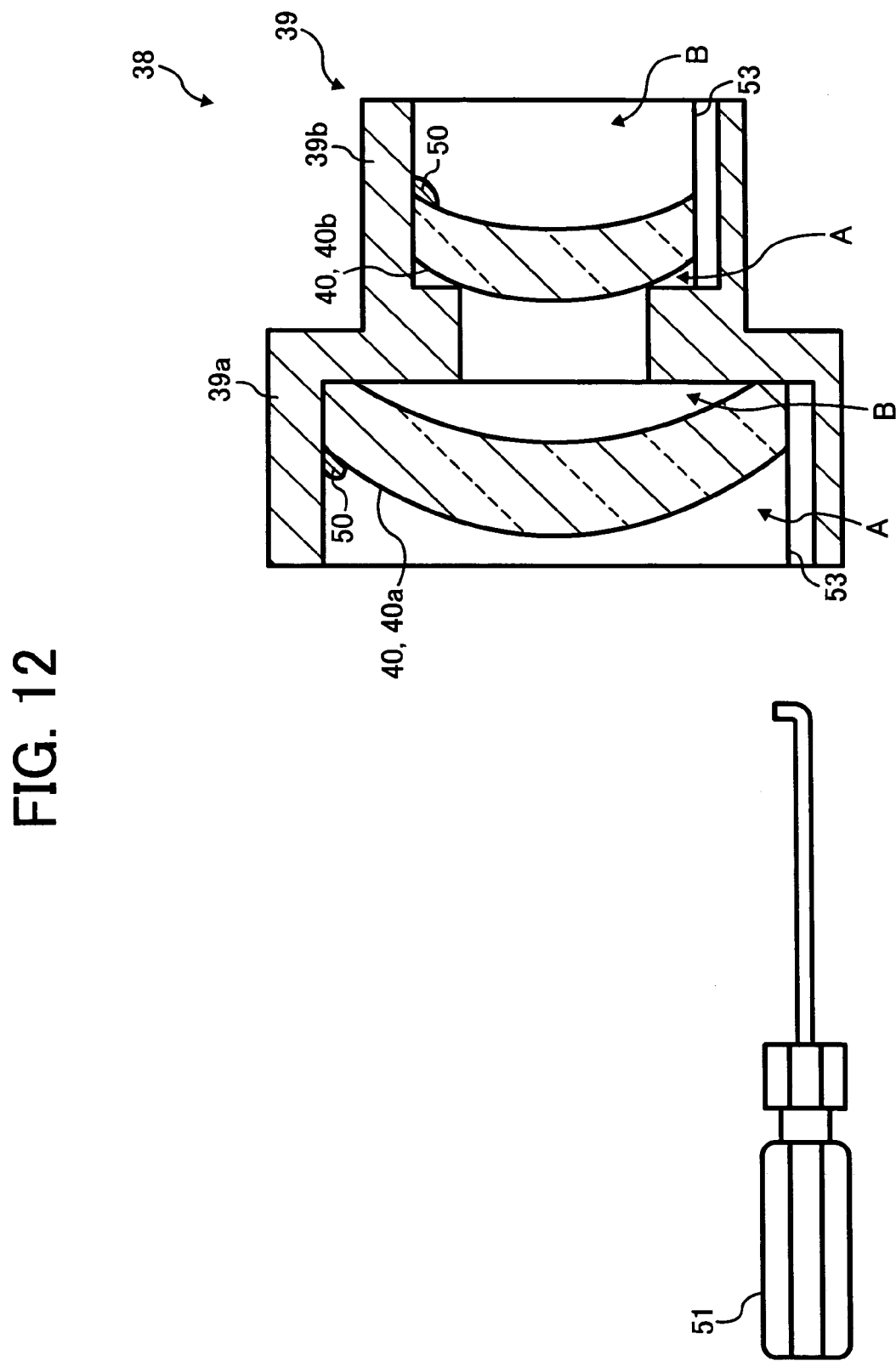
FIG. 12 is a cross-sectional view showing a state of taking out the lens in a large-diameter portion of the lens cylinder shown in FIG. 9 with the tool.

Also, as shown in FIG. 12, the leading end of the tool 51 is inserted into the groove 53 provided in the large diameter portion 39a of the lens cylinder 39, and the leading end of the tool 51 is directly inserted into the second space B through the first space A. Then, the leading end of the inserted tool 51 is hitched to the non-transmitting region M of the lens 40a, and thereafter, the tool 51 is moved from the second space B toward the first space A by pulling the tool 51 outward from the lens cylinder 39 for example. Accordingly, the leading end of the tool 51 pulls the non-transmitting region M of the lens 40 outwardly from the lens cylinder 39. Thereby, the lens 40a is pulled from the second space B toward the first space A side and the lens 40a is removed from the lens cylinder 39.

According to the present embodiment, the lens 40a or 40b is pressed into the lens cylinder 39 from one side of the first space A and the second space B, and the other side of the first space A and the second space B of the lens 40a or 40b is hitched by the tool 51 inserted from the groove 53 provided in the lens cylinder 39, and is further pulled by the tool 51, so that the lenses 40a and 40b can easily be removed from the lens cylinder 39. In addition, it is possible to take the lenses 40a and 40b out of the lens cylinder 39 even when the outer surface in the circumferential direction of the lens cylinder 39 is covered by other structural body.

Also, the plurality of grooves 53 are provided in the lens cylinder 39 in the circumferential direction around the optical axis O of the lenses 40a, 40b. Accordingly, it is possible to remove the lenses 40a, 40b from the lens cylinder 39 without slanting any of the lenses 40a, 40b, by simultaneously inserting the plurality of tools 51 for taking out the lenses 40a, 40b from the grooves 39 provided several on the lens cylinder 39, hitching the lenses 40a or/and 40b and further pulling the lenses 40a or/and 40b with those tools 51. Thereby, it is possible to easily remove the lenses 40a, 40b pressed in the lens cylinder 39 from the lens cylinder 39 without making the lenses 40a, 40b to be caught by the lens cylinder 39 or damaging/scratching the lenses 40a, 40b. Therefore, it is possible to reuse the removed lenses 40a, 40b and separately collect the resources.

Figure 13:
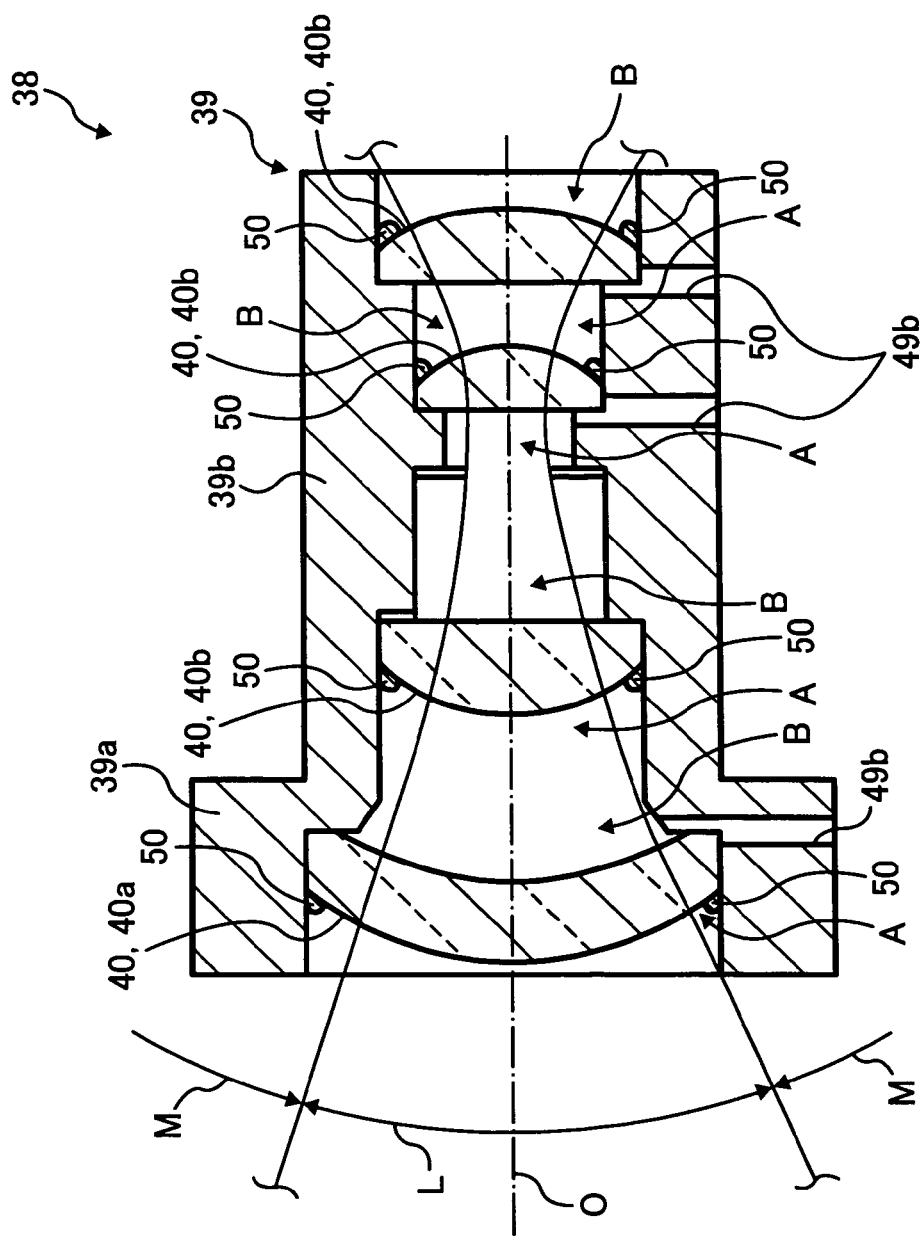
FIG. 13 is a cross-sectional view showing an alternative of the optical unit shown in FIG. 4.

According to the present invention, two or more lenses 40 may be accommodated in the lens cylinder 39 as shown in FIG. 13 (there are four lenses in FIG. 13), and the holes 49b, the number of which is smaller by one than, or equal to, or more than the number of lenses 40, may be provided in the lens cylinder 39. In other words, the hole 49b for insertion of the tool 51 does not have to be provided for one of the lenses 40 in order to remove that lens 40.

Also, in the case shown in FIG. 13, the first space A and the second space B are alternately provided in the lens cylinder 39 along the optical axis O, and each of the lenses 40 is pressed in the lens cylinder 39 from one side of the first space A and the second space B. When taking out the lenses 40 which are pressed in the lens cylinder 39 from the lens cylinder 39 in the present case, the leading end of the tool is inserted into the lens cylinder 39 through the hole 49a or 49b by a method similar to the embodiments described above to take out the lenses 40 from the lens cylinder 39. When the last lens 40 provided with no hole 49b for the insertion of the tool 51 is remained in the lens cylinder 39, the tool 51 inserted into the lens cylinder 39 is struck against the lens 40c remained last in the lens cylinder 39 to take the lens 40c out from the lens cylinder 39. Accordingly, all of the lenses 40, 40c are removed from the lens cylinder 39.

Figure 14:
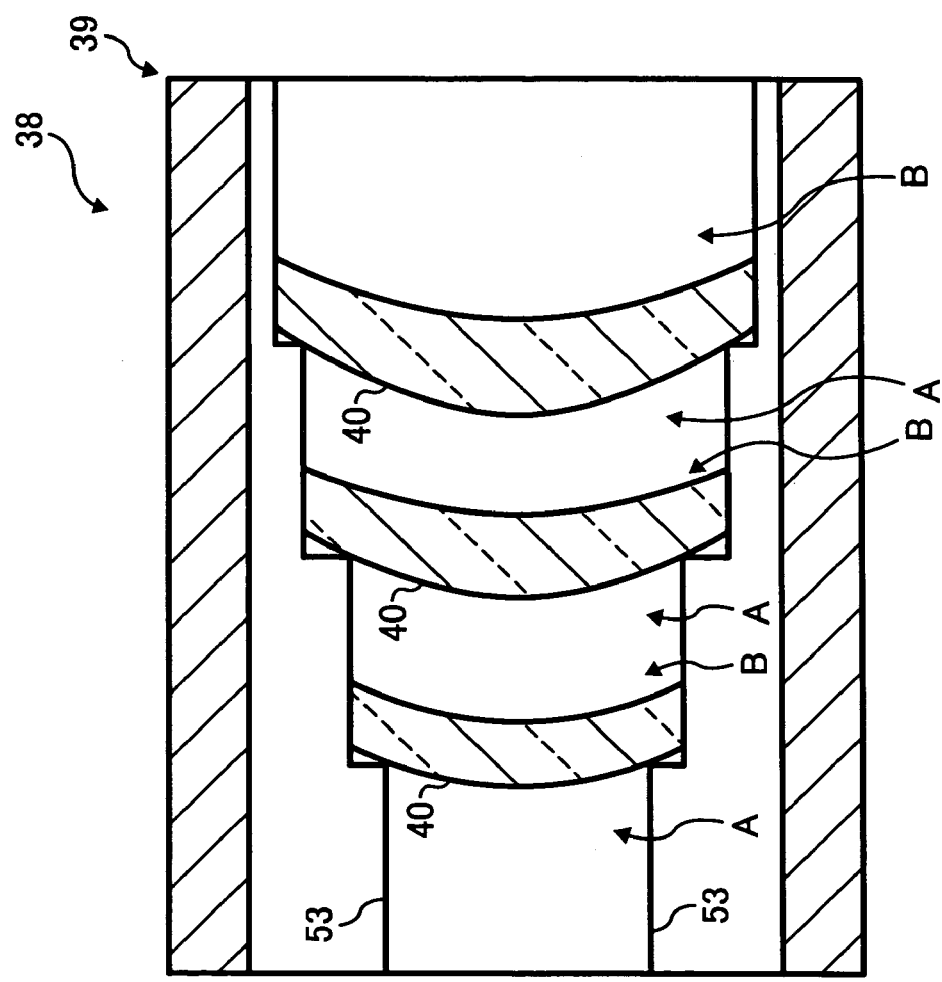
FIG. 14 is a cross-sectional view showing an alternative of the optical unit shown in FIG. 9.

Furthermore in the present invention, the plurality of lenses 40 may be accommodated in the lens cylinder 39, and the groove 53 may mutually communicate all of the first space A with the second space B, as shown in FIG. 14. As well as in this case, the tool 51 is used when removing the lenses 40, pressed into the lens cylinder 39, from the lens cylinder 39 as in the embodiment 3.

In the embodiments described above, the holes 49a, 49b or the grooves 53 are provided in the lens cylinder 39 in the circumferential direction at even intervals. However, it is to be noted that the holes 49a, 49b or the grooves 53 do not have to be provided in the lens cylinder 39 in the circumferential direction at even intervals according to the present invention. Also according to the present invention, the hole 49a, 49b or the groove 53 does not have to be provided several in the circumferential direction, in particular, in the case shown in FIG. 13. Moreover, although each of the lenses 40, 40a and 40b is attached to the lens cylinder 39 with the adhesive 50, the adhesive 50 does not necessarily have to be used in the present invention.

Second Embodiment

Hereinafter, an image forming apparatus, an image reading unit a lens block and a fixing structure of a lens cylinder according to a second embodiment of the present invention will be described with reference to FIGS. 15 to 24. In the present embodiment, components same or equivalent to those described in the first embodiment are attached with same reference numbers, and overlapping description will be appropriately omitted.

Embodiment 1

FIGS. 15 to 20 show an image forming apparatus, an image reading unit, a lens block and a fixing structure according to an embodiment 1 of the second embodiment of the present invention.

Figure 15:
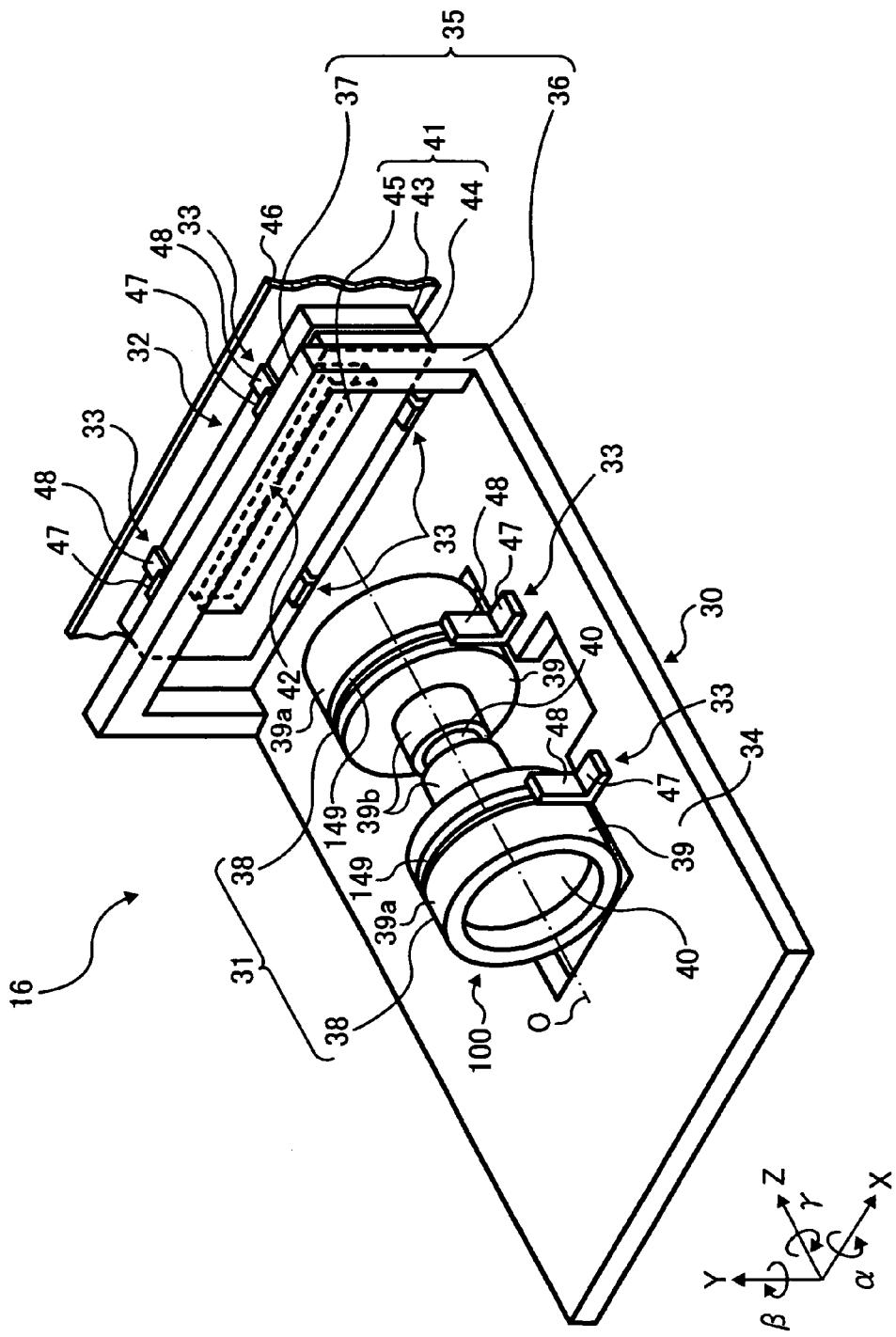
FIG. 15 is a perspective view showing a lens block of an image forming apparatus according to a second embodiment of the present invention.
Figure 16:
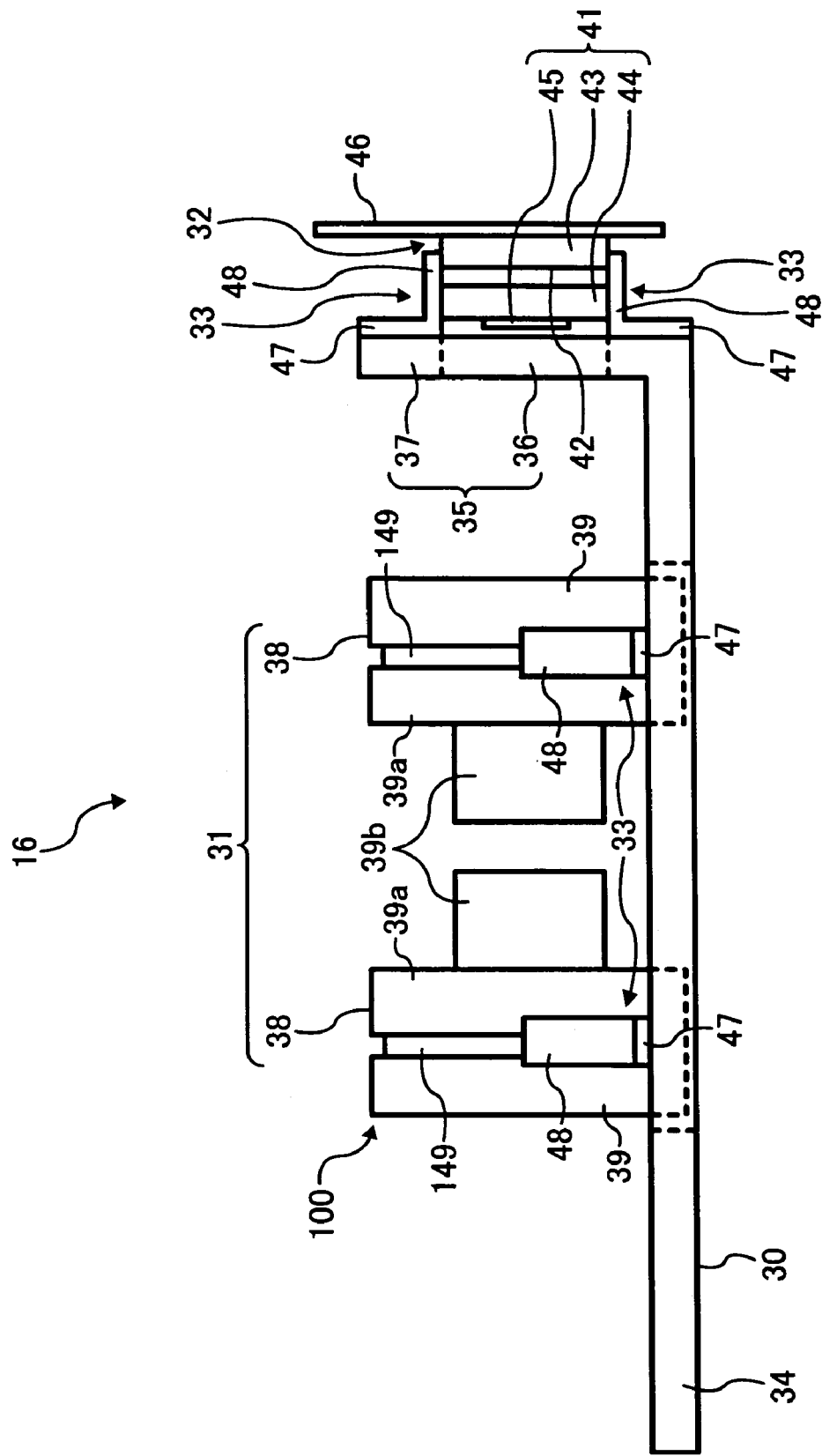
FIG. 16 is a side view of the lens block shown in FIG. 15.

Referring to FIGS. 15 and 16, the lens block 16 according to the present embodiment comprises the base member 30, the imaging lens system 31, the image sensor 32 and the plurality of intermediate retaining member 33. It is to be noted here that the lens cylinder 39 and the intermediate retaining member 33 structure a fixing structure 100 of the lens cylinder of the present invention. In other words, the lens block 16 comprises the fixing structure 100 of the lens cylinder.

The base member 30 includes the flat plate portion 34 in which the planar shape thereof is rectangular and both surfaces thereof are arranged to be in parallel with the horizontal direction, and the upright portion 35 which is erected from the flat plate portion 34. The flat plate portion 34, i.e. the base member 30 is provided freely moveably along the left and right directions (see FIG. 1). Here, the longitudinal direction of the flat plate portion 34 is in parallel with the left and right directions of the FIG. 1 described above.

The upright portion 35 is erected from one end of the left and right directions of FIG. 1 of the flat plate portion 34; in other words, the upright portion 35 is erected from one of the ends in the longitudinal direction of the flat plate portion 34. The upright portion 35 includes the pair of upright pillars 36 erected from both ends of the flat plate portion 34 in the width direction of the flat plate portion 34. The upright portion 35 further includes the connecting pillar 37 which connects the mutual ends of the upright pillars 36 at the side distant from the flat plate portion 34, and is formed in the frame-like shape.

The imaging lens system 31 includes the two optical units 38. Each of the optical units 38 comprises the lens cylinder 39, and the lens 40 accommodated in the lens cylinder 39.

As shown in FIGS. 15 to 20, the lens cylinder 39 comprises, for example but not limited to, a synthetic resin, and is formed by a known injection molding or the like. The lens cylinder 39 is integrally provided with the large diameter portion 39a and the small diameter portion 39b. The large diameter portion 39a includes an intermediate retaining member mounting surface 152 and a concave portion 149. Each of the large diameter portion 39a and the small diameter portion 39b are formed in the cylindrical shape in which the small outer diameter thereof is constant in the axle center direction. The small diameter portion 39b is connected to or continues to the edges of the large diameter portion 39a, and internal and external diameters of the small diameter portion 39b are smaller in diameter than those of the large diameter portion 39a. In addition, each of the large diameter portion 39a and the small diameter portion 39b are formed in the axis-symmetric shape relative to the center of axle, and the large diameter portion 39a and the small diameter portion 39b are provided concentrically.

Figure 17:
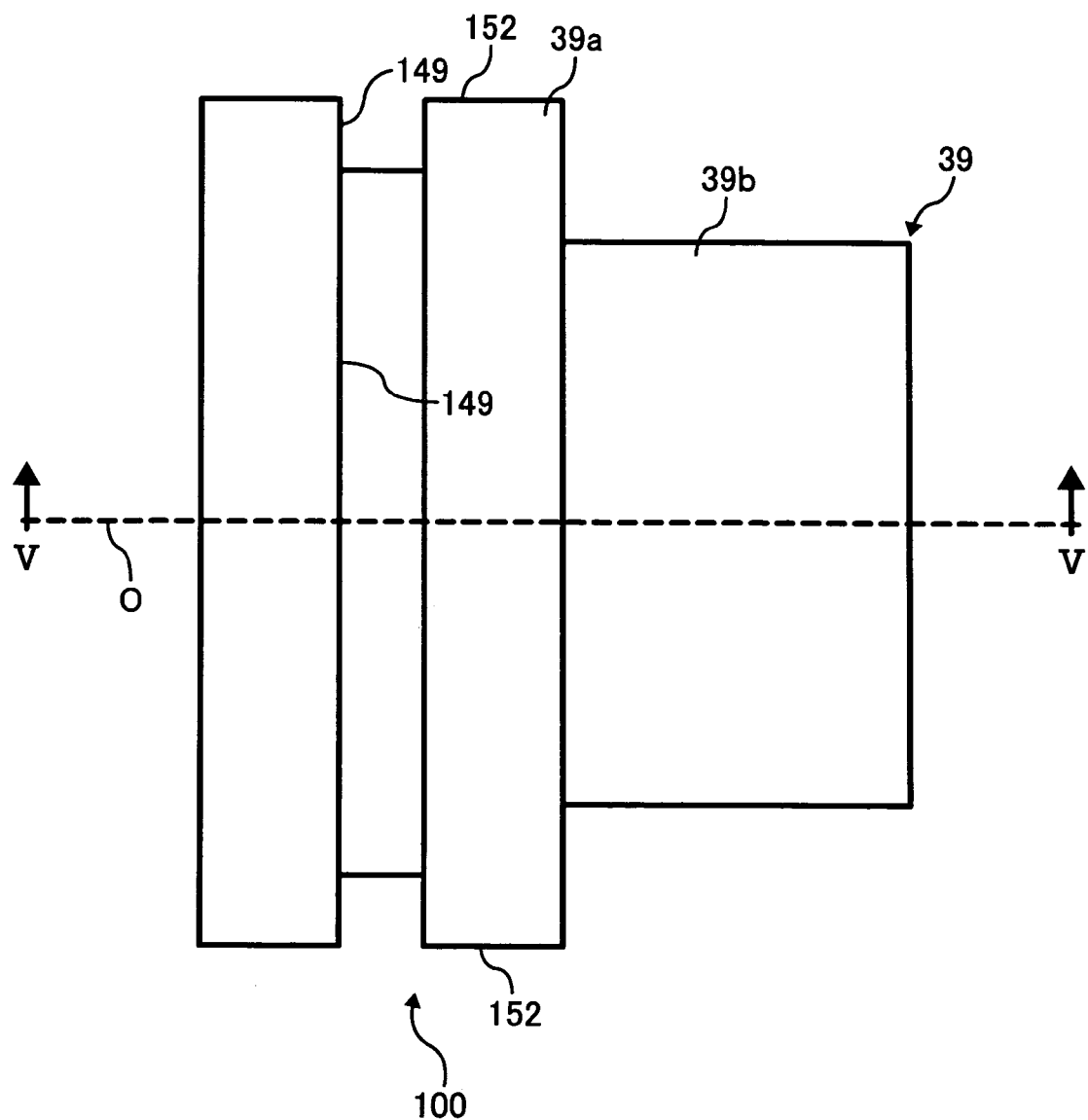
FIG. 17 is a side view of an optical unit of the lens block shown in FIG. 16.
Figure 18:
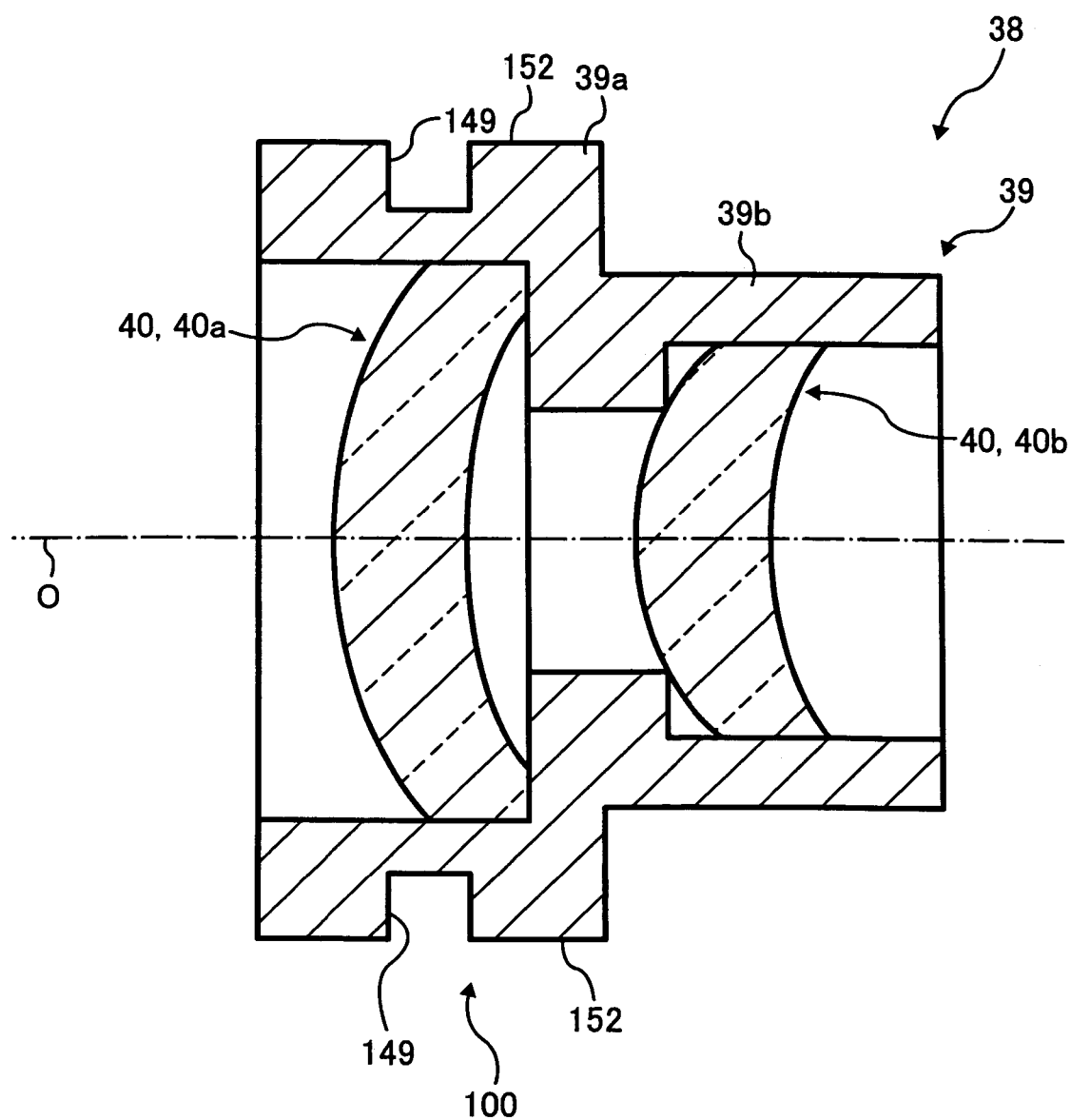
FIG. 18 is a cross-sectional view taken along a V-V line shown in FIG. 17.
Figure 19:
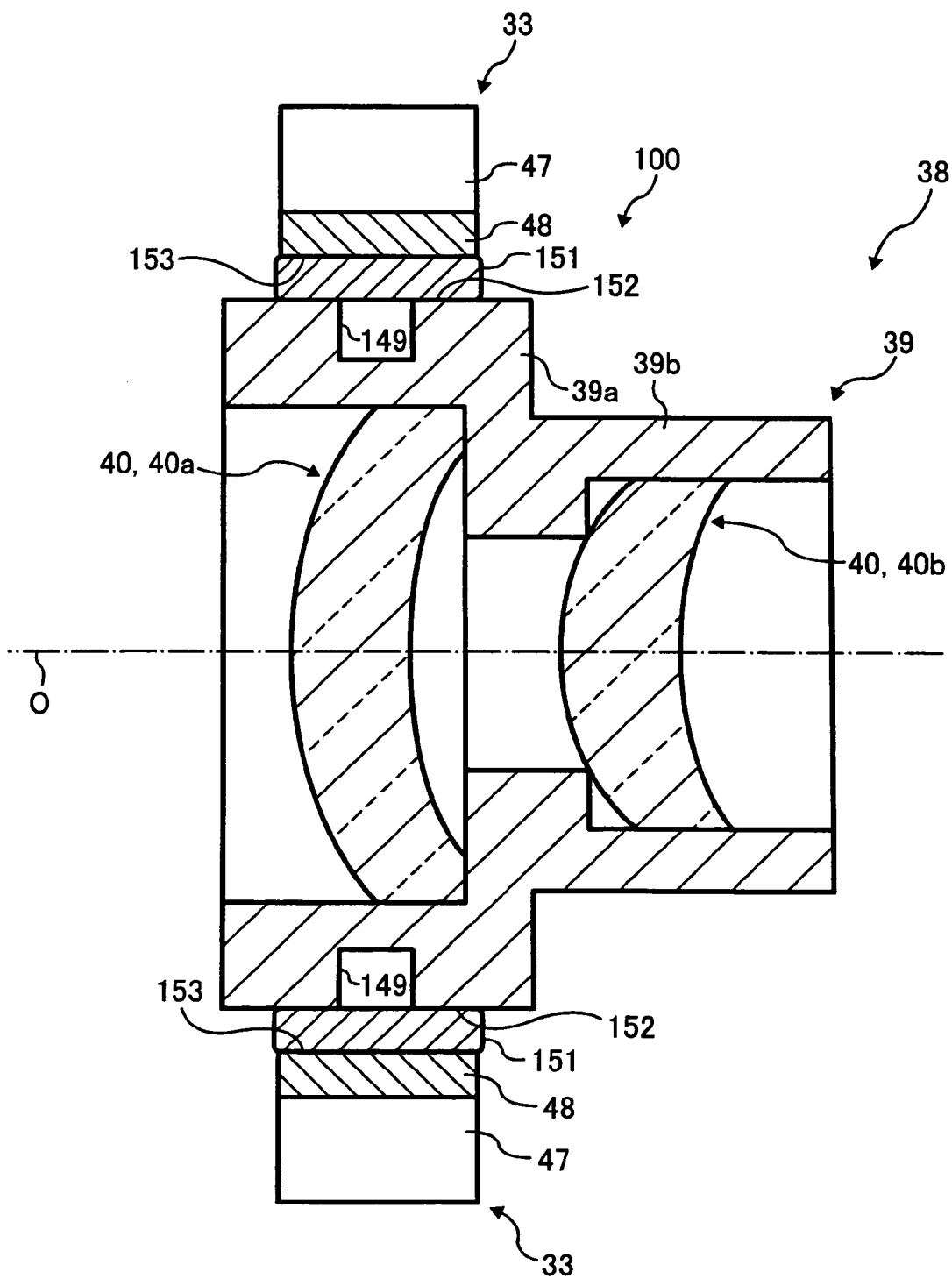
FIG. 19 is a cross-sectional view showing a state that intermediate retaining members are adhered to a lens cylinder of the optical unit shown in FIG. 18.
Figure 20:
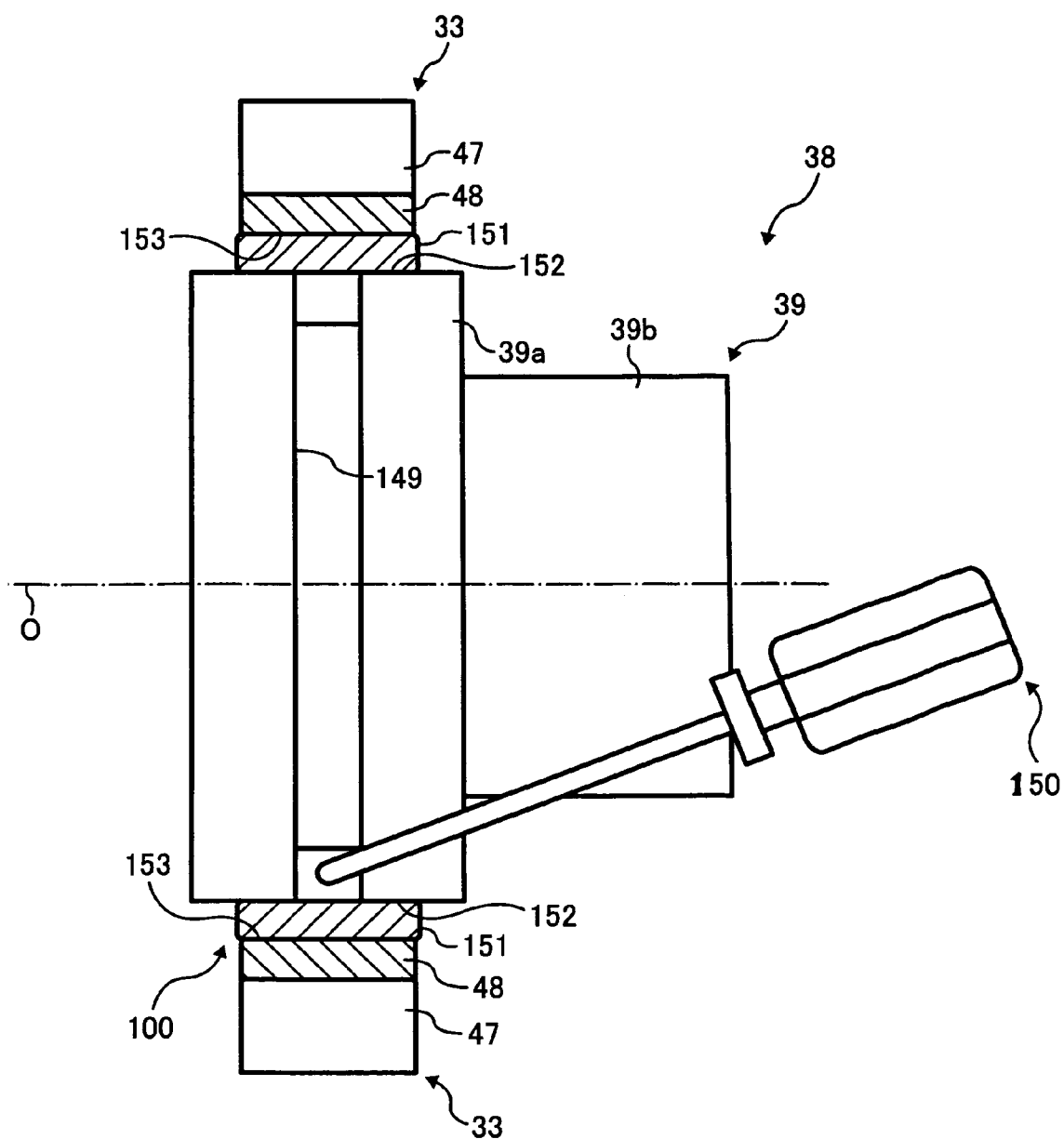
FIG. 20 is a cross-sectional view showing a state that a tool is inserted into a concave portion provided in the lens cylinder shown in FIG. 19.

Referring to FIGS. 17 to 20, the intermediate retaining member mounting surface 152 is provided on the outer circumferential surface of the lens cylinder 39; i.e. the intermediate retaining member mounting surface 152 is a part of the outer circumferential surface of the lens cylinder 39. The intermediate retaining member mounting surface 152 of the lens cylinder 39 is provided for mounting the lens cylinder 39 and the intermediate retaining member 33 which will be described later as shown in FIGS. 19 and 20. A photo-curing adhesive which cures when the light such as ultraviolet rays for example are irradiated thereon is filled between the intermediate retaining member mounting surface 152 of the lens cylinder 39 and the intermediate retaining member 33. The second mounting portion 48 of the intermediate retaining member 33 is mounted to the intermediate retaining member mounting surface 152 by the adhesive 151. The intermediate retaining member mounting surface 152 structures a part of the lens cylinder 39 where the intermediate retaining member 33 is mounted.

Referring to FIG. 17, the concave portion 149 is formed in a concave-like shape from the intermediate retaining member mounting surface 152, i.e. the outer circumferential surface of the lens cylinder 39. The concave portion 149 is provided in the center of an axial direction of the lens cylinder 39. In addition, the concave portion 149 is provided throughout the entire circumference of the outer circumferential surface of the lens cylinder 39, and extends along the circumferential direction of the lens cylinder 39. A width of the concave portion 149 is larger in diameter than a tool 150 which is, for example but not limited to, a screwdriver. Accordingly, the tool 150 is inserted into the concave portion 149.

The adhesive 151 mentioned above is not filled in the concave portion 149, and is not sealed by the adhesive 151. In other words, the intermediate retaining member 33 and the lens cylinder 39 are adhered with the adhesive 151 such that a gap is generated inside of the concave portion 149. More specifically, the adhesive 151 should be filled in the concave portion 149 to the extent that the concave portion 149 is not completely filled with the adhesive 151 and that the tool 150 can be inserted into the concave portion 149. Hence, a clearance is provided between the second mounting portion 48 of the intermediate retaining member 33 and the lens cylinder 39. A leading end of the tool 151 for separating the intermediate retaining member 33 from the lens cylinder 39, which will be described later, is possible to enter into the concave portion 149. In other words, the concave portion 149 is a concaved part (clearance) for insertion of the tool 150.

The lens 40 is structured by one piece or plural pieces of lenses. In the drawings, two lenses 40 are provided in one lens cylinder 39. One of the two lenses 40 (hereinafter referred to as lens 40a) is accommodated in the large diameter portion 39a, and the other of the lenses 40 (referred to as lens 40b) is accommodated in the small diameter portion 39b, as shown in FIGS. 18 and 19.

The respective optical axes O of the lenses 40a and 40b are arranged collinear, mutually; i.e., the lenses 40a and 40b are provided concentrically to each other. The respective optical axes O of the lenses 40a and 40b are arranged collinear of the axel center of the large diameter portion 39a and the small diameter portion 39b; i.e., the axel center of the lens cylinder 39. In other words, the lenses 40a, 40b and the large diameter and small diameter portions 39a, 39b, i.e. the lens cylinder 39 are provided concentrically to each other.

At least one of the lenses 40 is being pressed in the lens cylinder 39. The lens cylinder, i.e. the optical unit 38, is mounted on the flat plate portion 34 of the base member 30 through the intermediate retaining member 33.

The above-described two optical units 38 are disposed in such a manner that the optical axes thereof are positioned collinearly to each other. The imaging lens system 31 structured as described above images the reflected image of the manuscript 9 on the line photoelectric transducer 42 of the image sensor 32.

The image sensor 32 comprises the package 41 and the line photoelectric transducer 42 as the photoelectric conversion element. The package 41 includes the base 43 comprising the ceramics for example, the wind frame 44 also comprising the ceramics for example, and the sealing glass 45. The base 43 is formed in the plate-like shape, and the line photoelectric transducer 42 is formed on the surface thereof.

The wind frame 44 is formed in the frame-like shape, and is fixed to the base 43 with an adhesive in such a manner as to overlap with the outer edge of the base 43. The sealing glass 45 is formed in the plate-like shape, and the outer edge thereof is fixed to the wind frame 44 with the adhesive in such a manner as to coincide with the wind frame 44. The package 41 covers the line photoelectric transducer 42 by the base 43, the wind frame 44 and the sealing glass 45. In addition, the package 41 is mounted to the printing wiring board 46 for example.

The line photoelectric transducer 42 is structured by, for example but not limited to, the PD (Photo Diode) as the photoelectric conversion element and the CCD (Charge-Coupled Device) as the charge-transport element which are arranged in the straight lines. The longitudinal direction of the line photoelectric transducer 42 is in parallel with the main scan direction.

The image sensor 32 includes the electrode, the lead wire, etc. for electrically and mutually connecting the conductor pattern of the printing wiring board 46 with the electrode for example of the line photoelectric transducer 42, that are provided on the package 41. Also, the image sensor 32 is attached to the upright portion 35 of the base member 30 through the intermediate retaining member 33 in such a manner that the sealing glass 45 faces toward the imaging lens system 31 through inside of the upright portion 35.

The intermediate retaining member 33 comprises, for example but not limited to, the synthetic resin which transmits only the transparent light, and is provided with the first mounting portion 47 and the second mounting portion 48, integrally. The second mounting portion 48 is provided with a lens cylinder mounting surface 153. Each of the first mounting portion 47 and the second mounting portion 48 are formed in the plate-like shape. The second mounting portion 48 is erected from the edge of the first mounting portion 47. The angle between the first mounting portion 47 and the second mounting portion 48 is, for example but not limited to, 90 degrees in the drawings.

Figure 21:
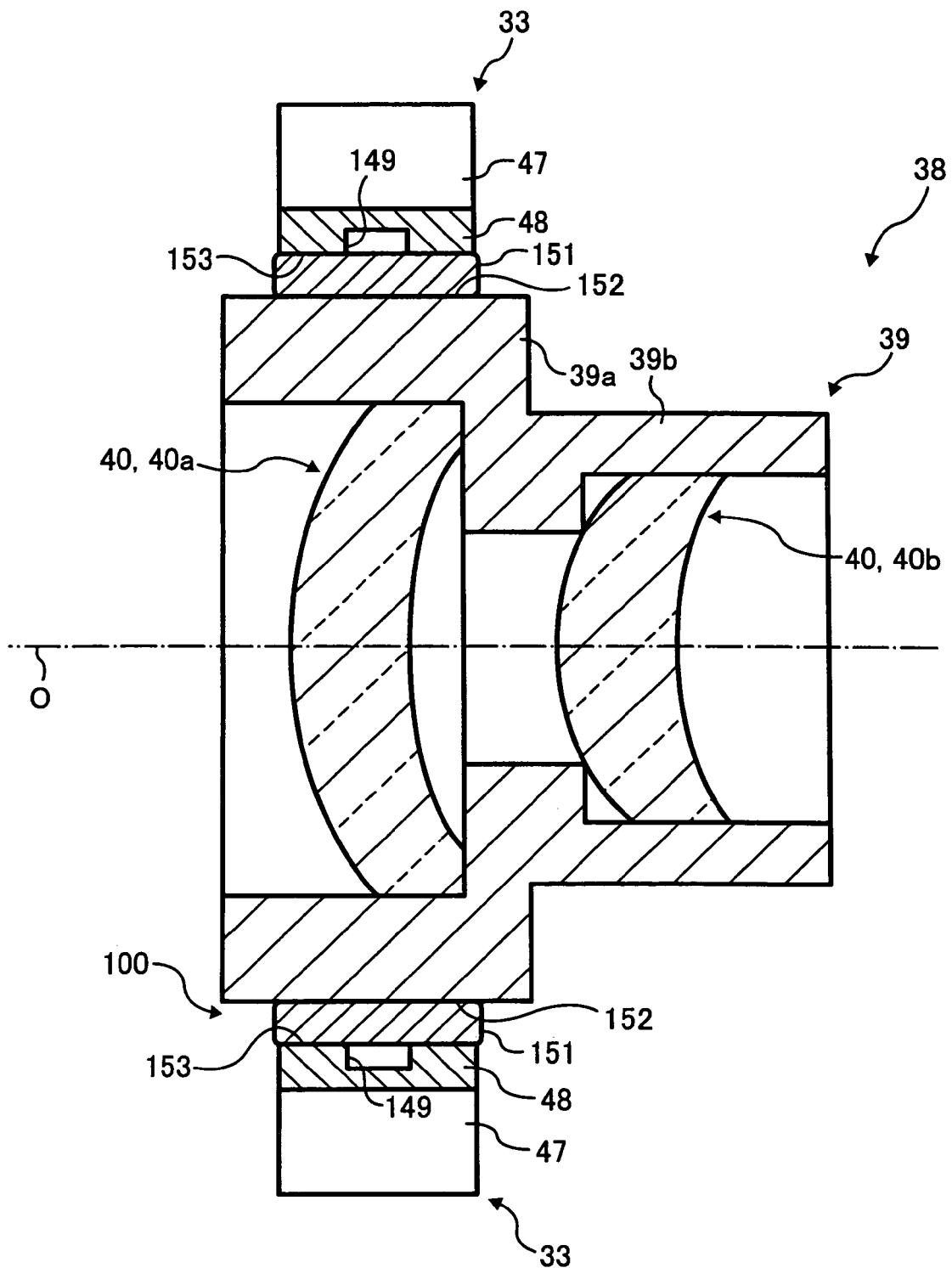
FIG. 21 is a cross-sectional view showing an optical unit according to an embodiment 2 of the image forming apparatus according to the second embodiment of the present invention.

Referring to FIG. 21, the lens cylinder mounting surface 153 is provided on a surface of the second mounting portion 48, and faces the intermediate retaining member mounting surface 152. The lens cylinder mounting surface 153 overlaps with the intermediate retaining member mounting surface 152 of the lens cylinder 39, and the adhesive 151 is filled between the lens cylinder mounting surface 153 and the intermediate retaining member mounting surface 152. The lens cylinder 39 is attached to the lens cylinder mounting surface 153, i.e. the intermediate retaining member 33 by the adhesive 151. The lens cylinder mounting surface 153 of the intermediate retaining member 33 structure a part where the lens cylinder 39 is mounted.

In the intermediate retaining member 33, the first mounting portion 47 is overlapped with the base member 30 whereas the second mounting portion 48 is overlapped with the lens cylinder 39 and the package 41 of the image sensor 32. In addition, the adhesive 151 is filled between the first or the second mounting portion 47, 48 and the base member 30, the lens cylinder 39 or the package 41 of the image sensor 32, so that the lens cylinder 39, i.e. the imaging lens system 31 and the package 41, i.e. the image sensor 32 are mounted on the base member 30. At this time, the intermediate retaining member mounting surface 152 of the lens cylinder 39 and the lens cylinder mounting surface 153 on the second mounting portion 48 of the intermediate retaining member 33 are overlapped and adhered through the adhesive 151. When the image sensor 32 is mounted on the base member 30, the optical axes O (shown by a dashed line in FIG. 15) of the imaging lens system 31 and the image sensor 32 are positioned on the same line.

Next, a procedure for removing the lens cylinder 39 from the intermediate retaining member 33 in the fixing structure 100 of the lens cylinder will be described hereinafter. Referring to FIG. 20, the tool 150 is inserted between the lens cylinder 39 and the adhesive 151 (i.e. the intermediate retaining member 33) into the concave portion 149 provided in the intermediate retaining member mounting surface 152 of the lens cylinder 39. Then, the leading end of the inserted tool 150 is, for example, pushed against the adhesive 151, and the adhesive 151 is pressed by the tool 150 in a direction departing from the lens cylinder 39. Thereby, the lens cylinder 39 and the intermediate retaining member 33 are separated away from each other. Hence, the lens cylinder 39 and the intermediate retaining member 33 are removed from each other. At least a part of the tool 150 such as the leading end is capable of being inserted into the concave portion 149 which is provided in at least one of the intermediate retaining member mounting surface 152 and the lens cylinder mounting surface 153, and at the same time, at least the part of the tool 150 is possible to separate the lens cylinder 39 from the intermediate retaining member 33 when at least the part of the tool 150 is inserted into the concave portion 149.

According to the present embodiment, the concave portion 149 is provided in the intermediate retaining member mounting surface 152 of the lens cylinder 39. Therefore, it is possible to provide the fixing structure 100, the lens block 16, the image reading unit 4 and the image forming apparatus 1 capable of easily removing the lens cylinder 39, which is adhered to the intermediate retaining member 33, i.e. the base member 30, from the base member 30 by inserting the tool 150 into the concave portion 149.

In addition, the concave portion 149 is provided in the entire circumference of the lens cylinder 39. Hence, the lens cylinder 39 can be formed symmetrical relative to the axis thereof, so that the lens 40 and the lens cylinder 39 can be coaxial. Therefore, it is possible to easily obtain the optical unit 38 and the lens block 16 of high precision.

Moreover, the intermediate retaining member 33 and the lens cylinder 39 are adhered such that the clearance is provided inside of the concave portion 149, so the concave portion 149 is not completely covered by the adhesive 151. Accordingly, it is possible to surely insert the tool 150 into the concave portion 149, and to make the lens cylinder 39 easy to be dismounted from the base member 30 when removing the lens cylinder 39.

Embodiment 2

Next, a lens block according to an embodiment 2 of the second embodiment of the present invention will be described with reference to FIG. 21. In the present embodiment, components same or equivalent to those described in the above embodiment 1 are attached with same reference numbers, and overlapping description will be omitted.

Referring to FIG. 21, in the present embodiment, the concave portion 149 is provided in the lens cylinder mounting surface 153 of the second mounting portion 48 of the intermediate retaining member 33. As shown in FIG. 21, the concave portion 149 according to the present embodiment is formed in a concave shape from the lens cylinder mounting surface 153 of the second mounting portion 48. Also, the concave portion 149 opens on the a surface of the lens cylinder mounting surface 153 of the intermediate retaining member 33, and faces the adhesive 151, i.e. the lens cylinder 39. The width of the concave portion 149 is wider than the external diameter of the tool 150, so that the tool 150 is inserted into the concave portion 149. The intermediate retaining member mounting surface 152 and the lens cylinder mounting surface 153 provided with the concave portion 149 are fixed mutually by the adhesive 151.

Next, a procedure for removing the lens cylinder 39 from the intermediate retaining member 33 according to the present embodiment will be described hereinafter. Referring to FIG. 21, the tool 150 is inserted into the concave portion 149 provided in the lens cylinder mounting surface 153 of the second mounting portion 48 of the intermediate retaining member 33. Then, the leading end of the inserted tool 150 is, for example, pushed against one the adhesive 151 and a bottom surface of the concave portion 149, and thereafter, the one of the adhesive 151 and the bottom surface of the concave portion 149 is pressed in a direction departing away from the other of the adhesive 151 and the bottom surface of the concave portion 149 by the tool 150. Thereby, the lens cylinder 39 and the intermediate retaining member 33 are separated away from each other. Hence, the lens cylinder 39 and the intermediate retaining member 33 are removed from each other.

According to the present embodiment, the concave portion 149 is provided in the lens cylinder mounting surface 153 of the intermediate retaining member 33. Therefore, it is possible to provide the fixing structure 100, the lens block 16, the image reading unit 4 and the image forming apparatus 1 which can easily remove the lens cylinder 39, which is adhered to the intermediate retaining member 33, i.e. the base member 30, from the base member 30 by inserting the tool 150 into the concave portion 149. Also, since the concave portion 149 is not completely covered by the adhesive 151 as in the embodiment 1, it is possible to surely insert the tool 150 into the concave portion 149 when detaching the lens cylinder 39, and to make the lens cylinder 39 easy to be removed from the base member 30.

Embodiment 3

Next, a lens block according to an embodiment 3 of the second embodiment of the present invention will be described with reference to FIG. 22. In the present embodiment, components same or equivalent to those described in the above embodiments 1 and 2 are attached with same reference numbers, and overlapping description will be omitted.

Figure 22:
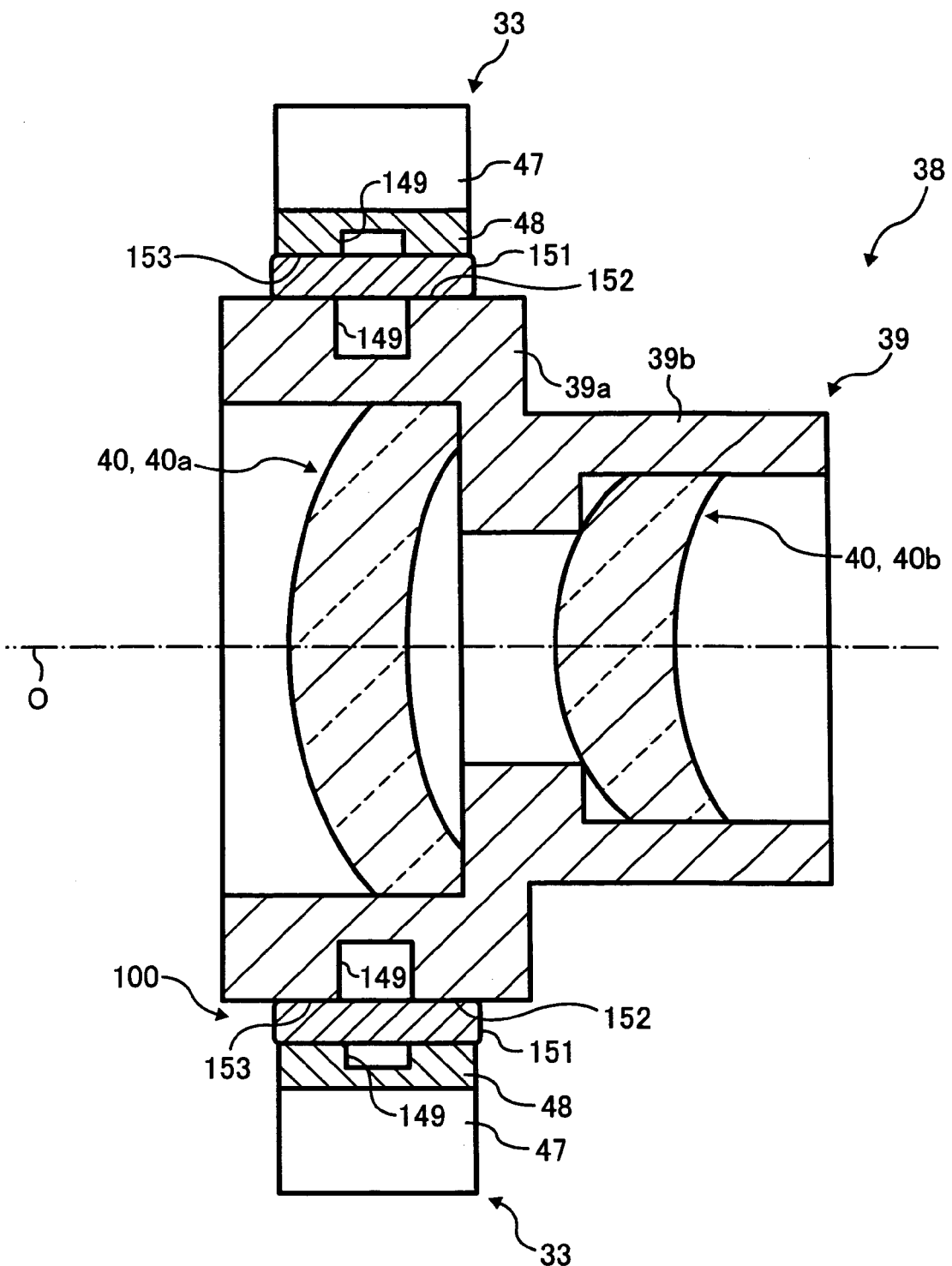
FIG. 22 is a cross-sectional view showing an optical unit and so on according to an embodiment 3 of the second embodiment of the present invention.

In the present embodiment, the concave portion 149 is provided in both of the intermediate retaining member mounting surface 152 of the lens cylinder 39 and the lens cylinder mounting surface 153 of the intermediate retaining member 33, as shown in FIG. 22. The structure of those concave portions 149 are similar to those described in the embodiments 1 and 2. As well as in the present embodiment, the intermediate retaining member mounting surface 153 and the lens cylinder mounting surface 153, which are provided with the concave portions 149, are mutually adhered by the adhesive 151.

Next, a procedure of removing the lens cylinder 39 and the intermediate retaining member 33 in the present embodiment will be described hereinafter. As shown in FIG. 22, the tool 150 is inserted into one of the concave portion 149 provided in the intermediate retaining member mounting surface 152 of the lens cylinder 39 and the concave portion 149 provided in the lens cylinder mounting surface 153 of the second mounting portion 48 of the intermediate retaining member 33. At the same time, the tool 150 is inserted into the other of the concave portion 149 provided in the intermediate retaining member mounting surface 152 or the concave portion 149 provided in the lens cylinder mounting surface 153. Then, the adhesive 151 etc., is pushed against by each of the leading ends of the inserted tools 150, and the intermediate retaining member 33 and the lens cylinder 39 are pressed by the leading ends of the tools 150 in a direction departing from each other. Thereby, the lens cylinder 39 and the intermediate retaining member 33 are separated from each other. Hence, the lens cylinder 39 and the intermediate retaining member 33 are removed.

According to the present embodiment, the concave portion 149 is provided in both of the intermediate retaining member mounting surface 152 of the lens cylinder 39 and the lens cylinder mounting surface 153 of the intermediate retaining member 33. Therefore, it is possible to provide the fixing structure 100, the lens block 16, the image reading unit 4 and the image forming apparatus 1 which can easily remove the lens cylinder 39, which is adhered to the intermediate retaining member 33, i.e. the base member 30, from the base member 30 by inserting the tool 150 into the concave portion 149. Also, since the concave portion 149 is not completely covered by the adhesive 151 as in the embodiments 1 and 2, it is possible to surely insert the tool 150 into the concave portion 149 when removing the lens cylinder 39, and to make the lens cylinder 39 easy to be removed from the base member 30.

Figure 23:
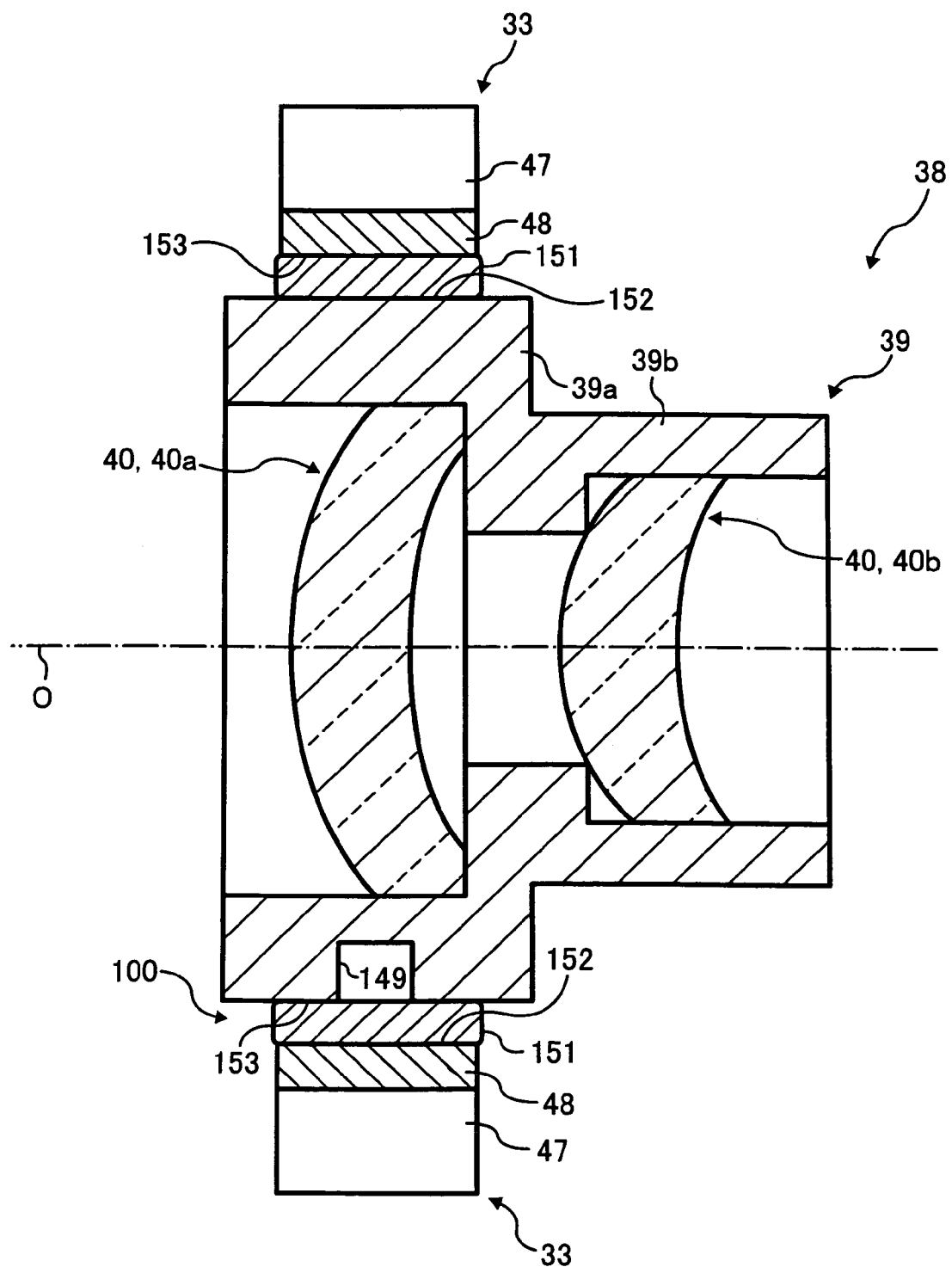
FIG. 23 is a perspective view showing an alternative of the optical unit and so on shown in FIG. 19.

In the embodiments described above, at least one concave portion 149 is provided in the intermediate retaining member mounting surface 152 of the lens cylinder 39 and the lens cylinder mounting surface 153 of the second mounting portion 48 of the intermediate retaining member 33, respectively. However, as shown in FIG. 23, the number of the concave portion 149 may be smaller by one than or equal to or more than the number of adhered portion between the intermediate retaining member mounting surface 152 of the lens cylinder 39 and the lens cylinder mounting surface 153 of the second mounting portion 48 of the intermediate retaining member 33, according to the present invention. More specifically, as shown in FIG. 23, one of the adhered portions, i.e. one of the intermediate retaining members 33 does not have to be provided with the concave portion 149 for attaining the insertion (or separation) of the corresponding tool. In the FIG. 23, it is to be noted that components same or equivalent to those described in the above embodiments 1 and 2 are attached with same reference numbers, and overlapping description will be omitted. In addition, in a case shown in FIG. 23, the concave portion 149 may also be provided in the intermediate retaining member 33.

In the present case, the intermediate retaining member 33, to which the corresponding concave portion 149 is provided, is removed from the lens cylinder 39 according to the methods similar to those described in the embodiments described above. Thereafter, the intermediate retaining member 33 remained last (or the intermediate retaining member 33 remained attached to the lens cylinder 39) is removed from the lens cylinder 39 with a manual work of a worker. According to the present case, it is possible to remove the intermediate retaining member 33 with the concave portion 149 from the lens cylinder 39 by the tool 150 and to remove the last intermediate retaining member 33 by the worker's manual work. Hence, it is possible to remove the lens cylinder 39 from the base member 30 without fail.

Figure 24:
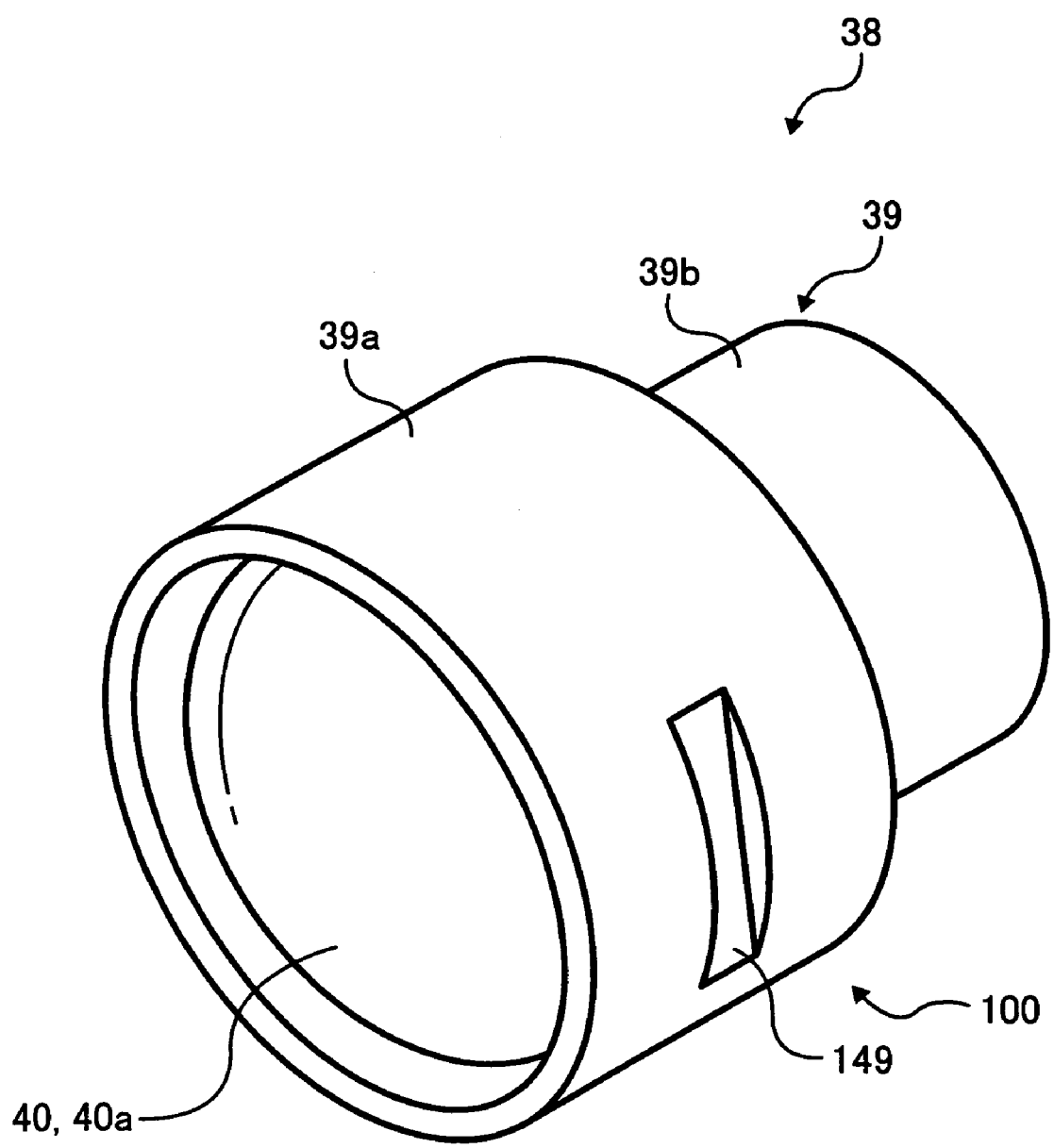
FIG. 24 is a perspective view showing another alternative of the optical unit and so on shown in FIG. 19.

In addition, the concave portion 149 is provided throughout the entire circumference of the outer circumferential surface of the lens cylinder 39 of the above-described embodiments. However, in the present invention, the concave portion 149 does not necessarily have to be provided throughout the entire circumference of the outer circumferential surface of the lens cylinder 39 as shown in FIG. 24. In the present invention, the concave portion 149, into which the tool 150 for separating the lens cylinder 39 from the intermediate retaining member 33 is inserted, may be provided at least at a mounting portion of the lens cylinder 39 and the intermediate retaining member 33.

Also, the concave portion 149 is provided in the center of the axial direction of the outer circumferential surface in the large diameter portion 39a of the lens cylinder 39 in the drawings of the embodiments described above. However, the concave portion 149 does not necessarily have to be provided in the center of the axial direction of the outer circumferential surface in the large diameter portion 39a of the lens cylinder 39 according to the present invention. In essence, the concave portion 149 may be provided in at least one of the intermediate retaining member mounting surface 152 and the lens cylinder mounting surface 153. For example, the concave portion 149 may be provided at the edge in the axial direction of the outer circumferential surface of the large diameter portion 39a of the lens cylinder 39.

Third Embodiment

Hereinafter, an image forming apparatus, an image reading unit and a fixing structure according to a third embodiment of the present invention will be described with reference to FIGS. 25 to 41. In the present embodiment, components same or equivalent to those described in the first embodiment are attached with same reference numbers, and overlapping description will be appropriately omitted.

Embodiment 1

FIGS. 25 to 30 show an image forming apparatus, an image reading unit and a fixing structure according to an embodiment 1 of the third embodiment of the present invention.

Figure 25:
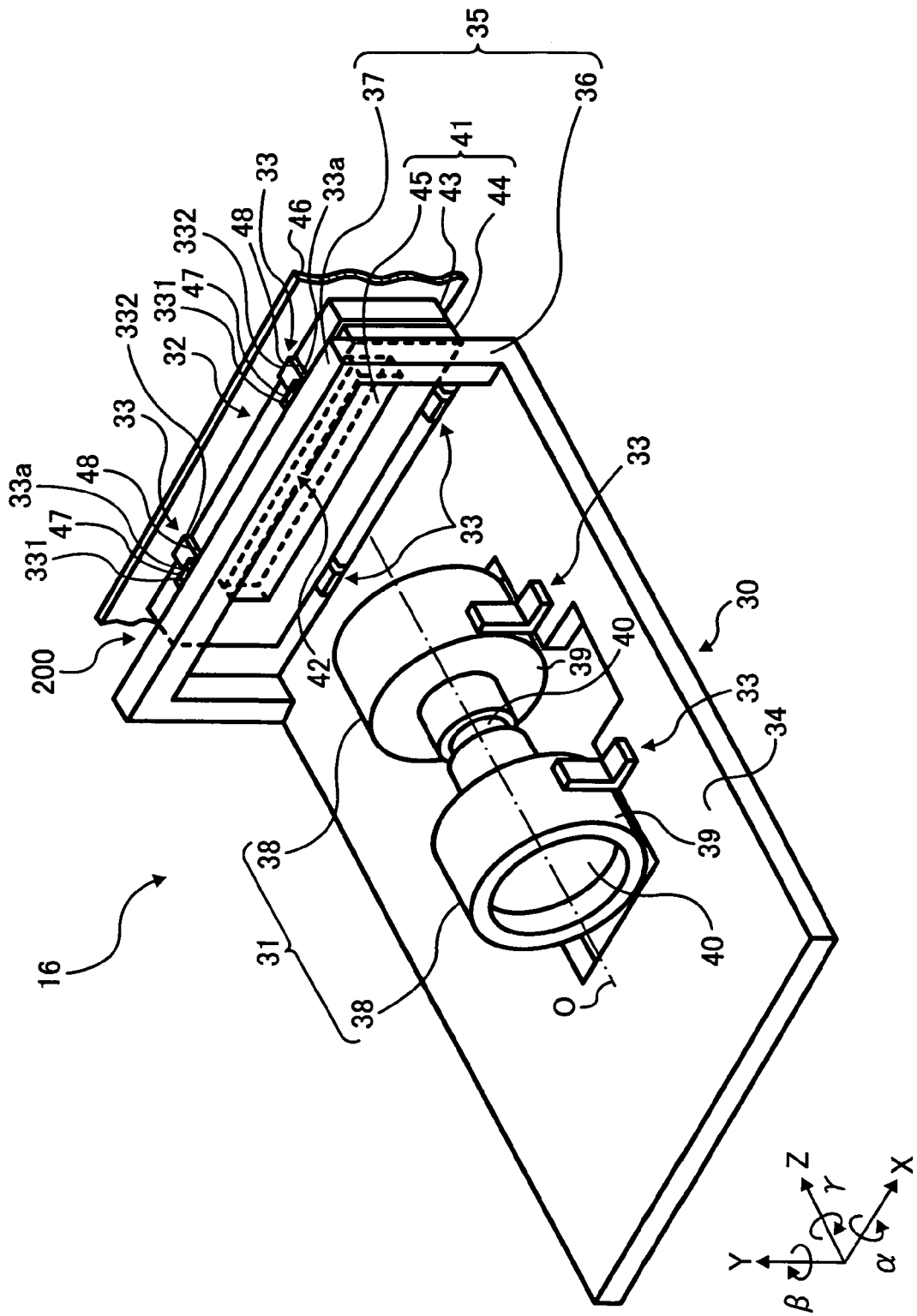
FIG. 25 is a perspective view showing a lens block of an image forming apparatus according to a third embodiment of the present invention.
Figure 26:
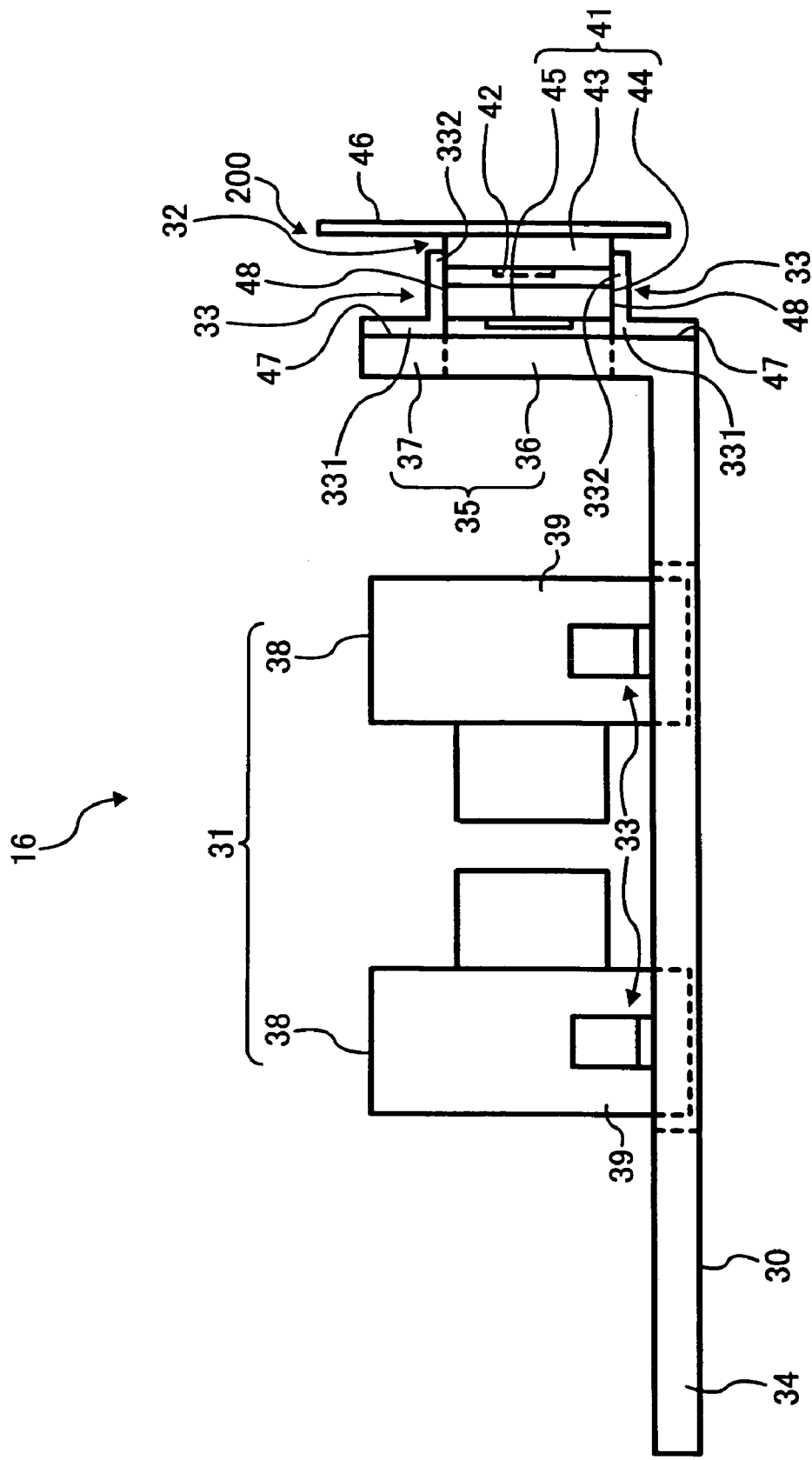
FIG. 26 is a side view of the lens block shown in FIG. 25.

Referring to FIGS. 25 and 26, the lens block 16 according to the present embodiment comprises the base member 30 as a first member, the imaging lens system 31, the image sensor 32 and the plurality of intermediate retaining member 33.

The base member 30 includes the flat plate portion 34 in which the planar shape thereof is rectangular and both surfaces thereof are arranged to be in parallel with the horizontal direction, and the upright portion 35 which is erected from the flat plate portion 34. The flat plate portion 34, i.e. the base member 30 is provided freely moveably along the left and right directions (see FIG. 1). Here, the longitudinal direction of the flat plate portion 34 is in parallel with the left and right directions of the FIG. 1 described above.

The upright portion 35 is erected from one end of the left and right directions of FIG. 1 of the flat plate portion 34; in other words, the upright portion 35 is erected from one of the ends in the longitudinal direction of the flat plate portion 34. The upright portion 35 includes the pair of upright pillars 36 erected from both ends of the width direction of the flat plate portion 34. The upright portion 35 further includes the connecting pillar 37 which connects the mutual ends of the upright pillars 36 at the side distant from the flat plate portion 34 to be formed in the frame-like shape.

The imaging lens system 31 includes the two optical units 38. Each of the optical units 38 comprises the lens cylinder 39, and a lens group 40 accommodated in the lens cylinder 39. The lens cylinder 39 is formed in a cylindrical shape. At least one of lenses of the lens group 40 is being pressed in the lens cylinder 39. The lens cylinder 39, i.e. each of the optical units 38 is mounted on the flat plate portion 34 of the base member 30 through the intermediate retaining member 33.

The two optical units 38 are disposed in such a manner that the optical axes thereof are positioned collinearly to each other. The imaging lens system 31 structured as described above images the reflected image from the manuscript 9 on the line photoelectric transducer 42 of the image sensor 32.

The image sensor 32 comprises a package 41 as a second member and the line photoelectric transducer 42 as the photoelectric conversion element. The package 41 includes the base 43 comprising the ceramics for example, the wind frame 44 also comprising the ceramics for example, and the sealing glass 45. The base 43 is formed in the plate-like shape, and the line photoelectric transducer 42 is formed on the surface thereof. The wind frame 44 is formed in the frame-like shape, and is fixed to the base 43 with an adhesive in such a manner as to overlap with the outer edge of the base 43. The sealing glass 45 is formed in the plate-like shape, and the outer edge thereof is fixed to the wind frame 44 with the adhesive in such a manner as to coincide with the wind frame 44. The package 41 covers the line photoelectric transducer 42 by the base 43, the wind frame 44 and the sealing glass 45. In addition, the package 41 is mounted to the printing wiring board 46 for example.

The line photoelectric transducer 42 is structured by, for example but not limited to, the PD (Photo Diode) as the photoelectric conversion element and the CCD (Charge-Coupled Device) as the charge-transport element which are arranged in the straight lines. The longitudinal direction of the line photoelectric transducer 42 is in parallel with the main scan direction.

The image sensor 32 includes the electrode, the lead wire, etc. for electrically and mutually connecting the conductor pattern of the printing wiring board 46 with the electrode for example of the line photoelectric transducer 42, that are provided on the package 41. Also, the image sensor 32 is attached to the upright portion 35 of the base member 30 through the intermediate retaining member 33 in such a manner that the sealing glass 45 faces the imaging lens system 31 through inside of the upright portion 35.

The intermediate retaining member 33 comprises, for example but not limited to, the synthetic resin which transmits only the transparent light, and is provided with a first fixing portion 331 and a second fixing portion 332, integrally. Each of the first fixing portion 331 and the second fixing portion 332 are formed in a plate-like shape. The second fixing portion 331 is erected from the edge of the first fixing portion 332. The angle between the first fixing portion 331 and the second fixing portion 332 is, for example but not limited to, 90 degrees in the drawings.

In the intermediate retaining member 33, the first fixing portion 331 is overlapped with the base member 30, and the second fixing portion 332 is overlapped with the lens cylinder 39 and the package 41 of the image sensor 32. In addition, a photo-curing type adhesive, which cures when light such as the ultraviolet rays for example is irradiated thereon, is filled between the first or the second fixing portion 331, 332 and the base member 30, the lens cylinder 39 or the package 41 of the image sensor 32, so that the lens cylinder 39, i.e. the imaging lens system 31 and the package 41, i.e. the image sensor 32 are mounted on the base member 30. When they are mounted on the base member 30, the optical axes O (shown by a dashed line in FIG. 25) of the imaging lens system 31 and the image sensor 32 are positioned on the same line.

The base member 30, the package 41 and the intermediate retaining member 33 described above structure a fixing structure 200 of the present invention. In other words, the image forming apparatus 1, the image reading unit 4 and the lens block 16 comprise the fixing structure 200. Hereinafter, a part of the base member 30 to which the first fixing portion 331 of the intermediate retaining member 33 is attached is referred to as a mounting portion, which is denoted as 47 (shown in FIG. 28). In addition, a part of the package 41 to which the second fixing portion 332 of the intermediate retaining member 33 is attached is referred to as a mounting portion, which is denoted as 48.

Figure 27:
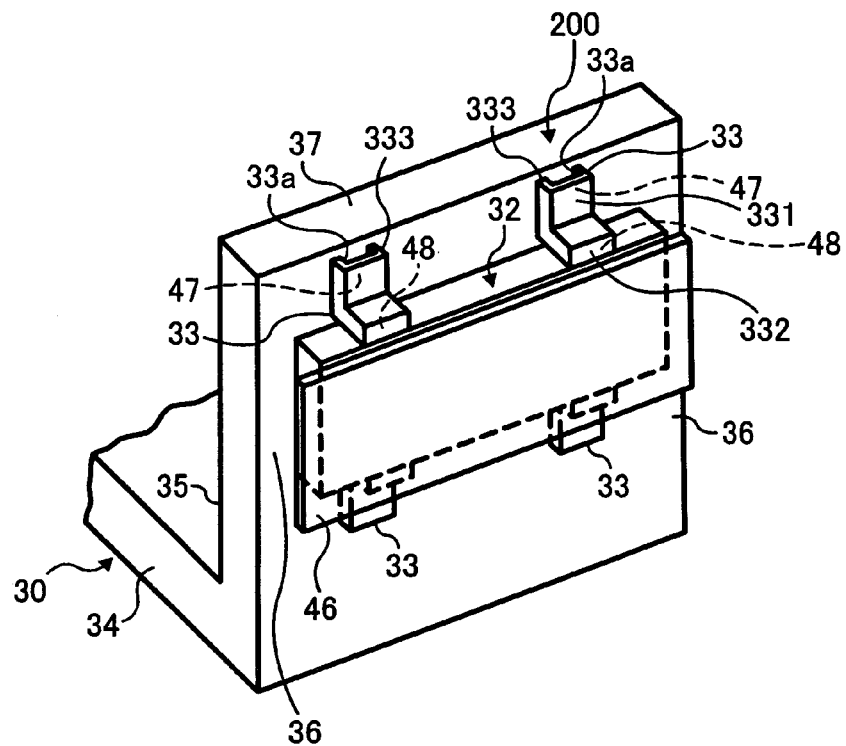
FIG. 27 is a perspective view showing a fixing structure of the image forming apparatus according to the third embodiment of the present invention.
Figure 28:
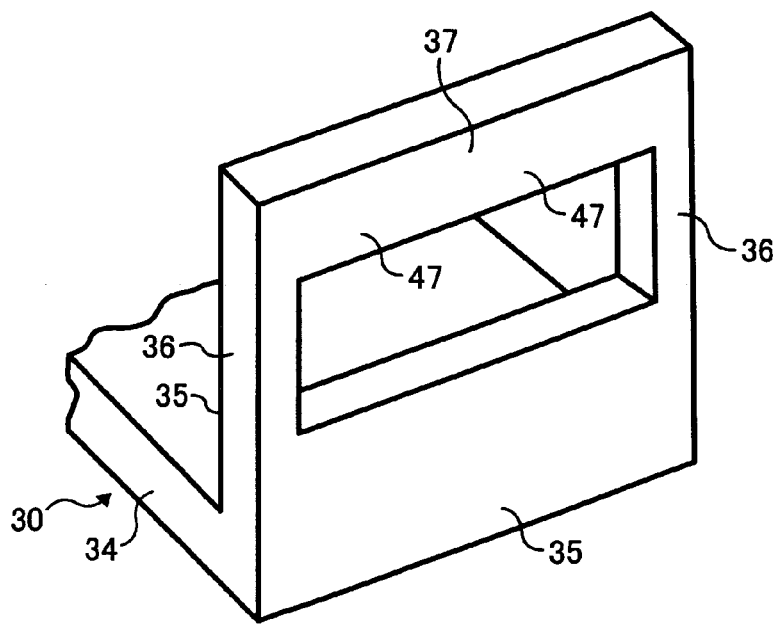
FIG. 28 is a perspective view of a base member of the fixing structure shown in FIG. 27.
Figure 29:
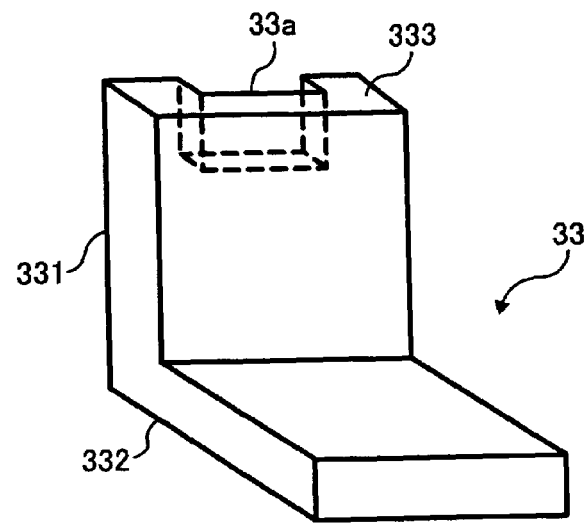
FIG. 29 is a perspective view of an intermediate retaining member of the fixing structure shown in FIG. 27.
Figure 30:
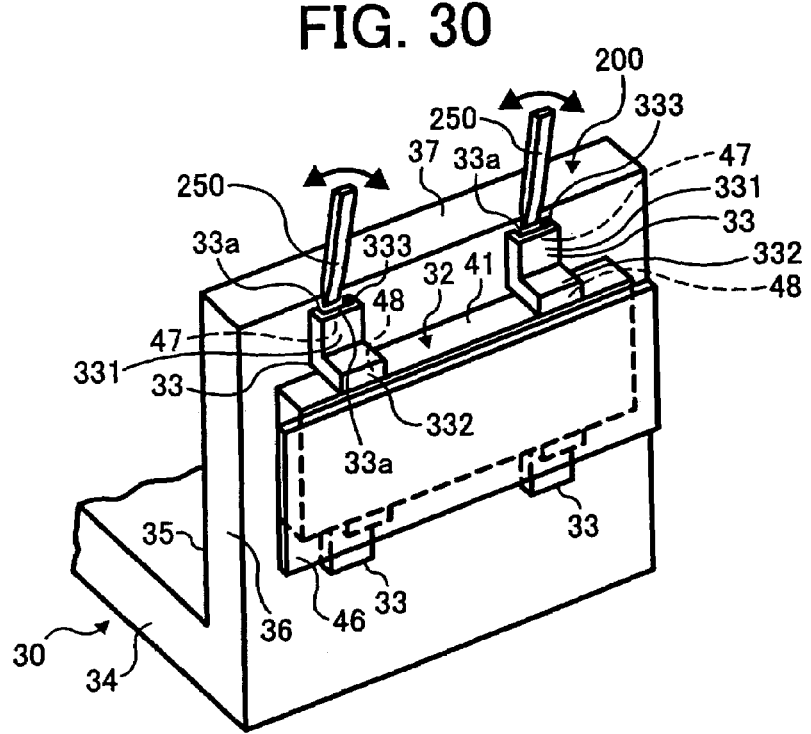
FIG. 30 is an explanatory perspective view showing a separation method of the fixing structure shown in FIG. 27.

Next the fixing structure 200 according to the present invention will be described in detail. FIG. 27 is a perspective view showing the fixing structure 200. FIG. 28 is a perspective view of the base member 30 of the fixing structure 200, and FIG. 29 is a perspective view of the intermediate retaining member 33 of the fixing structure 200.

Referring to FIG. 27, in the fixing structure 200, the mounting portion 47 of the upright portion 35 and the first fixing portion 331 of the intermediate retaining member 33 are fixed by the photo-curing adhesive described above. The mounting portion 48 of the package 41 and the second fixing portion 332 of the intermediate retaining member 33 are also fixed by the photo-curing adhesive. The first fixing portion 331 is provided with a notch 33a. As shown in FIG. 29, the notch 33a is formed in a concave shape from a surface which contacts and overlaps with the mounting portion 47 of the first fixing portion 331. The notch 33a is also open on an upper surface 333 as an external surface of the first fixing portion 331, i.e. the intermediate retaining member 33.

A tool 250 which will be described later is inserted from an opened part of the upper surface 333 into the notch 33a. Here, it is to be noted that, although a planar shape of the notch 33a is rectangular in the drawings, the shape of the notch 33a according to the present invention is not limited to the rectangular shape. A dent which opens on both of the upper surface 333 and the above-described surface which contacts with the mounting portion 47 may be employed for example.

The notch 33a is not filled and sealed by the adhesive described above. A clearance is formed by the notch 33a between the first fixing portion 331 of the intermediate retaining member 33 and the mounting portion 47 of the base member 33. A leading end of the tool 250 for separating the intermediate retaining member 33 from the base member 30 is possible to enter into the notch 33a. In other words, the notch 33a is a notch (space) for allowing the tool 250 to be inserted therein.

Next, a method of separating the base member 30 as the first member from the package 41, i.e. the image sensor 32, as the second member mentioned above will be described with reference to FIG. 30. As referred hereinafter, the intermediate retaining member 33 is separated from the base member 30 in order to separate the base member 30 from the package 41.

First, the leading end of the tool 250 in a flat-blade screwdriver configuration for example is inserted (entered) into the notch 33a from the opened part of the upper surface 333 of the notch 33a provided in the intermediate retaining member 33, which fixes the base member 30 and the image sensor 32. Then, the tool 250 is leveled or slanted in directions shown by arrows in FIG. 30 such that a base end of the tool 250 approaches the base member 30 or the intermediate retaining member 33. In other words, the base member 30 and the intermediate retaining member 33 are pressed by the tool 250 in such a manner as to widen the notch 33a. Thereby, the base member 30 and the package 41 are easily separated from each other. At least a part of the tool 250 such as the leading end is possible to enter into the notch 33a or 35a (shown in FIG. 31 for example) provided at least one of the intermediate retaining member 33 and the base member 30, and at least the part of the tool 250 is possible to separate the base member 30 and the package 41 when at least the part of the tool 250 is inserted into the notch 33a or 35a.

According to the present embodiment, the notch 33a for separating the base member 30 as the first member from the package 41 as the second member is provided in the first fixing portion 331 of the intermediate retaining member 33. Accordingly, it is possible to separate the base member 30 and the package 41 easily, only by inserting the tool 250 into the notch 33a and applying force thereto. Here, the notch 33a may be provided in the mounting portion 47 of the base member 30. However, it is possible to provide the fixing structure 200 in which the separation is easy at low cost as a whole if the notch 33a is provided at the intermediate retaining member 33.

Embodiment 2

Figure 31:
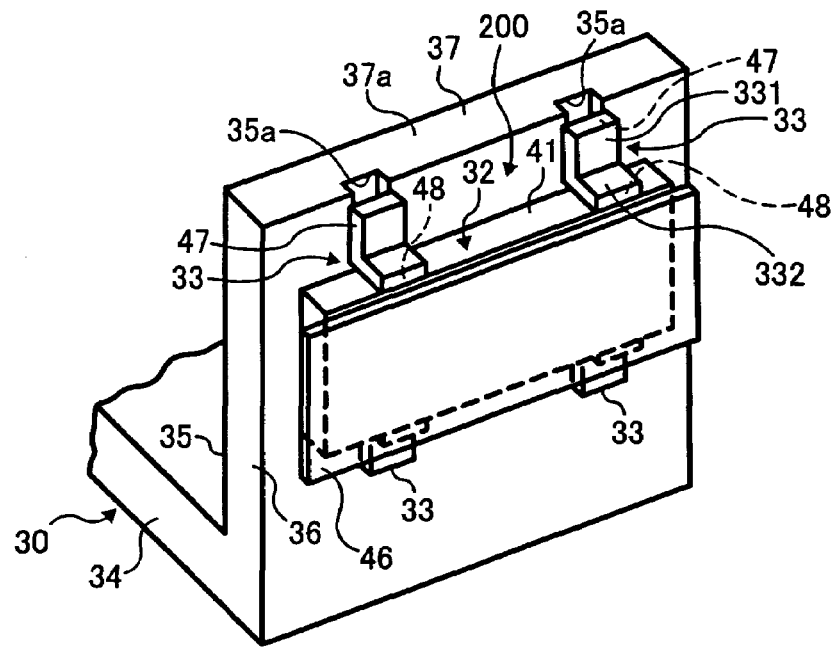
FIG. 31 is a perspective view showing a fixing structure of the image forming apparatus according an embodiment 2 of the third embodiment of the present invention.
Figure 32:
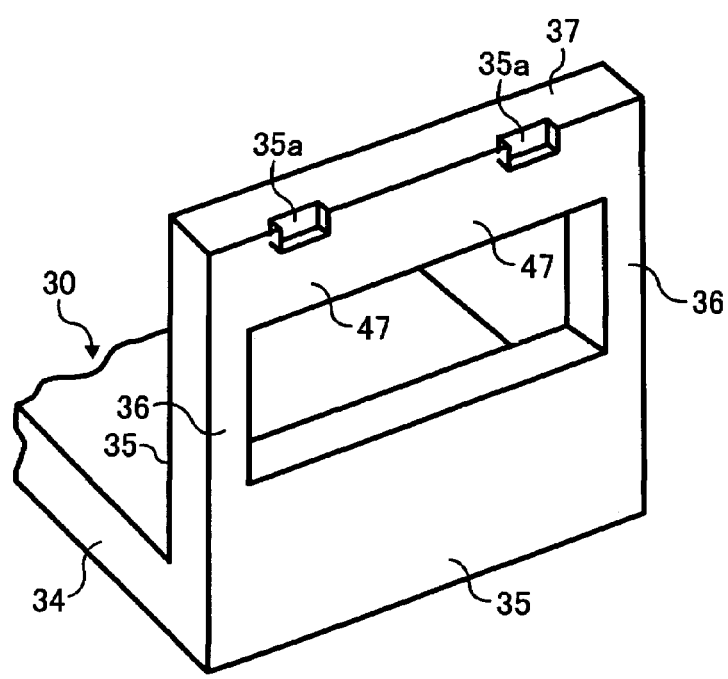
FIG. 32 is a perspective view of a base member of the fixing structure shown in FIG. 31.
Figure 33:
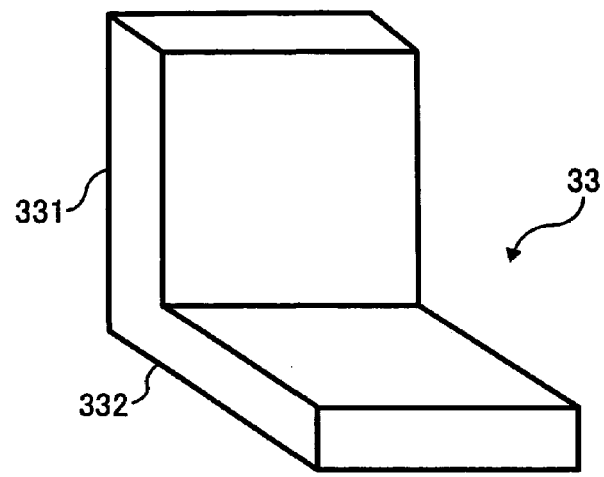
FIG. 33 is a perspective view of an intermediate retaining member of the fixing structure shown in FIG. 31.
Figure 34:
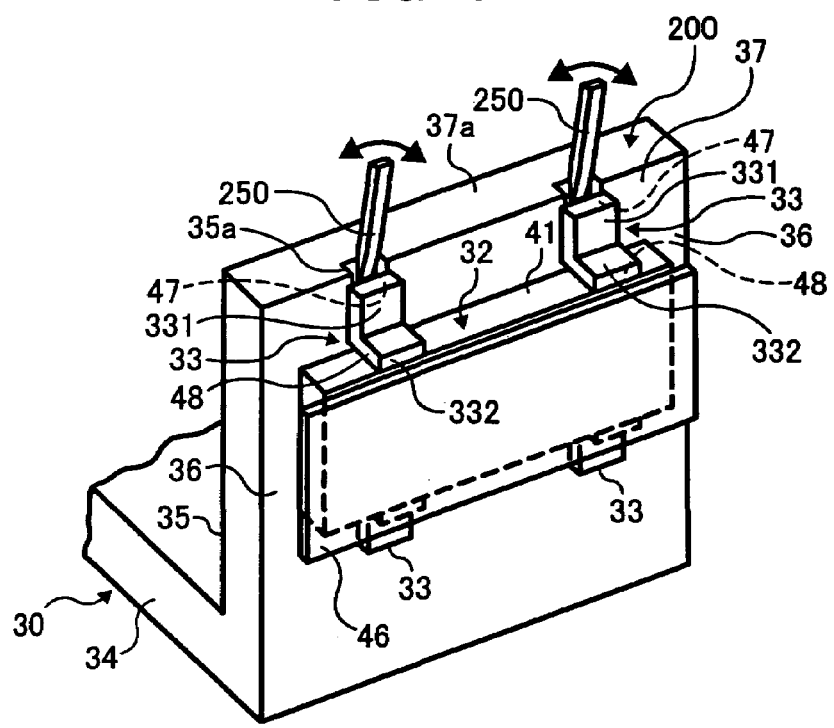
FIG. 34 is an explanatory perspective view showing a separation method of the fixing structure shown in FIG. 31.

Next, a fixing structure according to an embodiment 2 of the third embodiment of the present invention will be described with reference to FIGS. 31 to 34. In the present embodiment, components same or equivalent to those described in the above embodiment 1 are attached with same reference numbers, and overlapping description will be omitted. FIG. 31 is a perspective view of the fixing structure 200 according to the embodiment 2. FIG. 32 is a perspective view of the base member 30 of the fixing structure 200, and FIG. 33 is a perspective view of the intermediate retaining member 33 of the fixing structure 200.

In the embodiment 1 described above, the notch 33a for separating the intermediate retaining member 33 from the base member 30 is formed in the intermediate retaining member 33. On the contrary, in the embodiment 2, the notch 35a is provided in the mounting portion 47 of the base member 30 as shown in FIGS. 31 and 32. As well as in the present embodiment, the notch 35a may be a dent which is open on both a surface of the mounting portion 47 to which the first fixing portion 331 of the intermediate retaining member 33 contacts and overlaps, and an upper surface 37a of the connecting pillar 37 as an external surface of the base member 30.

The notch 35a is not filled and sealed by the adhesive described above. A clearance is formed by the notch 35a between the first fixing portion 331 of the intermediate retaining member 33 and the mounting portion 47 of the base member 33. The leading end of the tool 250 for separation of the intermediate retaining member 33 and the base member 30 is capable of inserting into the notch 35a. In other words, the notch 35a is a notch (space) for insertion of the tool 250.

In the embodiment 2, the leading end of the tool 250, which is for example in a flat-blade screwdriver configuration used in the above-mentioned embodiment 1 as well, is inserted (entered) into the notch 35a, as similar to the embodiment 1 in which the notch 33a is provided in the intermediate retaining member 33. Then, the tool 250 is leveled or slanted in directions shown by arrows in FIG. 34 such that the base end of the tool 250 approaches the base member 30 or the intermediate retaining member 33. In other words, the base member 30 and the intermediate retaining member 33 are pressed by the tool 250 such that the notch 35a is widened. Thereby, the base member 30 and the package 41 are easily detached from each other.

According to the embodiment 2, the notch 35a for separating the base member 30 as the first member and the package 41 as the second member is provided in the base member 30. Therefore, it is possible to easily separate the base member 30 from the package 41 by merely inserting the tool 250 into the notch 35a and applying the force thereto. Also, it is possible to provide the notch 35a in the base member 30, easily, even in a case where the intermediate retaining member 33 is small and thus a notch cannot be processed. Hence, it is possible to provide the fixing structure 200 in which the separation is easy.

Embodiment 3

Figure 35:
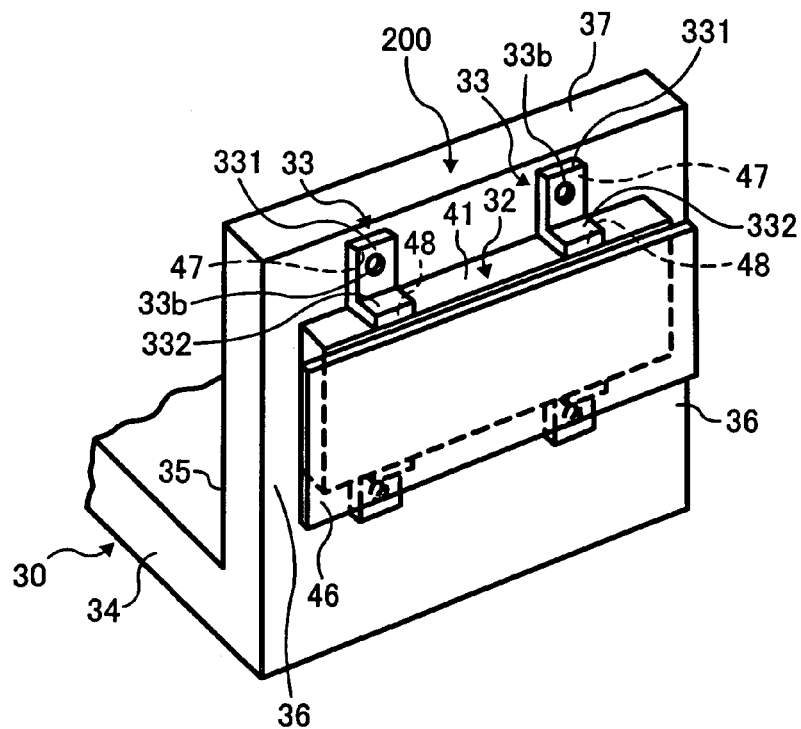
FIG. 35 is a perspective view showing a fixing structure of the image forming apparatus according to an embodiment 3 of the third embodiment of the present invention.
Figure 36:
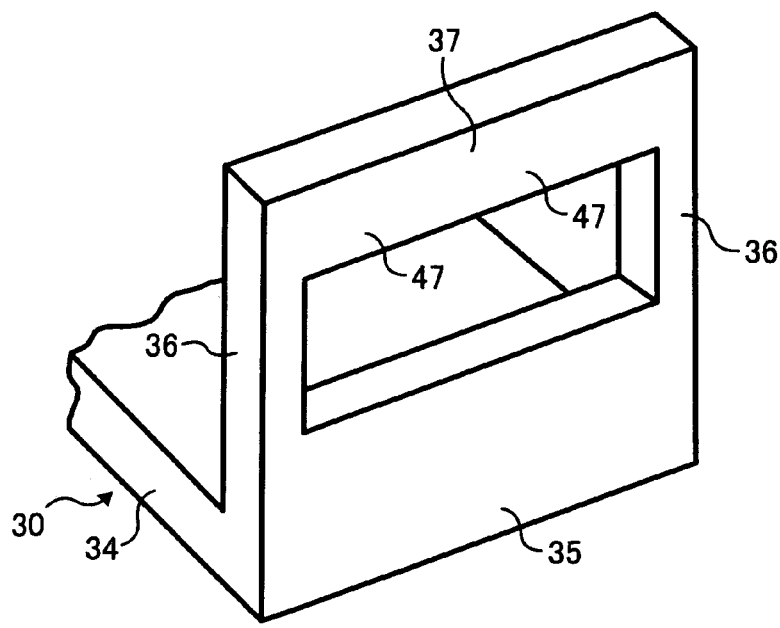
FIG. 36 is a perspective view of a base member of the fixing structure shown in FIG. 35.
Figure 37:
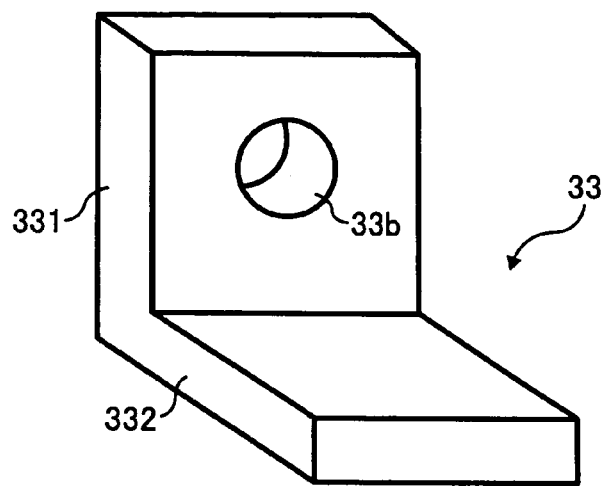
FIG. 37 is a perspective view of an intermediate retaining member of the fixing structure shown in FIG. 35.

Next, a fixing structure according to an embodiment 3 of the third embodiment of the present invention will be described with reference to FIGS. 35 to 38. In the present embodiment, components same or equivalent to those described in the above embodiments 1 and 2 are attached with same reference numbers, and overlapping description will be omitted. FIG. 35 is a perspective view of the fixing structure 200 according to the embodiment 3. FIG. 36 is a perspective view of the base member 30 of the fixing structure 200, and FIG. 37 is a perspective view of the intermediate retaining member 33 of the fixing structure 200.

In the embodiments 1 and 2 described above, the notch 33a or 35a for separating the intermediate retaining member 33 and the base member 30 is provided in the intermediate retaining member 33 or the base member 30. In the embodiment 3, a hole 33b is provided in the first fixing portion 331 of the intermediate retaining member 33 as shown in FIGS. 35 to 37. Here, a planar shape of the hole 33b is formed in a circular shape in the drawings. However, the shape of the hole 33b according to the present invention is not limited thereto; the hole 33b may be a hole which penetrates the first fixing portion 331 of the intermediate retaining member 33.

The hole 33b is not filled or sealed by the adhesive described above. A leading end of a rod-like portion 251a of a tool 251 for separating the intermediate retaining member 33 from the base member 30 which will be described later is capable of inserting therein. In other words, the hole 33b is a hole for insertion of the tool 251.

Figure 38:
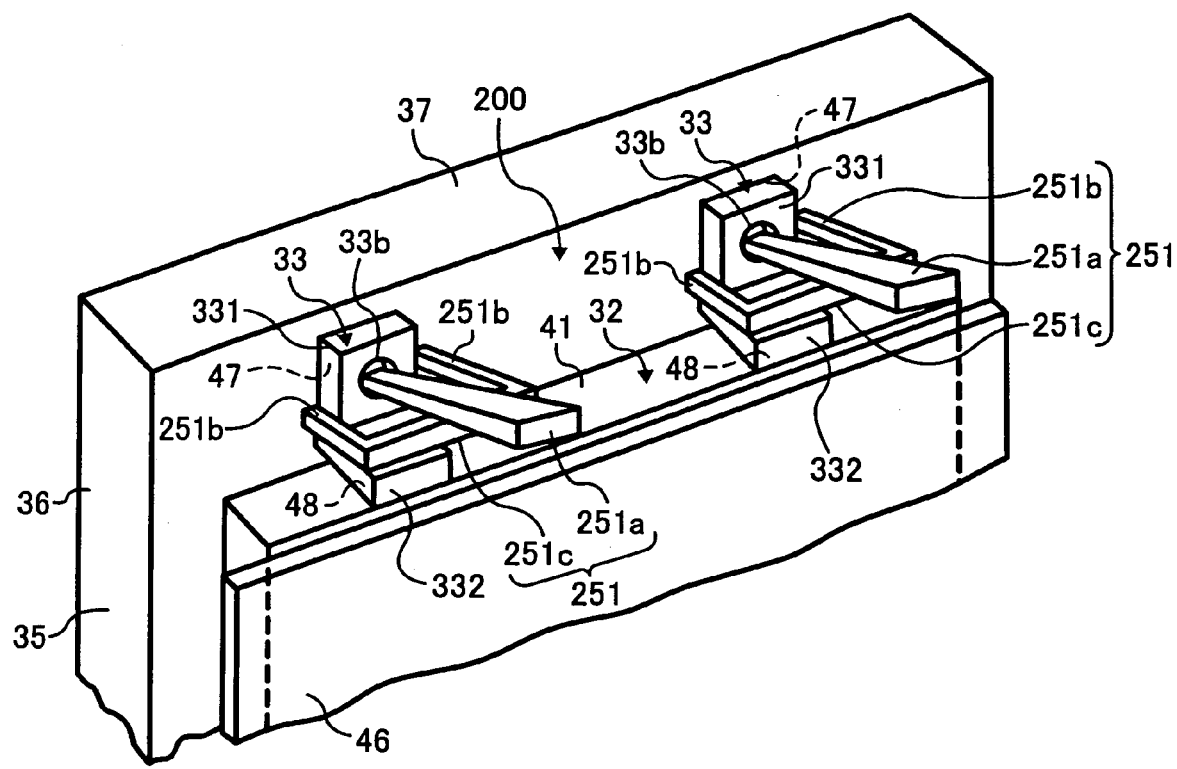
FIG. 38 is an explanatory perspective view showing a separation method of the fixing structure shown in FIG. 35.

Next, with reference to FIG. 38, a method of separating the base member 30 as the first member from the package as the second member, i.e. the image sensor 32 as described above of the fixing structure 200 according to the embodiment 3 will be described. In the embodiment 3, the tool 251 shown in FIG. 38 is used to separate the base member 30 and the package 41. The tool 251 comprises a U-shaped portion 251c having a pair of gripping portions 251b for clipping and fixing a member between the pair of gripping portions 251b, and the rod-like portion 251a provided at a central position between the pair of gripping portions 251b of the U-shaped portion 251c. The rod-like portion 251a is supported by the U-shaped portion 251c moveably along a longitudinal direction thereof.

As shown in FIG. 38, in order to separate the base member 30 from the package 41, both ends of the first fixing portion 331 of the intermediate retaining member 33 are fixed by the pair of gripping portions 251b. Then, the rod-like portion 251a is inserted or entered into the hole 33b provided in the intermediate retaining member 33, and the rod-like portion 251a is pushed against the mounting portion 47 of the base member 30. Then, the rod-like portion 251a is further inserted into an inner part of the hole 33b to press the base member 30 with the rod-like portion 251a. Thereby, the base member 30 and the package 41 are easily separated from each other. At least a part of the tool 251 such as the leading end of the rod-like portion 251a is capable of entering into the hole 33b which is provided in one of the base member 30 and the intermediate retaining member 33, and is possible to press the other of the base member 30 and the intermediate retaining member 33 when at least the part of the tool 251 is inserted into the hole 33b, and to separate the base member 30 from the package 41 by pressing the other.

According to the embodiment 3, the hole 33b for separation of the base member 30 as the first member and the package 41 as the second member is provided in the first fixing portion 331 of the intermediate retaining member 33. Therefore, for example, both sides of the intermediate retaining member 33 is grasped with the pair of gripping portions 251b of the tool 251 to restrict the movement of the intermediate retaining member 33, and then the rod-like portion 251a is inserted into the hole 33b to press the base member 30, and thereby, the base member 30 and the package 41 are easily separated. Here, the hole 33b may be provided in the mounting portion 47 of the base member 30. However, it is possible to provide the fixing structure 200 in which the separation is easy at low cost as a whole when the hole 33b is provided in the intermediate retaining member 33.

Figure 39:
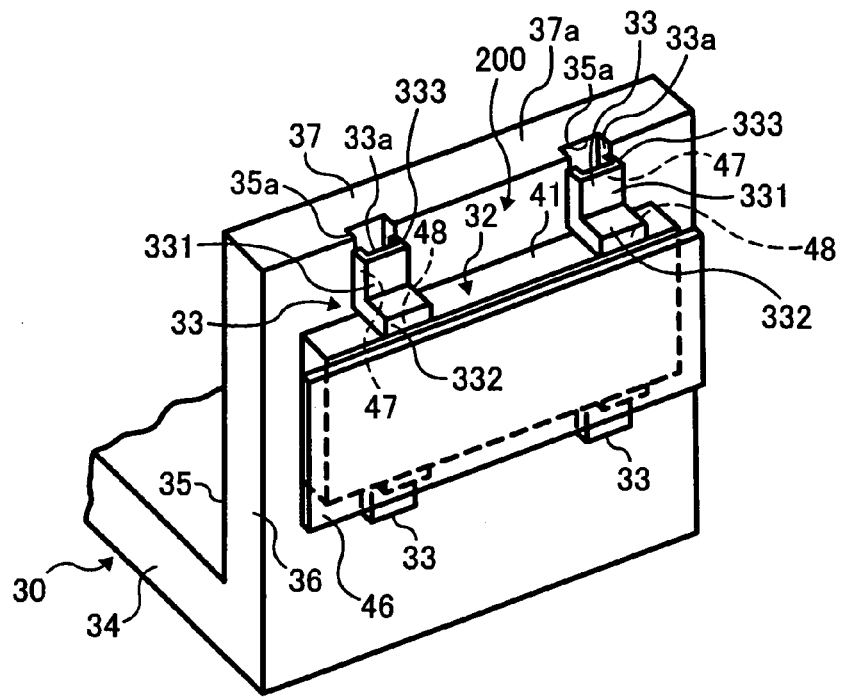
FIG. 39 is a perspective view showing an alternative of the fixing structure shown in FIG. 27.

In the embodiments 1 and 2 described above, the notch 33a or 35a is provided in either the base member 30 or the intermediate retaining member 33. However, as shown in FIG. 39, the notch 33a or 35a may be provided in both of the base member 30 and the intermediate retaining member 33 according to the present invention. In FIG. 39, components same or equivalent to those described in the above embodiments are attached with same reference numbers, and overlapping description will be omitted.

Figure 40:
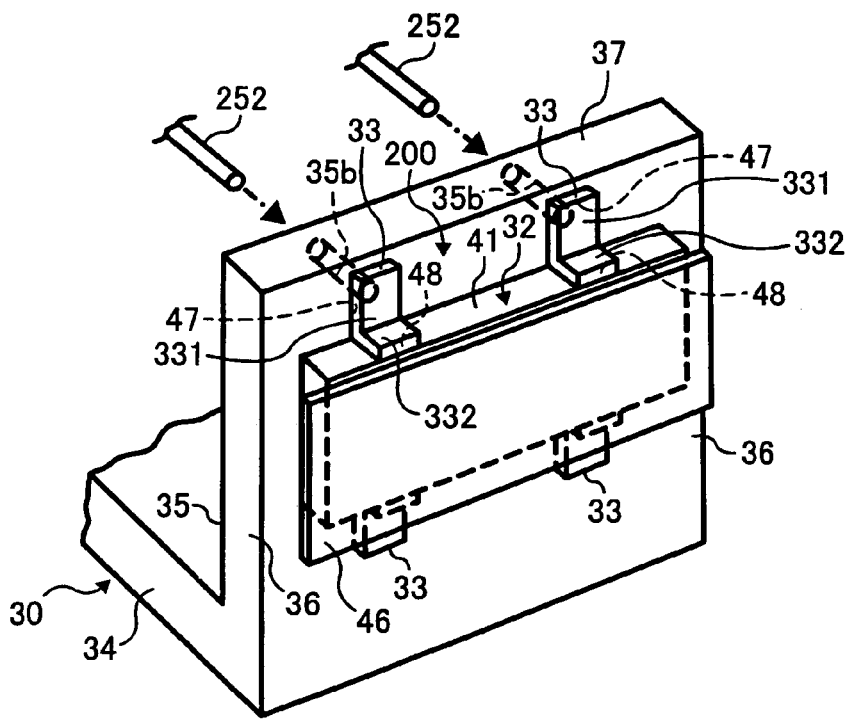
FIG. 40 is a perspective view showing an alternative of the fixing structure shown in FIG. 35.

Also in the embodiment 3, the hole 33b is provided in the intermediate retaining member 33. However, a hole 35b may be provided in the base member 30 as shown in FIG. 40. In FIG. 40, components same or equivalent to those described in the above embodiments are attached with same reference numbers, and overlapping description will be omitted.

In a case shown in FIG. 40, when separating the intermediate retaining member 33 from the base member 30, the base member 30 is for example grasped to restrict the movement of the base member 30, and then a rod-like tool 252 is inserted into the hole 35b. Then, the intermediate retaining member 33 is pressed by the rod-like tool 252 to separate the base member 30 and the package 41. At least a part of the tool 252 such as a leading end of the tool 252 is possible to enter into the hole 35b provided in one of the base member 30 and the intermediate retaining member 33, and is possible to press the other of the base member 30 and the intermediate retaining member 33 when at least the part of the tool 252 is inserted into the hole 35b, and thereby possible to separate the base member 30 from the package 41.

Accordingly, in summary, the third embodiment of the present invention makes two members to be easily separated in the fixing structure 200 or 200' to which the two members are attached mutually with the adhesive, by forming the clearance, into which at least the part of the tool 250, 251 or 252 is possible to insert, in the contacting surface between those members. Therefore, the planar shape of the notch 33*a* or 35*a* does not necessarily have to be rectangular. Any shape or configuration can be employed as long as the shape or the configuration is concave from the contacting surface described above, open on the external surface of the intermediate retaining member 33 or the base member 30, and at least the part of the tool 250 is capable of entering therein. Likewise, in the present invention, the planar shape of the hole 33*b* or 35*b* does not necessarily have to be circular. Any shape or configuration can be employed as long as the shape or the configuration is provided in the contacting surface described above, penetrates the intermediate retaining member 33 or the base member 30, and at least the part of the tool 251 or 252 described above is possible to enter therein.

The leading end of the tool 250 according to the embodiments 1 and 2 is in the flat-blade screwdriver configuration, but the tool 250 does not necessarily have to employ the flat-blade screwdriver configuration in the present invention. More specifically, the tool 250 is inserted into the notch 33*a* or 35*a* to play a role in the separation of the first member and the intermediate retaining member, i.e. the first member and the second member in the present invention, so any configuration or shape can be employed as long as the configuration or the shape is possible to enter into the notch 33*a* or 35*a*. For example, the leading end or the like of the tool 250 may be cylindrical or in a rectangular cylinder shape. In addition, a part of the tool 250, irrespective of the leading end, may be in any configuration or shape.

Similarly, the tool 251 according to the embodiment 3 is in the configuration which comprises the U-shaped portion 251*c* having the pair of gripping portions 251*b* for clipping and fixing a member between the pair of gripping portions 251*b* and the rod-like portion 251*a* provided at the central position between the pair of gripping portions 251*b* of the U-shaped portion 251*c*. However, the tool 251 in the present invention is not limited thereto. Any configuration or shape can be employed as long as the tool 251 has a structure of being inserted into the hole 33*b*, pressing the base member 30 and separating the first member and the intermediate retaining member, i.e. the second member. Likewise, although the tool 252 is formed in the rod-like shape, the configuration or shape of the tool 252 is not limited thereto. Any configuration or shape can be employed as long as the tool 252 has a structure of being inserted into the hole 35*b*, pressing the intermediate retaining member 33 and separating the first member and the intermediate retaining member, i.e. the first member and the second member.

Figure 41:
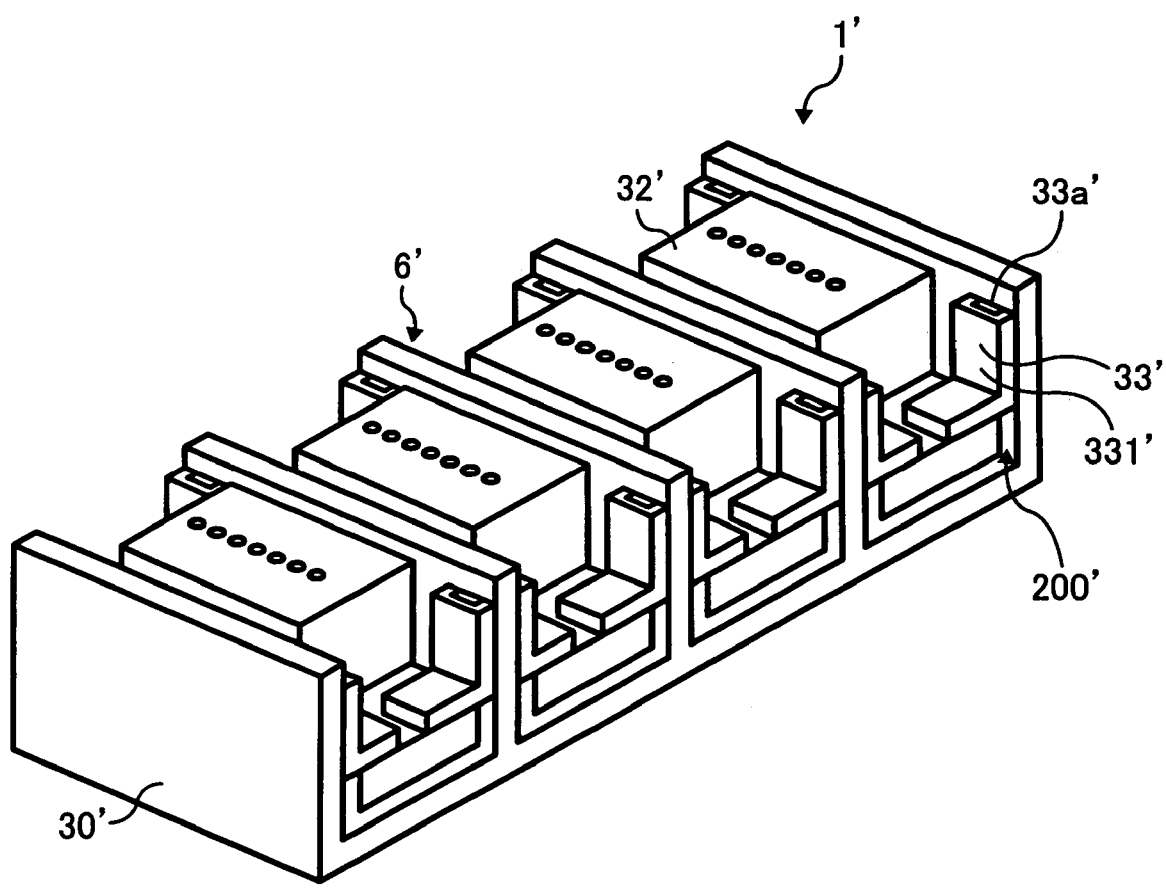
FIG. 41 is an explanatory view showing a fixing structure of an ink jet head and a head retaining member as an alternative of the fixing structure of the image forming apparatus according to the third embodiment of the present invention.

Although the invention has been described in its preferred form with a certain degree of particularity, it is to be noted that the present invention is not limited to the embodiments described in the foregoing, and obviously many changes and variations are possible therein without departing from the scope and spirit of the invention. For example, the present invention is applicable to the fixing structure 200' of an ink jet head 32' used in a writing unit 6' of a well-known ink jet printer as an image forming apparatus 1', as shown in FIG. 41. In the fixing structure 200', the advantages effects same as those of the present invention can be obtained by providing a notch 33*a'* shown in FIG. 41 in at least either an intermediate retaining member 33' for positioning and fixing the ink jet head 32' as the first member which ejects ink toward the transfer paper 21 and a head retaining member 30' as the second member which retains the ink jet head 32', or the ink jet head 32'. In FIG. 41, the notch 33*a'* is provided in a first fixing portion 331' of the intermediate retaining member 33' mounted to the ink jet head 32'. However, of course, the notch 33*a'* may be provided in the ink jet head 32' according to the present invention.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixing structure of a lens cylinder, comprising:
a base member;
the lens cylinder in which a lens is pressed, and
at least one intermediate retaining member fixed to both the lens cylinder and the base member by an adhesive,
wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

2. The fixing structure of the lens cylinder according to claim 1, wherein the number of the concave portion is smaller by one than or equal to or more than the number of the intermediate retaining member.

3. The fixing structure of the lens cylinder according to claim 1, wherein the concave portion is provided in an external circumferential surface of the lens cylinder, and extends along a circumferential direction of the lens cylinder.

4. The fixing structure of the lens cylinder according to claim 1, wherein the intermediate retaining member and the lens cylinder are adhered such that a clearance is provided in the concave portion.

5. A lens block for reading a reflected image of a manuscript by a photoelectric transducer, comprising a fixing structure of a lens cylinder including:
a base member;
the lens cylinder in which a lens is pressed, and
at least one intermediate retaining member fixed to both the lens cylinder and the base member by an adhesive,
wherein a concave portion for allowing a tool, for separating the lens cylinder from the intermediate retaining member, to be inserted therein is provided in at least one of that part of the lens cylinder to which the intermediate retaining member is mounted and that part of the intermediate retaining member to which the lens cylinder is mounted.

6. The lens block according to claim 5, wherein the number of the concave portion is smaller by one than or equal to or more than the number of the intermediate retaining member.

7. The lens block according to claim 5, wherein the concave portion is provided in an external circumferential surface of the lens cylinder, and extends along a circumferential direction of the lens cylinder.

8. The lens block according to claim 5, wherein the intermediate retaining member and the lens cylinder are adhered such that a clearance is provided in the concave portion.

9. A fixing structure which adheres and fixes a first member and a second member comprising:
an intermediate retaining member through which the first member and the second member are adhered and fixed, wherein the intermediate retaining member comprises a first fixing portion mounted on the first member and a second fixing portion mounted on the second member, and wherein a notch for allowing a tool, for separating the first member from the intermediate retaining member, to be inserted therein is provided in at least one of a mounting portion of the first member on which the intermediate retaining member is mounted and the first fixing portion of the intermediate retaining member.

10. The fixing structure according to claim 9, wherein the intermediate retaining member comprises a material which transmits ultraviolet rays, and the intermediate retaining member is fixed to the first member by a photo-curing adhesive which cures when the ultraviolet rays are irradiated.

11. The fixing structure according to claim 9, wherein the first member is a head retaining member, and the second member is an ink jet head.

12. A fixing structure which adheres and fixes a first member and a second member through an intermediate retaining member, wherein the intermediate retaining member comprises a first fixing portion mounted on the first member and a second fixing portion mounted on the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

13. The fixing structure according to claim 12, wherein the intermediate retaining member comprises a material which transmits ultraviolet rays, and the intermediate retaining member is fixed to the first member by a photo-curing adhesive which cures when the ultraviolet rays are irradiated.

14. The fixing structure according to claim 12, wherein the first member is a head retaining member, and the second member is an ink jet head.

15. A lens block which images a reflected image of a manuscript on a photoelectric transducer to perform photoelectric conversion of the reflected image, comprising a fixing structure which adheres and fixes a first member and a second member through an intermediate retaining member, wherein the intermediate retaining member comprises a first fixing portion mounted on the first member and a second fixing portion mounted on the second member, and wherein a notch for allowing a tool, for separating the first member from the intermediate retaining member, to be inserted therein is provided in at least one of a mounting portion of the first member to which the intermediate retaining member is mounted and the first fixing portion of the intermediate retaining member.

16. The lens block according to claim 15, wherein the first member is a base member for mounting a lens cylinder which accommodates a lens group leading the reflected image to the photoelectric transducer and a package which accommodates the photoelectric transducer, and wherein the second member is the package.

17. A lens block which images a reflected image of a manuscript on a photoelectric transducer to perform photoelectric conversion of the reflected image, comprising a fixing structure which adheres and fixes a first member and a second member through an intermediate retaining member, wherein the intermediate retaining member comprises a first fixing portion mounted on the first member and a second fixing portion mounted on the second member, and wherein a hole for allowing a tool, for separating the first member from the intermediate retaining member, to be inserted therein is provided in at least one of a mounting portion of the first member to which the intermediate retaining member is mounted and the first fixing portion of the intermediate retaining member.

18. The lens block according to claim 17, wherein the first member is a base member for mounting a lens cylinder which accommodates a lens group leading the reflected image to the photoelectric transducer and a package which accommodates the photoelectric transducer, and wherein the second member is the package.

* * * * *